(12) United States Patent
Miller et al.

(10) Patent No.: US 11,421,522 B2
(45) Date of Patent: Aug. 23, 2022

(54) METHOD AND APPARATUS FOR USING A SURFACE PROCESSOR TO ELECTRONICALLY CONTROL COMPONENTS OF A TOLL DRILL STRING BASED AT LEAST ON MEASUREMENTS FROM A DOWNHOLE DEVICE

(71) Applicants: ERDOS MILLER, INC., Houston, TX (US); BLACK DIAMOND OILFIELD RENTALS, LLC, The Woodlands, TX (US)

(72) Inventors: Kenneth Miller, Houston, TX (US); David Erdos, Houston, TX (US); Abraham Erdos, Houston, TX (US); Amador Baggerly, Rockport, TX (US)

(73) Assignees: ERDOS MILLER, INC., Houston, TX (US); BLACK DIAMOND OILFIELD RENTALS, LLC, The Woodlands, TX (US)

(*) Notice: Subject to any disclaimer, the term of this patent is extended or adjusted under 35 U.S.C. 154(b) by 0 days.

(21) Appl. No.: 17/332,084

(22) Filed: May 27, 2021

(65) Prior Publication Data
US 2021/0372261 A1 Dec. 2, 2021

Related U.S. Application Data

(60) Provisional application No. 63/030,561, filed on May 27, 2020.

(51) Int. Cl.
*E21B 44/02* (2006.01)
*G05B 13/02* (2006.01)
(Continued)

(52) U.S. Cl.
CPC .......... *E21B 44/02* (2013.01); *G05B 13/0265* (2013.01); *E21B 47/07* (2020.05);
(Continued)

(58) Field of Classification Search
CPC ........ E21B 44/00; E21B 44/005; E21B 44/02; E21B 44/04; E21B 44/10; E21B 2200/20; E21B 2200/22
See application file for complete search history.

(56) References Cited

U.S. PATENT DOCUMENTS 10,590,757 B1 3/2020 Miller et al.
2002/0120401 A1* 8/2002 Macdonald ........... E21B 44/005
702/6
(Continued)

OTHER PUBLICATIONS

International Searching Authority, International Search Report and Written Opinion for PCT/US2021/34516; dated Oct. 6, 2021; 11 pages.

*Primary Examiner* — Tara Schimpf
(74) *Attorney, Agent, or Firm* — Dickinson Wright, PLLC; Michael E. Noe, Jr.; Jonathan H. Harder

(57) ABSTRACT

In some embodiments, a system includes a surface processor and a tool drill string having a downhole device including a downhole processor. The surface processor may include a memory storing instructions, and the surface processor may be communicatively coupled to the downhole processor. The surface processor may be configured to execute the instructions to receive one or more first measurements from the downhole device, and determine whether the one or more first measurements satisfy a threshold measurement. Responsive to determining the one or more first measurements satisfy the threshold measurement, the surface processor may electronically modify a weight on bit by a first amount and electronically modify a revolutions per minute of a motor by a second amount.

20 Claims, 55 Drawing Sheets

(51) Int. Cl.
 *E21B 47/10* (2012.01)
 *E21B 49/00* (2006.01)
 *E21B 47/07* (2012.01)

(52) U.S. Cl.
 CPC .............. *E21B 47/10* (2013.01); *E21B 49/003* (2013.01); *E21B 2200/20* (2020.05)

(56) References Cited

U.S. PATENT DOCUMENTS

| | | |
|---|---|---|
| 2004/0040746 A1 | 3/2004 | Niedermayr et al. |
| 2004/0124012 A1* | 7/2004 | Dunlop .................. E21B 44/00 175/57 |
| 2014/0291023 A1 | 10/2014 | Edbury et al. |
| 2014/0353033 A1 | 12/2014 | Pink et al. |
| 2018/0238164 A1 | 8/2018 | Jamison et al. |
| 2019/0345808 A1* | 11/2019 | Suryadi ..................... E21B 4/02 |
| 2020/0011751 A1* | 1/2020 | Kazemi Miraki ...... G01P 15/18 |
| 2021/0189872 A1 | 6/2021 | Miller et al. |
| 2021/0301641 A1* | 9/2021 | Dunbar .................. E21B 45/00 |
| 2021/0324723 A1* | 10/2021 | Madasu ............... G05B 13/027 |

* cited by examiner

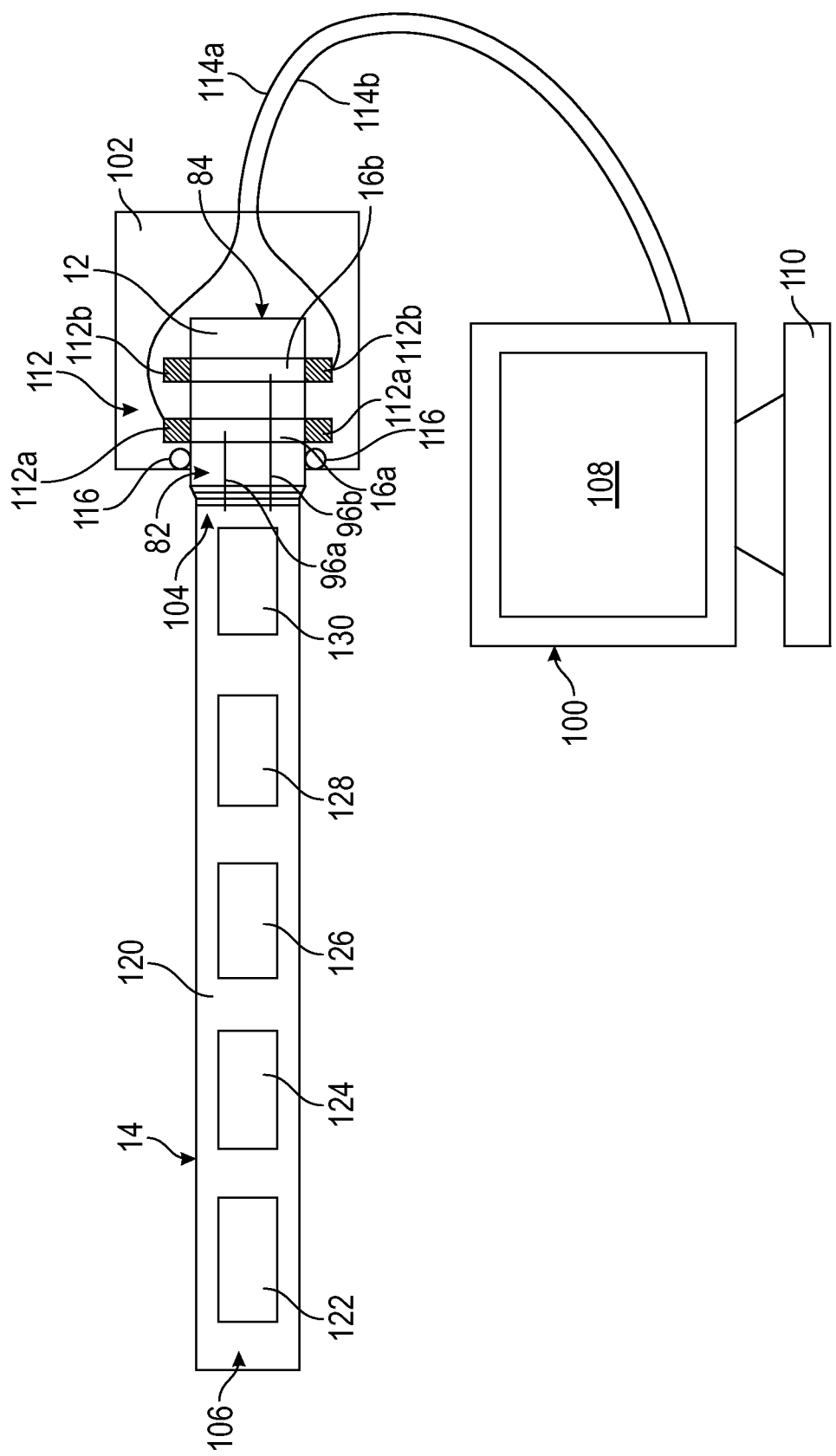

← 2100

| NAME | WITS CODE | EDR CAN RECEIVE | EDR SENDS IN FULL WITS MODE | EDR SENDS IN HALF WITS MODE |
|---|---|---|---|---|
| RECORD 01: GENERAL TIME BASED <br> AVAILABLE TRANSMISSION TYPES: TIME BASED OR REQUEST- RESPONSE ||||| 
| WELL ID | 0101 | | | |
| DATE | 0105 | | | |
| TIME | 0106 | | | |
| BIT DEPTH | 0108 | Y | Y | Y |
| HOLE DEPTH | 0110 | Y | Y | Y |
| TRUE VERTICAL DEPTH | 0111 | Y | | |
| BLOCK HEIGHT | 0112 | Y | Y | |
| ON BOTTOM ROP | 0113 | Y | Y | Y |
| HOOK LOAD (MAXIMUM) | 0115 | Y | Y | |
| WEIGHT ON BIT | 0117 | Y | Y | |
| ROTARY TORQUE | 0119 | Y | Y | |
| ROTARY RPM | 0120 | Y | Y | |
| STANDPIPE PRESSURE | 0121 | Y | Y | |
| CASING PRESSURE | 0122 | Y | Y | |
| PUMP 1 STROKES/MIN | 0123 | Y | Y | Y |
| PUMP 2 STROKES/MIN | 0124 | Y | Y | Y |
| PUMP 3 STROKES/MIN | 0125 | Y | Y | Y |
| TOTAL MUD VOLUME | 0126 | | Y | |
| PVT TOTAL MUD GAIN/LOSS | 0127 | | Y | |
| FLOW | 0128 | | Y | |
| PUMP RATE | 0130 | Y | Y | |
| TOTAL STROKES P1+P2+P3+P4 | 0137 | | Y | Y |
| 3rd PARTY LAGD | 0139 | Y | Y | |

WITS CONFIGURATION

**WITS                  **************************************

[ DISABLED ▼ ]    [ APPLY ]

**WITS                  **************************************

[ DISABLED ▼ ]    [ APPLY ]

*******WITS             **************************************

[ DISABLED ▼ ]    [ APPLY ]

[ VIEW WITH *** ]    [ CLOSE ]

FIG. 21

| NAME | WITS CODE | EDR CAN RECEIVE | EDR SENDS IN FULL WITS MODE | EDR SENDS IN HALF WITS MODE |
|---|---|---|---|---|
| 3rd PARTY GAS | 0140 | Y | Y | |
| MECHANICAL SPECIFIC ENERGY | 0141 | | Y | |
| TOTALPUMPDISPLACEMENT | 0142 | | Y | Y |
| PUMP 1 TOTAL STROKES | 0143 | | Y | Y |
| PUMP 2 TOTAL STROKES | 0144 | | Y | Y |
| PUMP 3 TOTAL STROKES | 0145 | | Y | Y |
| DIFFERENTIAL PRESSURE | 0150 | Y | | |
| PASON LAG DEPTH | 0169 | | Y | |
| PASON GAS | 0170 | | Y | |
| DIFFERENTIAL PRESSURE | 0171 | | Y | Y |
| RECORD 02: DRILLING - DEPTH BASED <br> AVAILABLE TRANSMISSION TYPES: DEPTH BASED, OR REQUEST- RESPONSE | | | | |
| DATE | 0205 | | | |
| TIME | 0206 | | | |
| HOLE DEPTH | 0208 | | Y | Y |
| ON BOTTOM ROP | 0210 | | Y | Y |
| WEIGHT ON BIT | 0211 | | Y | Y |
| HOOK LOAD | 0212 | | Y | Y |
| STANDPIPE PRESSURE | 0213 | | Y | Y |
| ROTARY TORQUE | 0214 | | Y | Y |
| ROTARY RPM | 0215 | | Y | Y |
| TOTAL PUMP OUTPUT | 0219 | | Y | Y |
| FLOW | 0221 | | Y | Y |
| TOTAL MUD VOLUME | 0222 | | Y | Y |

A TYPICAL PACKET FROM A TOTAL GAS DETECTION SYSTEM INCLUDES THE FOLLOWING LINES:
&&
01691234.56
01705.43
!!
THE FIRST FOUR DIGITS IN A PACKET MAKE UP THE WITS CODE. THE DIGITS THAT FOLLOW THE WITS CODE REPRESENT THE MEASURED VALUE BEING SENT. THE WITS SPECIFICATION ALSO INCLUDES THE CARRIAGE RETURN AND LINE FEED CONTROL CHARACTERS, <CR><lF>, AT THE END OF EACH LINE. WHETHER OR NOT THESE CONTROL CHARACTERS ARE VISIBLE DEPENDS ON THE APPLICATION YOU USE TO VIEW WITS PACKETS.

THE SECOND LINE OF THE EXAMPLE INCLUDES THE FOLLOWING INFORMATION:

01391234.56

0139 IS THE LAG DEPTH WITS CODE 1234.56 IS THE MEASURED VALUE BEING SENT

REPORT GENERATION CONFIGURATION
REPORT HISTORY

SURVEY        DAILY

GENERATE SURVEY REPORTS:

◉ EVERY SURVEY

○ EVERY HOUR

○ EVERY 2 HOURS

○ EVERY 4 HOURS

0 UNREPORTED SURVEYS

| | |
|---|---|
| BASINREPORT_2020_02_02_01_54_02_GAMMAEDR_EXPORT_RIG11_20202022_2_FULL.PDF | OPEN |
| BASINREPORT_2020_02_02_01_54_02_EDRLAS_RIG11_20202022.LAS | OPEN |
| BASINREPORT_2020_02_02_01_54_00_DAILYREPORT_RIG11_20202022_2_FULL.PDF | OPEN |
| BASINREPORT_2020_02_02_00_54_04_GAMMAEDR_EXPORT_RIG11_20202022_2_FULL.PDF | OPEN |
| BASINREPORT_2020_02_02_00_34_02_EDRLAS_RIG11_20202022.LAS | OPEN |
| BASINREPORT_2020_02_02_00_35_59_DAILYREPORT_RIG11_20202022_2_FULL.PDF | OPEN |
| BASINREPORT_2020_01_01_08_59_41_GAMMAEDR_EXPORT_RIG11_20202022 | OPEN |

| CAPTURE NOW | OPEN REPORT FOLDER |
|---|---|

CLOSE

| | |
|---|---|
| START DATE | JANUARY 23, 2020 |
| START TIME | 23:30:00 |
| TIE-IN MD | |
| TIE-IN INC | |
| TIE-IN AZN | |

FIG. 25

RIG 11 - 20202022-2
SUN FEB 2 2020
DAILY REPORT

RUN 2

| DESCRIPTION | VALUES |
|---|---|
| SENSOR OFFSET FROM BIT | 52 FT |
| GAMMA OFFSET FROM BIT | 0FT |
| TOOLS: ECLIPSE 004 | |

SINCE LAST REPORT

| | |
|---|---|
| TOTAL FEET DRILLING | |
| TOTAL CIRCULATING HOURS | 0.33 |
| TOTAL SURVEYS | 0 |
| HIGHEST SHOCK | 0.00G |
| HIGHEST TEMPERATURE | 51.30°C |
| CURRENT PUMP PRESSURE | 0.00 |
| LATEST DEPTH | 0.00 |
| LATEST TEMPERATURE | 0°C |

DAILY REPORT
GENERATED ON: 02/02/20 AT 02:33:59

DETAILS:

| | | |
|---|---|---|
| OPERATING COMPANY: CGI | AP1: | JOB: 20202022 |
| COMPANY: BASIN DRILLING TOOLS | RUN: 2 | COUNTY: |
| RIG: RIG 11 | SENSOR OFFSET: 52 FT | COUNTRY: UNITED STATES |
| WELL NAME: 1H | GAMMA OFFSET: 0 FT | START DATE: JANUARY 23, 2020 |
| LOCATION: KINGMAN ARIZONA | LONGITUDE: | START TIME: 23:30:00 |
| | LATITUDE: | JOB DURATION: 219.07 HOUR[S] |

TOOLS:
ECLIPSE 004

Basin App
Nor Am 22 End Run Report
This is a report for End Run Report on Sun Feb 2
3:34 AM

Nor Am 22 End Run Report

Basin App <reports@basindrillingtools.com>
3:34 AM
To: Amador Baggerly
Save all attachments BasinReport_2020_02_02_03_34...
239.02 KB BasinReport_2020_02_02_03_34...
0 bytes BasinReport_2020_02_02_03_34...
137.61 KB BasinReport_2020_02_02_03_34...
284.6 KB BasinReport_2020_02_02_03_34...
6.6 KB

End Run Report
Sun Feb 2 2020

The following run has been ended:
Generation Date: 02/02/20
Generation Time: 03:34:12
Location(Lat,Lng): ,
Location String:
Rig: Nor Am 22 Company Diamondback Energy
Location: Texas
API:
County: Howard
Country: United States
Longitude:
Latitude:

Job: TX20200201
Operating Company: Wenzel Drilling Tools
Start Date: January 2 2020
Start Time: 09:27:54
Job Duration: 0.00 hours(s)

Run: 1
Sensor offset from bit: 34 ft
Gamma offset from bit: 38 ft
Tools: Pulser - 2020 DM - 1490 Gamma - 1776 Batt - 2001

Flatline Detection

| PUMPS ON THRESHOLD [PSI] | − | 1,010 | + | |
| FLATLINE INTERVAL [S] | − | 60 | + | |
| CONTACT NUMBER FOR FLATLINE | 1(888) 888 - 8888 | | | PREVIEW |

Rig 11 Flatline Detected
Thu Jan 30 2020

Flatline has been detected in the following run:
Generation Date: 01/30/20
Generation Time: 09:54:08
Location(Lat,Lng): ,
Location String:
Rig: Rig 11 Company: Basin Drilling Tools
Location: Kingman Arizona
API:
County:
Country: United States
Longitude:
Latitude:

Job: 20202022
Operating Company: Stryker Directional Services
Start Date: January 23 2020
Start Time: 23:30:00
Job Duration: 154.40 hour(s)

Run: 2
Sensor offset from bit: 52 ft
Gamma offset from bit: 0 ft
Tools: Eclipse 004

Pumps have been at or above the configured pumps on threshold (1010 psi) without receiving a telemetered value for more than the configured flatline interval (60 seconds)

Flatline Detected
Generated on: 01/30/20 at 09:54:08

Details:
Operating Company: Stryker Directional Services
Company: Basin Drilling Tools
Rig: Rig 11
Well Name: 1H
Location: Kingman Arizona API:
Run: 2
Sensor offset: 52 ft
Gamma offset: 0 ft
Longitude:
Latitude:

Tools:
Eclipse 004

Job: 20202022
County:
Country: United States
Start Date: January 23, 2020
Start Time: 23:30:00
Job Duration: 154.40 hours(s)

This run:
Total feet drilled: 0
Total circulating hours: 0.23
Total surveys: 0
 0.00 G
Highest shock: 51.30 °C
Highest temperature: 1200.00

This run:
01/30/20 09:54:08 Flatline detected.
01/30/20 09:53:22 Diff spike detected.
01/30/20 09:53:17 Diff spike detected.
01/30/20 09:53:08 Diff spike detected.

```
~VERSION INFORMATION SECTION
#MNEM.UNIT                          VALUE : DESCRIPTION
#---- , ----                        ----- : ----------
   VERS.                              2.0 : CWLS LOG ASCII STANDAED - VERSION 2.0
   WRAP.                               NO : ONE LINE PER DEPTH STEP
~WELL INFORMATION SECTION
#MNEM.UNIT                          VALUE : DESCRIPTION
#----- , ---                        ----- : ----------
   STRT.FT                           0.00 : START DEPTH
   STOP.FT                        2961.69 : STOP DEPTH
   STEP.FT                              0 : STEP
   NULL.                            -9999 : NULL VALUE
   COMP.                                  : COMPANY
   WELL.                                  : WELL NAME
    FLD.                                  : FIELD
    LOC.                                  : LOCATION
   CNTY.                                  : COUNTY
   STAT.                                  : STATE
   CTRY.                                  : COUNTRY
   SRVC.                                  : SERVICE COMPANY
   DATE.                         2020-02-02 : DATE (yyyy-mm-dd)
    API.                                  : API NUMBER
~CURVE INFORMATION SECTION
#MNEM.UNIT                       API CODE : CURVE DESCRIPTION
#---- , ----                     --------- : ------------------
   DEPT.FT                                : 1 DEPTH
    ROP.FT/HR                             : 2 RATE OF PENETRATION
    SPP.PSI                               : 3 STAND PIPE PRESSURE
   MSPP.PSI                               : 4 MWD PRESSURE
    SPM.SPM                               : 5 STROKES PER MINUTE
    RPM.RPM                               : 6 ROTARY SPEED
    DIF.PSI                               : 7 DIFFERENTIAL PRESSURE
~PARAMETER INFORMATION SECTION
#MNEM.UNIT                          VALUE : DESCRIPTION
#---- , ----                        ----- : ----------
```

| ~ASCII LOG DATA | | | | | | |
|---|---|---|---|---|---|---|
| # DEPTH | ROP | SPP | MWD PRESS | SPM | RPM | DIFF |
| # --------- | --------- | --------- | --------- | --------- | --------- | --------- |
| 0.00 | 0.00 | 0.00 | 0.00 | 0.00 | 0.00 | 0.00 |
| 2042.12 | 0.00 | 0.00 | 453.30 | 0.00 | 0.00 | 0.00 |
| 2042.63 | 0.00 | 1560.00 | 447.28 | 90.00 | 45.00 | 900.00 |
| 2043.14 | 0.00 | 1560.00 | 447.28 | 90.00 | 45.00 | 900.00 |
| 2043.65 | 0.00 | 1560.00 | 467.16 | 90.00 | 45.00 | 900.00 |
| 2044.16 | 0.00 | 1560.00 | 467.16 | 90.00 | 45.00 | 900.00 |
| 2044.67 | 0.00 | 1560.00 | 467.44 | 90.00 | 45.00 | 900.00 |
| 2045.18 | 0.00 | 1560.00 | 467.44 | 90.00 | 45.00 | 900.00 |
| 2045.70 | 0.00 | 1560.00 | 0.00 | 90.00 | 45.00 | 900.00 |
| 2046.21 | 0.00 | 1560.00 | 0.00 | 90.00 | 45.00 | 900.00 |
| 2046.72 | 0.00 | 1560.00 | 0.00 | 90.00 | 45.00 | 900.00 |
| 2047.23 | 0.00 | 1560.00 | 0.00 | 90.00 | 45.00 | 900.00 |
| 2047.74 | 0.00 | 1560.00 | 0.00 | 90.00 | 45.00 | 900.00 |
| 2048.26 | 0.00 | 1560.00 | 0.00 | 90.00 | 45.00 | 900.00 |
| 2048.77 | 0.00 | 1560.00 | 0.00 | 90.00 | 45.00 | 900.00 |
| 2049.36 | 0.00 | 1560.00 | 0.00 | 90.00 | 45.00 | 900.00 |
| 2049.88 | 0.00 | 1560.00 | 0.00 | 90.00 | 45.00 | 900.00 |
| 2050.39 | 0.00 | 1560.00 | 0.00 | 90.00 | 45.00 | 900.00 |
| 2050.90 | 0.00 | 1560.00 | 0.00 | 90.00 | 45.00 | 900.00 |
| 2051.41 | 0.00 | 1560.00 | 0.00 | 90.00 | 45.00 | 900.00 |
| 2051.84 | 0.00 | 1560.00 | 0.00 | 90.00 | 45.00 | 900.00 |
| 2052.34 | 0.00 | 1560.00 | 0.00 | 90.00 | 45.00 | 900.00 |
| 2052.85 | 0.00 | 1560.00 | 0.00 | 90.00 | 45.00 | 900.00 |
| 2053.45 | 0.00 | 1560.00 | 0.00 | 90.00 | 45.00 | 900.00 |
| 2053.96 | 0.00 | 1560.00 | 0.00 | 90.00 | 45.00 | 900.00 |
| 2054.47 | 0.00 | 1560.00 | 0.00 | 90.00 | 45.00 | 900.00 |
| 2054.98 | 0.00 | 1560.00 | 0.00 | 90.00 | 45.00 | 900.00 |
| 2055.50 | 0.00 | 1560.00 | 0.00 | 90.00 | 45.00 | 900.00 |
| 2056.02 | 0.00 | 1560.00 | 0.00 | 90.00 | 45.00 | 900.00 |
| 2056.53 | 0.00 | 1560.00 | 0.00 | 90.00 | 45.00 | 900.00 |
| 2057.04 | 0.00 | 1560.00 | 0.00 | 90.00 | 45.00 | 900.00 |

Rig 11 Diff Spike Detected
Thu Jan 30 2020

A Diff spike has been detected in the following run:
Generation Date: 01/30/20
Generation Time: 09:53:22
Location(Lat, Lng): ,
Location String:
Rig: Rig 11 Company: Basin Drilling Tools
Location: Kingman Arizona
API:
County:
Country: United States
Longitude:
Latitude:

Job: 20202022
Operating Company: Stryker Directional Services
Start Date: January 23 2020
Start Time: 23:30:00
Job Duration: 154.39 hour(s)

Run: 2
Sensor offset from bit: 52 ft
Gamma offset from bit: 0 ft
Tools: Eclipse 004

Diff Spike Report
Generated on: 01/30/20 at 09:53:22

Details:
Operating Company: Stryker  API:  Tools:
Directional Services  Run: 2  Eclipse 004
Company: Basin Drilling Tools  Sensor offset: 52 ft
Rig: Rig 11  Gamma offset: 0 ft
Well Name: 1H  Longitude:
Location: Kingman Arizona  Latitude:

Job: 20202022
County:
Country: United States
Start Date: January 23, 2020
Start Time: 23:30:00
Job Duration: 154.39 hours(s)

This run:  This run:
Total feet drilled: 0  01/30/20 09:53:22 Diff spike detected.
Total circulating hours: 0.22  01/30/20 09:53:17 Diff spike detected.
Total surveys: 0  01/30/20 09:53:08 Diff spike detected.

Highest shock: 0.00 G
Highest temperature: 51.30 °C

WITS Dropout

Thu Jan 30 2020

WITs dropout has been detected in the following run:

Generation Date: 01/30/20
Generation Time: 13:06:36
Location(Lat, Lng): ,
Location String:
Rig: Rig 11 Company: Basin Drilling Tools
Location: Kingman Arizona
API:
County:
Country: United States
Longitude:
Latitude:

Job: 20202022
Operating Company: Stryker Directional Services
Start Date: January 23 2020
Start Time: 23:30:00
Job Duration: 157.61 hour(s)

Run: 2
Sensor offset from bit: 52 ft
Gamma offset from bit: 0 ft
Tools: Eclipse 004

WITs dropout has been detected for source MWD WITs on port COM8

WITs Dropout
Generated on: 01/30/20 at 13:06:36

Details:
Operating Company: Stryker Directional Services
Company: Basin Drilling Tools
Rig: Rig 11
Well Name: 1H
Location: Kingman Arizona API:
Run: 2
Sensor offset: 52 ft
Gamma offset: 0 ft
Longitude:
Latitude:

Tools:
Eclipse 004

Job: 20202022
County:
Country: United States
Start Date: January 23, 2020
Start Time: 23:30:00
Job Duration: 157.61 hours(s)

| This run: | | This run: |
|---|---|---|
| Total feet drilled: | 0 | 01/30/20 13:06:36 WITs Dropout MWD WITs COM8 |
| Total circulating hours: | 0.33 | 01/30/20 11:53:36 WITs ReConnect MWD WITs COM8 |
| Total surveys: | 0 | |
| | 0.00 G | 01/30/20 11:53:24 WITs Dropout MWD WITs COM8 |
| Highest shock: | 51.30 °C | |
| Highest temperature: | | 01/30/20 11:15:14 WITs ReConnect RIG WITs COM8 |
| | 0.00 | |
| Current pump | 1324.00 | 01/30/20 11:14:58 WITs Dropout RIG WITs |

FIG. 43

Basin App
Rig 11 WITs ReConnect    Thu 1/30
This is a report for Rig 11 - 20202022 - 2 on Thu

WITS ReConnected
Thu Jan 30 2020
WITs was reconnected in the following run:

Generation Date: 01/30/20
Generation Time: 13:18:06
Location(Lat, Lng): ,
Location String:
Rig: Rig 11 Company: Basin Drilling Tools
Location: Kingman Arizona
API:
County:
Country: United States
Longitude:
Latitude:

Job: 20202022
Operating Company: CGI
Start Date: January 23 2020
Start Time: 23:30:00
Job Duration: 157.80 hour(s)

Run: 2
Sensor offset from bit: 52 ft
Gamma offset from bit: 0 ft
Tools: Eclipse 004

WITs reconnected for source MWD WITs on port COM8

FIG. 44

← 4500 reports@basindrillingtools.com
BasinApp Toolface Switch to MTF - Demo - TX 1/13/2020
Toolface has switched to MTF in the following

BasinApp Toolface Switch to MTF - Demo - TX-20191112-1

R  reports@basindrillingtools.com <reports@basindrillingtools.com>
1/13/2020 7:21 PM To: Amador Baggerly Save all attachments

| BasinReport_2020_01_13_18_52... 63.21 KB | BasinReport_2020_01_13_18_52... 369.47 KB |
| BasinReport_2020_01_13_18_52... 416 bytes | BasinReport_2020_01_13_18_52... 287.13 KB |
| BasinReport_2020_01_13_18_52... 2.52 KB | |

Toolface Switch to MTF
Generated on: 01/13/20 at 18:52:31

Details:
Operating Company: Stryker         API: 24-224-2062         Tools:
Company: Wenzel Downhole           Run: 1                    Pulser              P-1602
Tools                              Sensor offset: 38 ft      Directional Module  E-242
Rig: Demo                          Gamma offset: 42 ft       Battery 1           R-28
Well Name: Demo 2                  Longitude:                Battery 2           R-42
Location: Conference Room          Latitude:                 Gamma               G-66

Job: TX-20191112                                             Mud Motor
County: Harris                                               6.5 202
Country: United States
Start Date: November 12, 2019
Start Time: 06:23:11
Job Duration: 1500.49 hours(s)

| This run: | | This run: |
|---|---|---|
| Total feet drilled: | 0.00 | 01/13/20 18:52:31 Toolface switch to MTF. |
| Total circulating | 1.95 | 01/13/20 18:52:26 Toolface switch to MTF. |
| hours: | 3 | 01/13/20 18:52:14 Toolface switch to MTF. |
| Total surveys: | | 01/13/20 18:52:09 Toolface switch to MTF. |
| | 0.00 G | 01/13/20 18:51:57 Toolface switch to MTF. |
| Highest shock: | 78.80 °C | 01/13/20 18:51:52 Toolface switch to MTF. |

FIG. 47

Email Distribution
Email Address
Email Group

Mailer Configuration

SEND REPORTS TO THE FOLLOWING EMAIL ADDRESSES:

ABAGGERLY@BASINDRILLINGTOOLS.COM

SEND SURVEY REPORTS:
◉ When they are generated
○ Twice a Day
○ Once a Day

| − | + | SEND TEST EMAIL | EMAIL SURVEY REPORT |

76 UN-EMAILED REPORTS.

EMAIL NOW

CLOSE

| NOTIFICATION DISTRIBUTION | REPORTS | | | INCIDENT NOTIFICATION | | | | | |
|---|---|---|---|---|---|---|---|---|---|
| | Conformance | Survey | Daily | End of Run | Flatline | High Shock | MTF to GTF or vice versa | Differential Spike | WITS fallout | MWD & Standpipe pressure |
| FREQUENCY | 0 | 2 | 1 | 0 | 0 | 0 | 0 | 0 | 0 | 0 |
| TIME | | 1200 | 1200 | | | | | | | |
| Email/Group List | | | | | | | | | | |
| Group 1 | x | x | x | x | x | x | x | x | x | x |
| Group 2 | x | x | x | x | x | x | x | x | x | x |
| Group 3 | x | x | x | x | | | | | | |
| Email 10 | x | x | x | x | | | | | | |
| Email 18 | x | x | x | x | | | | | | |
| Email 3 | | x | x | x | | | | | | |

FREQUENCY: 0 Event Triggered
1 Once Per Day
2 Twice Per Day

TIME: 24-hour time(first report sent)

METHOD AND APPARATUS FOR USING A SURFACE PROCESSOR TO ELECTRONICALLY CONTROL COMPONENTS OF A TOLL DRILL STRING BASED AT LEAST ON MEASUREMENTS FROM A DOWNHOLE DEVICE

CROSS-REFERENCES TO RELATED APPLICATIONS

This application claims priority to and the benefit of U.S. Provisional Application Patent Ser. No. 63/030,561 filed May 27, 2020, the entire disclosure of which is hereby incorporated by reference.

TECHNICAL FIELD

The present disclosure pertains to a software application for use with well drilling operations. More particularly, the present disclosure pertains to a software application that can be used to monitor and optimize well drilling operations including, without limitation, measurement-while-drilling performance.

BACKGROUND

Drilling systems can be used for drilling well boreholes in the earth for extracting fluids, such as oil, water, and gas. The drilling systems include a drill string for boring the well borehole into a formation that contains the fluid to be extracted. The drill string includes tubing or a drill pipe, such as a pipe made-up of jointed sections, and a drilling assembly attached to the distal end of the drill string. The drilling assembly includes a drill bit at the distal end of the drilling assembly. Typically, the drill string, including the drill bit, is rotated to drill the well borehole. Often, the drilling assembly includes a mud motor that rotates the drill bit for boring the well borehole.

Obtaining downhole measurements during drilling operations is known as measurement while drilling (MWD) or logging while drilling (LWD). A downhole device, such as an MWD tool, is programmed with information such as which measurements to take and which data to transmit back to the surface while it is on the surface. The downhole device is then securely sealed from the environment and the high pressures of drilling and put into the well borehole. After the downhole device is retrieved from the well borehole, it is unsealed to retrieve data from the downhole device using a computer. To use the downhole device again, the device is sealed and put back into the well borehole. This process of sealing and unsealing the downhole device is time consuming and difficult, and if done wrong very expensive to fix, which increases the cost of drilling the well.

Conventional MWD systems measure downhole data and transmit such data to the surface where it can be displayed or utilized (such as, for example, to assist users with decision making regarding ongoing drilling operations). Similarly, conventional LWD systems generally include logging devices or sensors that acquire data regarding surrounding rock formations being penetrated. Frequently, such data is formatted in accordance with Wellsite Information Transfer Specification ("WITS"), an oil and gas industry standard for formatting text-based (ASCII) drilling data for transmission between two devices connected by serial ports or by an Ethernet link.

Typically, conventional MWD and LWD systems compile data (frequently comprising transferred data in WITS format and/or data from manual input) in order to generate work product reports such as, for example, logs, LAS files and survey reports. Such work product reports are thereafter often forwarded to a predetermined distribution list via email or other electronic transmission. In many cases, MWD and/or LWD data transferred in WITS format can also include "bad" or low quality data depending on drilling and other conditions.

SUMMARY

In some embodiments, a system includes a surface processor and a tool drill string having a downhole device including a downhole processor. The surface processor may include a memory storing instructions, and the surface processor may be communicatively coupled to the downhole processor. The surface processor may be configured to execute the instructions to receive one or more first measurements from the downhole device, and determine whether the one or more first measurements satisfy a threshold measurement. Responsive to determining the one or more first measurements satisfy the threshold measurement, the surface processor may electronically modify a weight on bit by a first amount and electronically modify a revolutions per minute of a motor by a second amount.

In some embodiments, a system may include a surface processor and a tool drill string having a downhole device including a downhole processor. The surface processor may include a memory storing instructions, and the surface processor may be communicatively coupled to the downhole processor. The surface processor may be configured to execute the instructions to receive dynamic data from the downhole device and drilling parameters from an electronic drilling recorder (EDR). The surface processor may determine, using one or more machine learning models generated by an artificial intelligence engine and the dynamic data, a risk probability of an undesirable event pertaining to the tool drill string. The surface processor may determine whether the risk probability satisfies a threshold level. Responsive to determining the risk probability satisfies the threshold level, the processing device may transmit a notification to a computing device.

In some embodiments, a method may be performed by the uphole processor executing any of the operations described herein.

In some embodiments, a tangible, non-transitory computer-readable medium may store instructions that, when executed, cause a processing device to perform any of the operations of any of the methods disclosed herein.

While multiple embodiments are disclosed, still other embodiments of the present disclosure will become apparent to those skilled in the art from the following detailed description, which shows and describes illustrative embodiments of the disclosure.

Accordingly, the drawings and detailed description are to be regarded as illustrative in nature and not restrictive.

BRIEF DESCRIPTION OF THE DRAWINGS

FIG. 3 is a diagram schematically illustrating a surface processor configured to communicate with the device through a surface connector and a contact module, such as a spearpoint or another contact module, according to embodiments of the disclosure.

FIG. 21 depicts a sample of data measured and available from a MWD operation that can be utilized with a software application, according to embodiments of the disclosure.

FIG. 22 depicts a sample of data measured and available from a MWD operation that can be utilized with a software application, according to embodiments of the disclosure.

FIG. 25 depicts an illustrative example of a survey report, which can be submitted to a governing regulatory agency, stored for later use or included with an end of well report, according to embodiments of the disclosure.

FIG. 27 depicts an illustrative example of a daily report, which can be stored for later use, utilized by on-site operator, or sent to a remote operations control center or predetermined distribution list, according to embodiments of the disclosure.

FIG. 28 depicts an illustrative example of a daily report, which can be stored for later use, utilized by on-site operator, or sent to a remote operations control center or predetermined distribution list, according to embodiments of the disclosure.

FIG. 30 depicts an illustrative example of a flatline notification alert generated by the software application of the present disclosure, according to embodiments of the disclosure.

FIG. 32 depicts an illustrative example of a flatline report, which can be stored for later use, utilized by on-site operator, or sent to a remote operations control center or predetermined distribution list, according to embodiments of the disclosure.

FIG. 33 depicts an illustrative example of a flatline report, which can be stored for later use, utilized by on-site operator, or sent to a remote operations control center or predetermined distribution list, according to embodiments of the disclosure.

FIG. 35 depicts an illustrative example of a flatline report, which can be stored for later use, utilized by on-site operator, or sent to a remote operations control center or predetermined distribution list, according to embodiments of the disclosure.

FIG. 36 depicts an illustrative example of a flatline report, which can be stored for later use, utilized by on-site operator, or sent to a remote operations control center or predetermined distribution list, according to embodiments of the disclosure.

FIG. 39 depicts an illustrative example of a differential pressure report, which can be stored for later use, utilized by on-site operator, or sent to a remote operations control center or predetermined distribution list, according to embodiments of the disclosure.

FIG. 40 depicts an illustrative example of a differential pressure report, which can be stored for later use, utilized by on-site operator, or sent to a remote operations control center or predetermined distribution list, according to embodiments of the disclosure.

FIG. 41 depicts an illustrative example of a WITs fallout report, which can be stored for later use, utilized by on-site operator, or sent to a remote operations control center or predetermined distribution list, according to embodiments of the disclosure.

FIG. 42 depicts an illustrative example of a WITs fallout report, which can be stored for later use, utilized by on-site operator, or sent to a remote operations control center or predetermined distribution list, according to embodiments of the disclosure.

FIG. 43 depicts an illustrative example of a WITs fallout report, which can be stored for later use, utilized by on-site operator, or sent to a remote operations control center or predetermined distribution list, according to embodiments of the disclosure.

FIG. 44 depicts an illustrative example of a WITs reconnect notification, which can be utilized by on-site operator, or sent to a remote operations control center or predetermined distribution list, according to embodiments of the disclosure.

FIG. 45 depicts an illustrative example of a MTF/GTF notification, which can be utilized by on-site operator, or sent to a remote operations control center or predetermined distribution list, according to embodiments of the disclosure.

FIG. 47 depicts an illustrative example of a MTF/GTF notification, which can be utilized by on-site operator, or sent to a remote operations control center or predetermined distribution list, according to embodiments of the disclosure.

FIG. 48 depicts an illustrative example of a MTF/GTF notification, which can be utilized by on-site operator, or sent to a remote operations control center or predetermined distribution list, according to embodiments of the disclosure.

FIG. 49 depicts an illustrative example of a predetermined email distribution list, according to embodiments of the disclosure.

DETAILED DESCRIPTION

Figure 1:
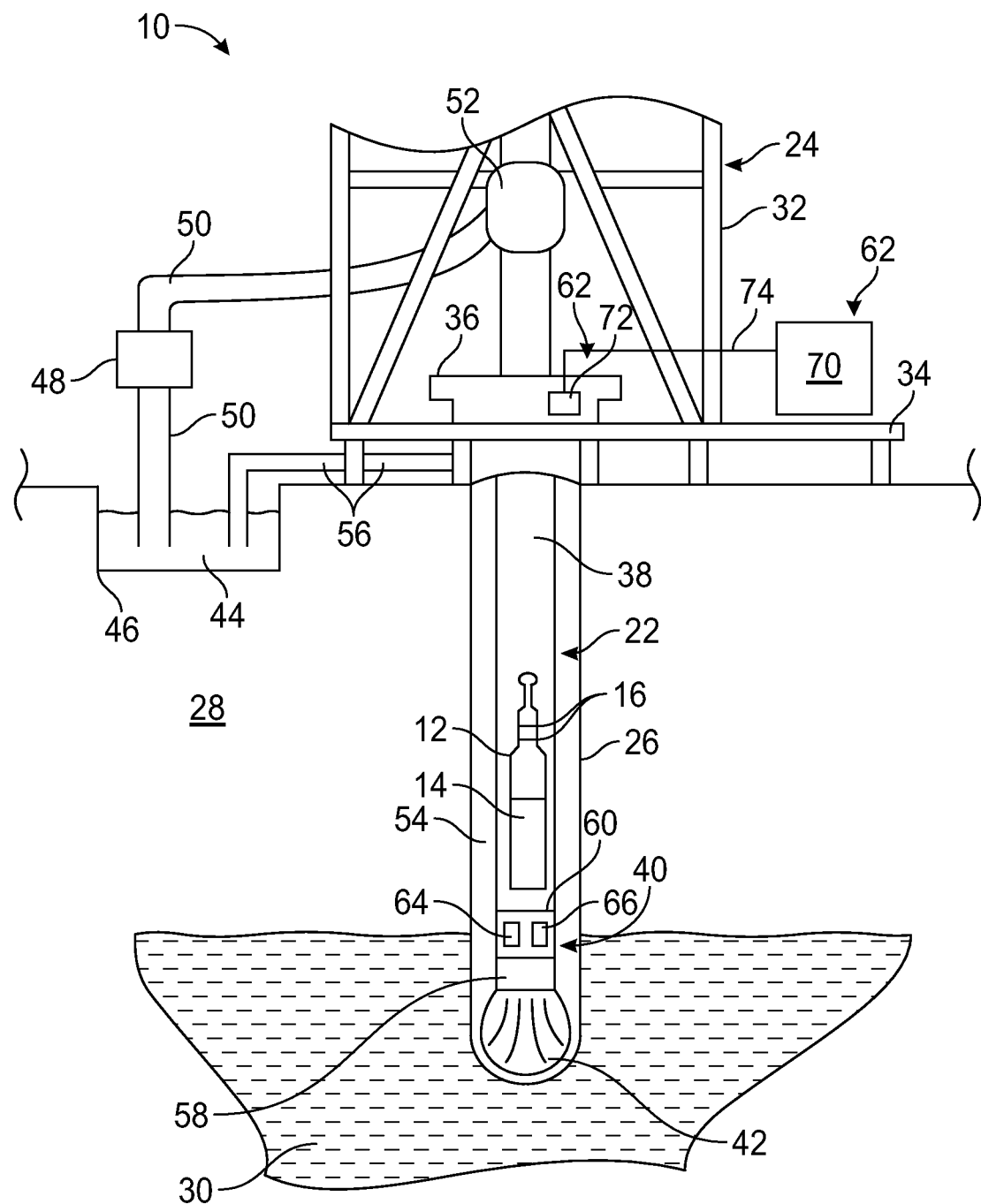
FIG. 1 is a diagram illustrating a system including a contact module configured for communicating with a downhole device, according to embodiments of the disclosure.

Often, a technical specialist, such as an MWD engineer, monitors MWD data, other drilling related data, and work product reports that may be generated. The engineer, who is often on-site on a drilling rig or other location, must carefully examine the transmitted data to identify and, when appropriate, screen out bad or low-quality data. Further, the engineer must monitor measured data and work product reports to ensure that drilling conditions remain within acceptable parameters and take corrective action when required. Often such corrective action should be taken quickly to avoid a problem from being permitted to get worse.

A technical problem includes determining an accuracy of drilling related data that results from operating conditions of a drilling operation and/or a format in which the data is transmitted. Further, another technical problem may include correcting the erroneous data prior to transmittal of a report to one or more computing devices connected via a computer network. Further, another technical problem includes determining when an undesirable event may occur and executing control instructions to case an operating parameter of one or more hardware devices included in a tool drill string to change.

The present disclosure addresses at least these technical problems by providing a technical solution that enables using an artificial intelligence engine to monitor received data, identify erroneous data, modify the erroneous data, determine when an undesirable event may occur, perform control instructions to prevent the undesirable event from occurring, among other things. The disclosed systems and methods may perform, without limitation, reporting of a measurement while drilling (MWD) setup, creating and distributing daily MWD information reports and rig-site trouble shooting. In some embodiments, data should be collected from an MWD decoder and an electronic drilling recorder (EDR) system (i.e. Pason) to create reports, monitor measurements, identify potential trouble areas and distribute incident notifications based on different preselected rig parameters.

Further, some embodiments of the present disclosure describe a system for communicating with a device that is configured to be put down a well borehole, i.e., a downhole device. The system is used to communicate with the downhole device at the surface and with the downhole device physically connected in the downhole tool drill string, such as an MWD drill string. The system includes a contact module that is physically and electrically coupled to the downhole device in the downhole tool drill string. The contact module includes at least one external electrical contact that is electrically coupled to the downhole device for communicating with the downhole device through the at least one external electrical contact. The contact module, including the at least one external electrical contact and insulators around the at least one external electrical contact, is pressure sealed to prevent drilling fluid and other fluids from invading the interior of the contact module. This prevents the drilling fluid and other fluids from interfering with communications between the contact module and the downhole device, such as by preventing short circuits in the contact module.

The contact module can be situated anywhere in the downhole tool drill string. In embodiments, the contact module is situated at the proximal end of the downhole tool drill string. In some embodiments, the contact module is a spearpoint contact module situated at the proximal end of the downhole tool drill string and configured for lifting or raising and lowering the downhole tool drill string. In some embodiments, the contact module is situated in the middle of the downhole tool drill string, such that the contact module includes proximal and distal ends configured to be connected to other modules in the downhole tool drill string. In other embodiments, the contact module can be situated at the distal end of the downhole tool drill string. In each of the embodiments, the contact module maintains mechanical integrity in the downhole tool drill string while the downhole tool drill string is lifted or raised and lowered in the well borehole. In various embodiments, the external electrical contacts are integrated into the drilling system, rather than into a distinct contact module. In such an embodiment, for example, the external electrical contacts are integrated into any portion, component, or aspect of the MWD drill string or other downhole device.

Throughout this disclosure, a spearpoint contact module is described as an example of a contact module of the disclosure. While in this disclosure, the spearpoint contact module is used as one example of a contact module, the components, ideas, and concepts illustrated and/or described in relation to the spearpoint contact module can also be and are used in other contact modules, such as contact modules situated in the middle of the downhole tool drill string or other contact modules situated at the proximal or distal end of the downhole tool drill string.

Communicating data between the downhole processor and a surface processor may be performed using various types of telemetry. For example, mud pulse telemetry and/or electromagnetic (EM) telemetry. EM telemetry may be capable of transmitting data at a faster rate than mud pulse telemetry. However, EM telemetry is not as robust as mud pulse telemetry and EM telemetry may fail in certain situations (e.g., deep wells or highly conductive wells). Accordingly, some of the disclosed embodiments provide techniques that leverage the benefits of both forms of telemetry to provide enhanced communications. For example, in some embodiments, a downhole processor may operate in mud pulse mode by default to ensure a connection is maintained with the surface processor. The downhole processor may perform a handshake by transmitting a message via an EM mode, and if the downhole processor receives a corresponding EM response from the surface processor, the downhole processor may switch from a mud pulse mode to the EM mode to leverage the faster data transmission rate. If the EM mode disconnects or the downhole processor determines a certain fluid flow is below a threshold level, the downhole processor may switch back to operating in mud pulse mode. Accordingly, technical benefits of the disclosure may include ensuring connectivity is maintained throughout the process and improving data transmission rates when available.

FIG. 1 is a diagram illustrating a system 10 including a contact module 12 configured for communicating with a downhole device 14, according to embodiments of the disclosure. As shown in FIG. 1, the contact module 12 is a spearpoint. The spearpoint 12 is mechanically and electrically coupled to the device 14 and includes at least one external contact 16 for communicating with the device 14 through the at least one external contact 16. The spearpoint 12 is physically connected to the device 14 and configured for lifting at least the spearpoint 12 and the device 14. The spearpoint 12 is configured to be mechanically strong enough to maintain mechanical integrity while lifting the spearpoint 12 and the device 14.

In embodiments, the device 14 gathers data downhole and stores the data for later retrieval. In embodiments, the device 14 is an MWD tool. In other embodiments, the device 14 is one or more other suitable devices, including devices that gather data downhole.

Examples described herein are described in relation to a spearpoint 12. However, in some embodiments, the mechanical and electrical aspects of the spearpoint 12, including the electrical contact configurations of the spearpoint 12, described herein, can be used in other applications and on other items. In some embodiments, the mechanical and electrical aspects of the spearpoint 12, including the electrical contact configurations of the spearpoint 12, described herein, are or can be used in other contact modules, such as contact modules situated in the middle of the downhole tool drill string or other contact modules situated at the proximal or distal end of the downhole tool drill string.

The system 10 includes a borehole drill string 22 and a rig 24 for drilling a well borehole 26 through earth 28 and into a formation 30. After the well borehole 26 has been drilled, fluids such as water, oil, and gas can be extracted from the formation 30. In some embodiments, the rig 24 is situated on a platform that is on or above water for drilling into the ocean floor.

In one example, the rig 24 includes a derrick 32, a derrick floor 34, a rotary table 36, and the drill string 22. The drill string 22 includes a drill pipe 38 and a drilling assembly 40 attached to the distal end of the drill pipe 38 at the distal end of the drill string 22.

The drilling assembly 40 includes a drill bit 42 at the bottom of the drilling assembly 40 for drilling the well borehole 26.

A fluidic medium, such as drilling mud 44, is used by the system for drilling the well borehole 26. The fluidic medium circulates through the drill string 22 and back to the fluidic medium source, which is usually at the surface. In embodiments, drilling mud 44 is drawn from a mud pit 46 and circulated by a mud pump 48 through a mud supply line 50 and into a swivel 52. The drilling mud 44 flows down through an axial central bore in the drill string 22 and through jets (not shown) in the lower face of the drill bit 42. Borehole fluid 54, which contains drilling mud 44, formation cuttings, and formation fluid, flows back up through the annular space between the outer surface of the drill string 22 and the inner surface of the well borehole 26 to be returned to the mud pit 46 through a mud return line 56. A filter (not shown) can be used to separate formation cuttings from the drilling mud 44 before the drilling mud 44 is returned to the mud pit 46. In some embodiments, the drill string 22 has a downhole drill motor 58, such as a mud motor, for rotating the drill bit 42.

In embodiments, the system 10 includes a first module 60 and a second module 62 that are configured to communicate with one another, such as with the first module 60 situated downhole in the well borehole 26 and the second module 62 at the surface. In embodiments, the system 10 includes the first module 60 situated at the distal end of the drill pipe 38 and the drill string 22, and the second module 62 attached to the drill rig 24 at the proximal end of the drill string 22 at the surface. In embodiments, the first module 60 is configured to communicate with the device 14, such as through a wired connection or wirelessly.

The first module 60 includes a downhole processor 64 and a pulser 66, such as a mud pulse valve, communicatively coupled, such as by wire or wirelessly, to the downhole processor 64. The pulser 66 is configured to provide a pressure pulse in the fluidic medium in the drill string 22, such as the drilling mud 44. The second module 62 includes an uphole processor 70 and a pressure sensor 72 communicatively coupled, such as by wire 74 or wirelessly, to the uphole processor 70.

In some embodiments, the pressure pulse is an acoustic signal and the pulser 66 is configured to provide an acoustic signal that is transmitted to the surface through one or more transmission pathways. These pathways can include the fluidic medium in the drill string 22, the material such as metal that the pipe is made of, and one or more other separate pipes or pieces of the drill string 22, where the acoustic signal can be transmitted through passageways of the separate pipes or through the material of the separate pipes or pieces of the drill string 22. In embodiments, the second module 62 includes the uphole processor 70 and an acoustic signal sensor configured to receive the acoustic signal and communicatively coupled, such as by wire or wirelessly, to the uphole processor 70.

Each of the downhole processor 64 and the uphole processor 70 is a computing machine that includes memory that stores executable code that can be executed by the computing machine to perform processes and functions of the system 10. In embodiments, the computing machine is one or more of a computer, a microprocessor, and a microcontroller, or the computing machine includes multiples of a computer, a microprocessor, and/or a micro-controller. In embodiments, the memory is one or more of volatile memory, such as random access memory (RAM), and non-volatile memory, such as flash memory, battery-backed RAM, read only memory (ROM), varieties of programmable read only memory (PROM), and disk storage. Also, in embodiments, each of the first module 60 and the second module 62 includes one or more power supplies for providing power to the module.

As illustrated in FIG. 1, the spearpoint contact module 12 is physically connected to the device 14. The spearpoint 12 is made from material that is strong enough for lifting the spearpoint 12 and the device 14 from the well borehole 26 and for otherwise lifting the spearpoint 12 and the device 14. In some embodiments, the spearpoint 12 is made from one or more pieces of metal. In some embodiments, the spearpoint 12 is made from one or more pieces of steel.

The spearpoint 12 includes the at least one external contact 16 that is electrically coupled to the device 14 for communicating with the device 14 through the at least one external contact 16. In embodiments, the at least one external contact 16 is electrically coupled to the device 14 through one or more wires. In embodiments, the at least one external contact 16 is configured to provide one or more of CAN bus communications, RS232 communications, and RS485 communications between the device 14 and a surface processor.

Figure 2A:
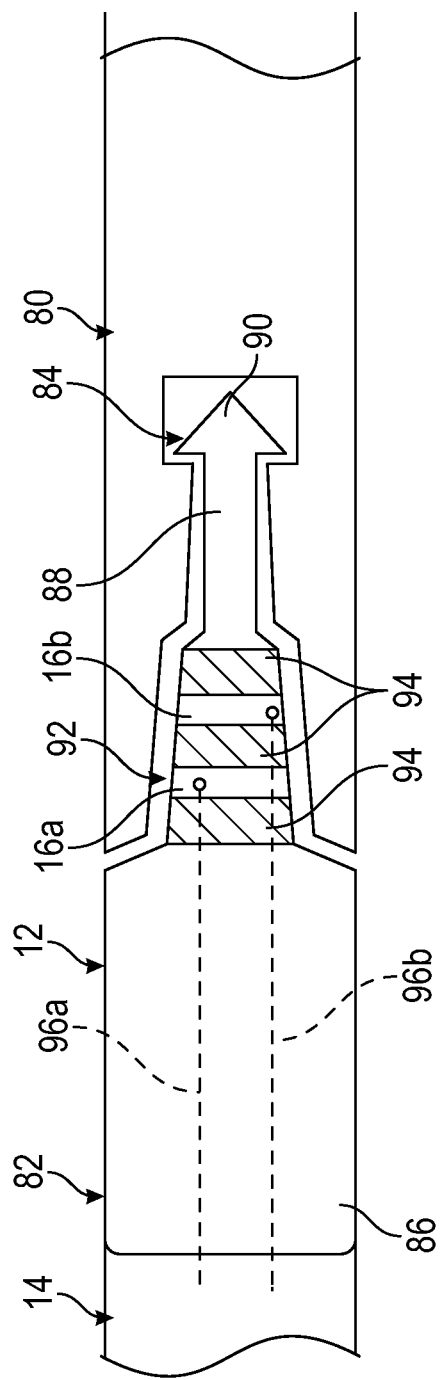
FIG. 2A is a diagram illustrating the spearpoint contact module engaged by an over shot tool for lifting the spearpoint and the device, according to embodiments of the disclosure.

FIG. 2A is a diagram illustrating the spearpoint contact module 12 engaged by an over shot tool 80 for lifting the spearpoint 12 and the device 14, according to embodiments of the disclosure. The spearpoint 12 is configured to be manipulated by a tool, such as a soft release tool, to lower the spearpoint 12 on a cable into the well borehole 26 and to release the spearpoint 22 when the spearpoint 12 has been placed into position. The over shot tool 80 is used to engage the spearpoint 12 to retrieve the spearpoint 12 from the well borehole 26 and bring the spearpoint 12 to the surface. In embodiments, the over shot tool 80 is used for lifting the spearpoint 12 and the device 14 from the well borehole 26 and/or for otherwise lifting the spearpoint 12 and the device 14.

The spearpoint 12 includes a distal end 82 and a proximal end 84. The spearpoint 12 includes an end shaft 86 at the distal end 82 and a latch rod 88 and nose 90 at the proximal end 84. The end shaft 86 is configured to be physically connected to the device 14, and the latch rod 88 and the nose 90 are configured to be engaged by the over-shot tool 80 for lifting the spearpoint 12 and the device 14. In embodiments, the end shaft 86 is configured to be threaded onto or into the device 14. In embodiments, the device 14 is an MWD tool and the end shaft 86 is configured to be threaded onto or into the MWD tool.

The spearpoint 12 further includes a contact shaft 92 situated between the end shaft 86 and the latch rod 88. The contact shaft 92 includes the at least one external contact 16 that is configured to be electrically coupled to the device 14. In this example, the contact shaft 92 includes two annular ring external contacts 16a and 16b that are each configured to be electrically coupled to the device 14 for communicating with the device 14 through the external contacts 16a and 16b. These external contacts 16a and 16b are insulated from each other and from other parts of the spearpoint 12 by insulating material 94. In some embodiments, the external contacts 16a and 16b are configured to be electrically coupled to the device 14 through wires 96a and 96b, respectively. In other embodiments, the spearpoint 12 can include one external contact or more than two external contacts.

Figure 2B:
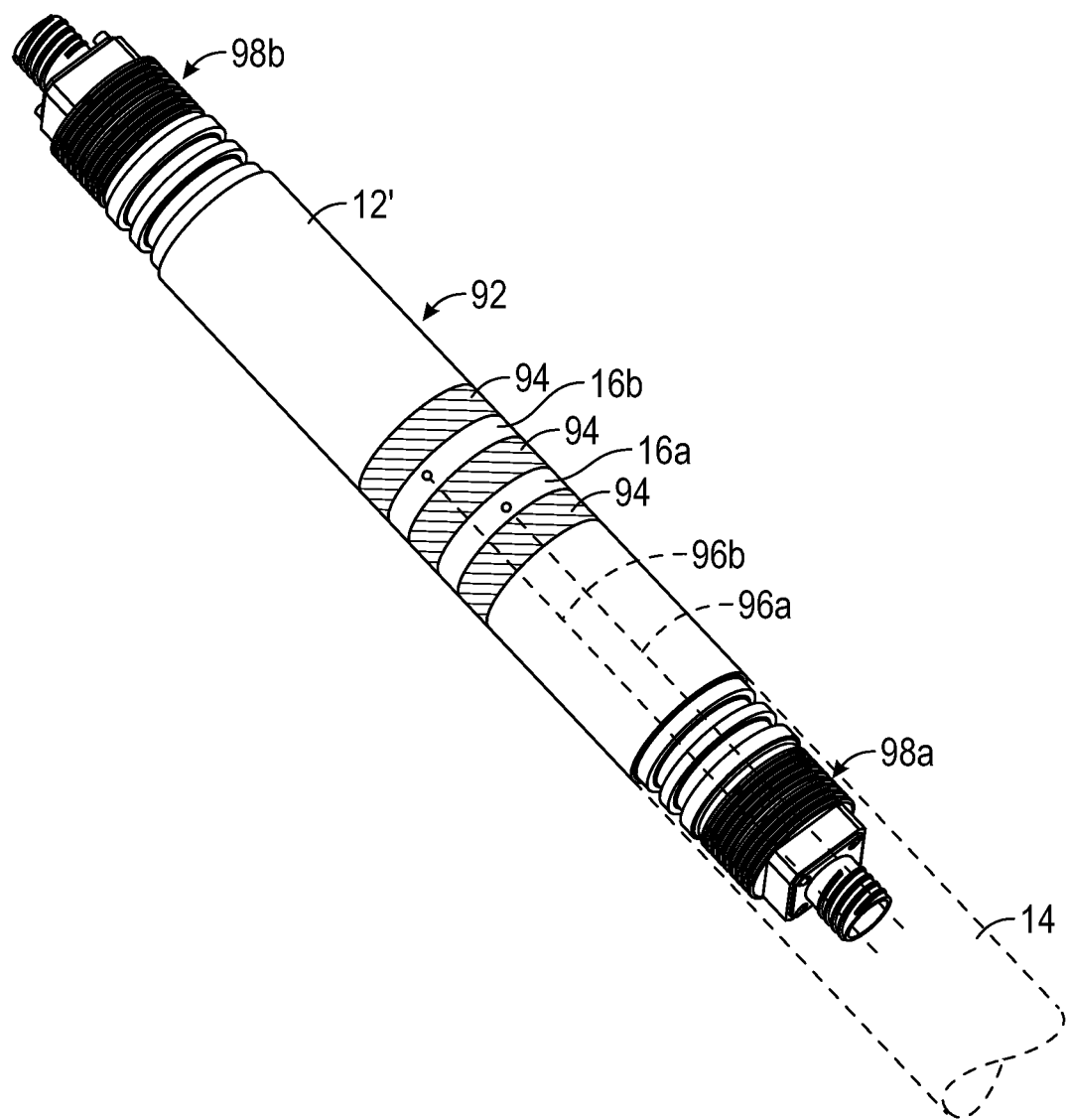
FIG. 2B is a diagram illustrating a contact module that is configured to be situated in the middle of a downhole drill string and for communicating with the downhole device, according to embodiments of the disclosure.

FIG. 2B is a diagram illustrating a contact module 12' that is configured to be situated in the middle of a downhole tool drill string and for communicating with the downhole device 14, according to embodiments of the disclosure. The contact module 12' is another example of a contact module of the present disclosure.

The contact module 12' includes a downhole or distal end 98a and an uphole or proximal end 98b. The distal end 98a is configured to be connected, such as by threads, onto or into the downhole device 14 or onto or into another module of the downhole tool drill string. The proximal end 98b is configured to be connected, such as by threads, onto or into another module of the downhole drill string, such as a retrieval tool. In embodiments, the device 14 is an MWD tool.

The contact module 12' includes a contact shaft 92 situated between the distal end 98a and the proximal end 98b. The contact shaft 92 includes the at least one external contact 16 that is configured to be electrically coupled to the device 14. In this example, the contact shaft 92 includes two annular ring external contacts 16a and 16b that are each configured to be electrically coupled to the device 14 for communicating with the device 14 through the external contacts 16a and 16b. These external contacts 16a and 16b are insulated from each other and from other parts of the contact module 12' by insulating material 94. In some embodiments, the external contacts 16a and 16b are configured to be electrically coupled to the device 14 through wires 96a and 96b, respectively. In some embodiments, the contact module 12' can include one external contact or more than two external contacts.

FIG. 3 is a diagram schematically illustrating a surface processor 100 configured to communicate with a downhole device 14 through a surface connector 102 and a contact module 12, such as a spearpoint or a contact module 12', according to embodiments of the disclosure. The proximal end 84 of the spearpoint 12 is inserted into the surface connector 102 and the distal end 82 of the spearpoint 12 is physically connected, such as by threads, to the proximal end 104 of the device 14. In drilling operations, the proximal end 84 of the spearpoint 12 is situated uphole and the distal end 106 of the device 14 is situated downhole. In other embodiments, the surface connector 102 is configured to engage a different contact module, such as contact module 12', for communicating with the device 14 through the surface connector 102 and the contact module 12'.

The surface processor 100 is a computing machine that includes memory that stores executable code that can be executed by the computing machine to perform the processes and functions of the surface processor 100. In embodiments, the surface processor 100 includes a display 108 and input/output devices 110, such as a keyboard and mouse. In embodiments, the computing machine is one or more of a computer, a microprocessor, and a micro-controller, or the computing machine includes multiples of a computer, a microprocessor, and/or a micro-controller. In embodiments, the memory in the surface processor 100 includes one or more of volatile memory, such as RAM, and non-volatile memory, such as flash memory, battery-backed RAM, ROM, varieties of PROM, and disk storage. Also, in embodiments, the surface processor 100 includes one or more power supplies for providing power to the surface processor 100.

The surface connector 102 is configured to receive the spearpoint 12 and includes at least one surface electrical contact 112 that is electrically coupled to the surface processor 100 and configured to make electrical contact with the at least one external contact 16 on the spearpoint 12. In embodiments, the surface connector 102 includes multiple surface electrical contacts 112 configured to make electrical contact with corresponding external contacts 16 on the contact module, such as the spearpoint contact module 12 or the contact module 12'.

As illustrated in FIG. 3, the surface connector 102 includes two surface electrical contacts 112a and 112b that are insulated from each other and electrically coupled to the surface processor 100 by communications paths 114a and 114b, such as wires. Also, the spearpoint 12 includes two external contacts 16a and 16b that are electrically coupled to the device 14 through communications paths 96a and 96b, such as wires. The two surface electrical contacts 112a and 112b make electrical contact with the two external contacts 16a and 16b of the spearpoint 12, where surface electrical contact 112a makes electrical contact with the external contact 16a and surface electrical contact 112b makes electrical contact with the external contact 16b. Thus, the surface processor 100 is communicatively coupled to the device 14 through communications paths 114a and 114b, the two surface electrical contacts 112a and 112b, the two external contacts 16a and 16b, and communications paths 96a and 96b.

Also, in embodiments, the surface connector 102 includes one or more wiper seals 116 configured to clean the two external contacts 16a and 16b (or the at least one external contact 16) on the spearpoint 12 as the surface connector 102 is coupled onto the spearpoint 12. This wipes the two external contacts 16a and 16b clean prior to making electrical contact with the surface electrical contacts 112a and 112b of the surface connector 102.

In embodiments, the device 14 is an MWD tool 120 enclosed in one or more barrels of an MWD system string. The MWD tool 120 includes one or more of a transmitter 122, a gamma ray sensor 124, a controller 126 such as a directional controller, a sensor system 128 including one or more other sensors, and at least one battery 130. In embodiments, the transmitter 122 includes at least one of a pulser, a positive mud pulser, a negative mud pulser, an acoustic transceiver, an electromagnetic transceiver, and a piezo transceiver. In embodiments, the gamma ray sensor 124 includes at least one of a proportional gamma ray sensor, a spectral gamma ray sensor, a bulk gamma ray sensor, a resistivity sensor, and a neutron density sensor. In embodiments, the controller 126 includes at least one of a processor, power supplies, and orientation sensors.

The MWD tool 120 is configured to acquire downhole data and either transmit the value to the surface or store the downhole data for later retrieval once on the surface. The controller 126 includes a processor that is a computing machine that includes memory that stores executable code that can be executed by the computing machine to perform the processes and functions of the MWD tool 120. In embodiments, the computing machine is one or more of a computer, a microprocessor, and a micro-controller, or the computing machine includes multiples of a computer, a microprocessor, and/or a micro-controller. In embodiments, the memory is one or more of volatile memory, such as RAM, and non-volatile memory, such as flash memory, battery-backed RAM, ROM, varieties of PROM, and disk storage. Also, in embodiments, the controller 126 includes one or more power supplies for providing power to the MWD tool 120. In embodiments, the MWD tool 120 is configured to transmit at least some of the acquired data to the surface via the transmitter 122 when the MWD tool 120 is downhole.

In some embodiments, the MWD tool 120 is equipped with large, commercial grade accelerometers, such as aerospace inertial grade accelerometers, that are highly accurate sensors. Also, in some embodiments, the MWD tool 120 is equipped with fluxgate magnetometers, which are known for their high sensitivity. In some embodiments, the MWD tool 120 is an integrated tool configured to use micro electromechanical system (MEMS) accelerometers and solid-state magnetometers, which require less power and fewer voltage rails than the commercial grade sensors. Also, the MEMS accelerometers and solid-state magnetometers provide for a more compact MWD tool 120 that can be more reliable, durable, and consume less power while still providing the same level of accuracy.

In operation, the surface connector 102 is coupled to the spearpoint 12, such as by sliding the surface connector 102 onto the spearpoint 12. In some embodiments, the surface connector 102 includes the one or more wiper seals 116 that clean the two external contacts 16a and 16b on the spearpoint 12 as the surface connector 102 is slid onto the spearpoint 12. This wipes the two external contacts 16a and 16b clean prior to making electrical contact with the surface electrical contacts 112a and 112b of the surface connector 102.

In some embodiments, after cleaning the two external contacts 16a and 16b by hand or with the one or more wiper seals 116, the two external contacts 16a and 16b are energized or activated for communications with the device 14.

With the surface processor 100 communicatively coupled to the device 14 through the two surface electrical contacts 112a and 112b and the two external contacts 16a and 16b of the spearpoint 12, the surface processor 100 communicates with the device 14 through the surface connector 102 and the spearpoint 12. In some embodiments, communicating with the device 14 includes one or more of CAN bus communications, RS232 communications, and RS485 communications.

Figure 4:
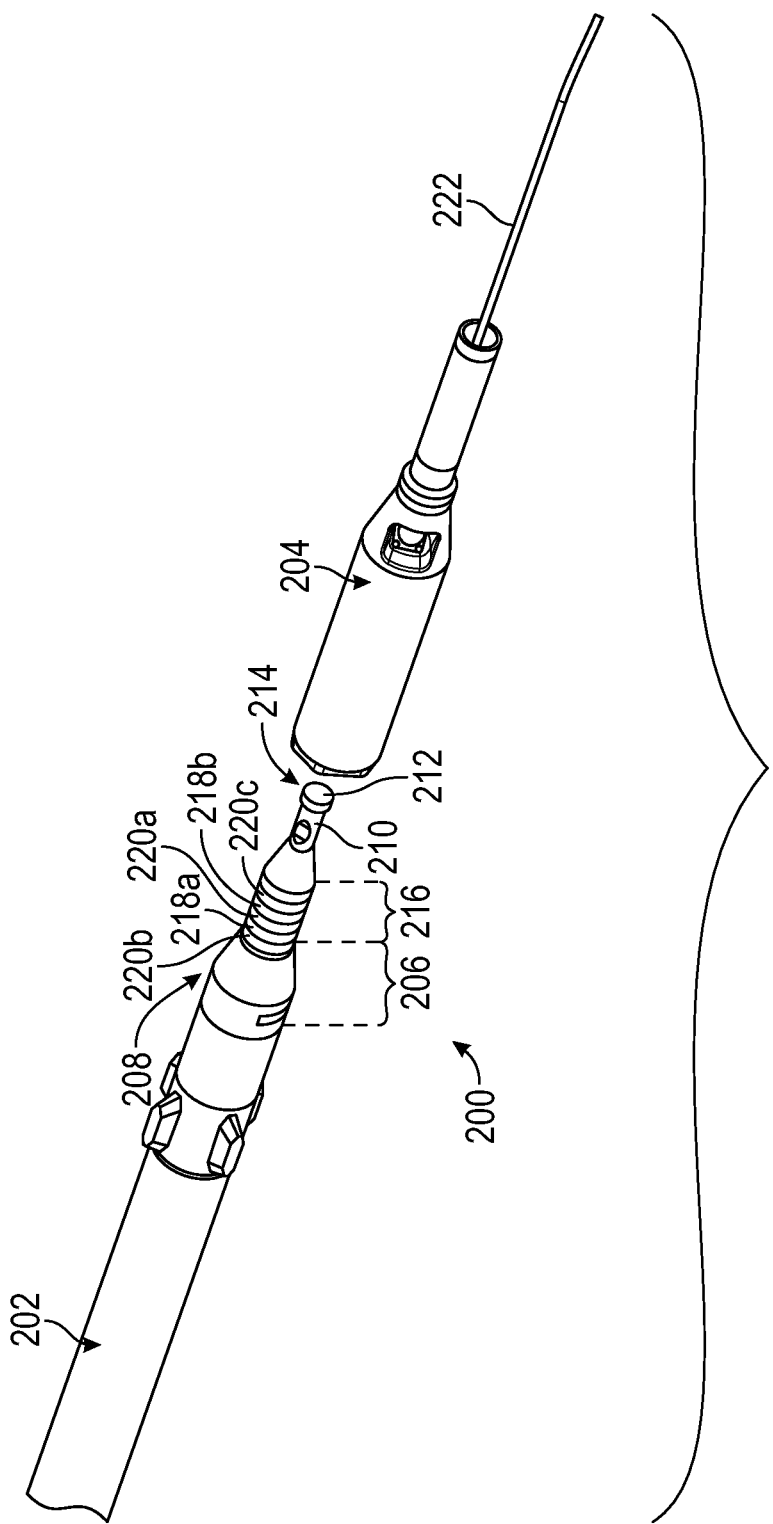
FIG. 4 is a diagram illustrating a spearpoint connected to a device and a surface connector configured to be coupled onto the spearpoint, according to embodiments of the disclosure.

FIG. 4 is a diagram illustrating a spearpoint contact module 200 connected to a device 202 and a surface connector 204 configured to be coupled onto the spearpoint 200, according to embodiments of the disclosure. In some embodiments, the spearpoint 200 is like the spearpoint 12. In some embodiments, the device 202 is like the device 14. In some embodiments, the device 202 is like the MWD tool 120. In some embodiments, the surface connector 204 is like the surface connector 102.

The spearpoint 200 includes an end shaft 206 at a distal end 208 and a latch rod 210 and nose 212 at a proximal end 214, where in drilling operations, the distal end 208 is situated downhole and the proximal end 214 is situated uphole. The end shaft 206 is physically connected to the device 202, and the latch rod 210 and the nose 212 are configured to be engaged by an over-shot tool for lifting the spearpoint 200 and the device 202. In embodiments, the end shaft 206 is configured to be threaded onto or into the device 202. In embodiments, the device 202 includes the MWD tool 120 and the end shaft 206 is configured to be threaded onto or into the MWD tool 120.

The spearpoint 200 includes a contact shaft 216 situated between the end shaft 206 and the latch rod 210. The contact shaft 216 includes two external electrical contacts 218a and 218b that are each configured to be electrically coupled to the device 202 for communicating with the device 202 through the contacts 218a and 218b. In embodiments, one or more of the contacts 218a and 218b is an annular ring electrical contact. In embodiments, the contacts 218a and 218b are electrically coupled to the device 202 through wires. In embodiments, the spearpoint 200 can include one external electrical contact or more than two external electrical contacts.

The contacts 218a and 218b are insulated from each other and from other parts of the spearpoint 200 by insulating material. The contacts 218a and 218b are insulated from each other by insulator 220a that is situated between the contacts 218a and 218b. Also, contact 218a is insulated from the end shaft 206 at the distal end 208 by insulator 220b and contact 218b is insulated from the latch rod 210 and the proximal end 214 by insulator 220c. In embodiments, one or more of the insulators 220a, 220b, and 220c is an annular ring insulator. In embodiments, one or more of the insulators 220a, 220b, and 220c is made from one or more of ceramic, rubber, and plastic.

The surface connector 204 is configured to receive the proximal end 214 of the spearpoint 200, including the latch rod 210 and the nose 212, and the contact shaft 216 of the spearpoint 200. The surface connector 204 includes two or more surface electrical contacts (not shown in FIG. 4) that are electrically coupled to a surface processor, such as surface processor 100, by communications path 222. These two or more surface electrical contacts are configured to make electrical contact with the spearpoint contacts 218a and 218b when the spearpoint 200 is inserted into the surface connector 204. Thus, the surface processor such as surface processor 100 is communicatively coupled to the device 202 through the two or more surface electrical contacts of the surface connector 204 and the two spearpoint contacts 218a and 218b of the spearpoint 200.

Also, in embodiments, the surface connector 204 includes one or more wiper seals that clean the spearpoint contacts 218a and 218b as the surface connector 204 is coupled onto the spearpoint 200. This wipes the spearpoint contacts 218a and 218b clean prior to making electrical contact with the surface electrical contacts of the surface connector 204.

Figure 5:
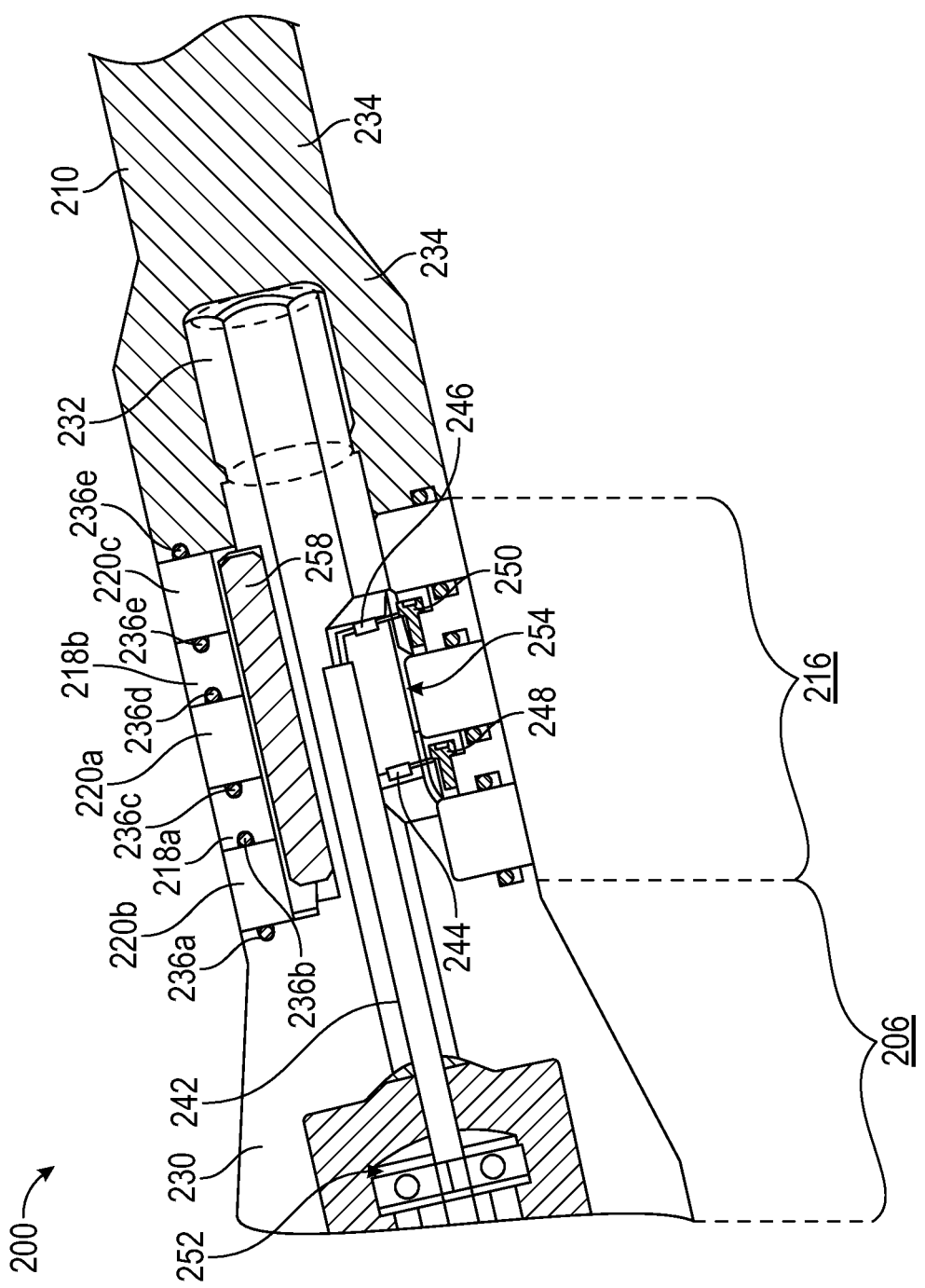
FIG. 5 is a diagram illustrating the spearpoint including at least portions of the end shaft, the contact shaft, and the latch rod, according to embodiments of the disclosure.
Figure 6:
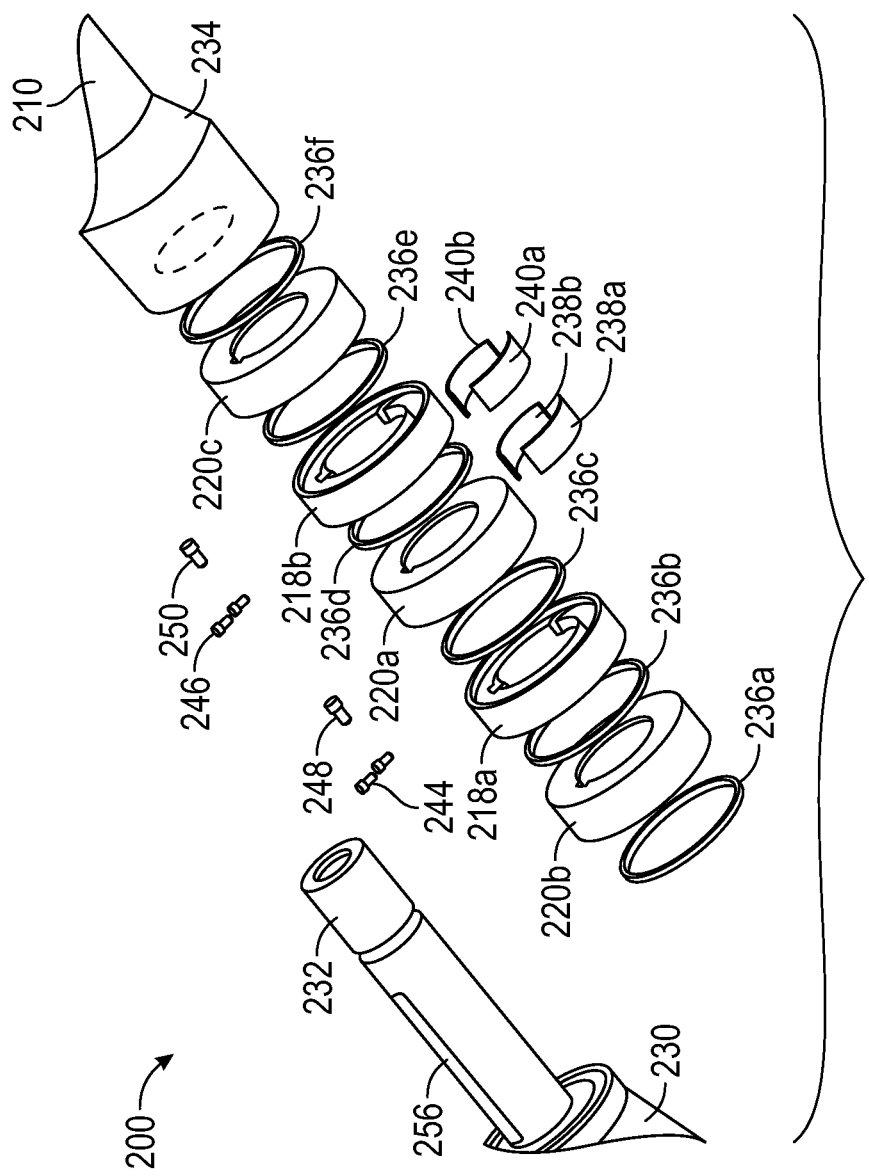
FIG. 6 is an exploded view diagram of the spearpoint shown in FIG. 5, according to embodiments of the disclosure.

FIG. 5 is a diagram illustrating the spearpoint 200 including at least portions of the end shaft 206, the contact shaft 216, and the latch rod 210, according to embodiments of the disclosure, and FIG. 6 is an exploded view diagram of the spearpoint 200 shown in FIG. 5, according to embodiments of the disclosure. As described above, the spearpoint contact module 12 is one example of a contact module of the disclosure, such that the components, ideas, and concepts illustrated and/or described in relation to the spearpoint contact module 12 can also be used in other contact modules, such as contact module 12' configured to be situated in the middle of the downhole tool drill string or other contact modules situated at the proximal or distal end of the downhole tool drill string.

Referencing FIGS. 5 and 6, the end shaft 206 includes a first member 230 that includes a central shaft 232, and the latch rod 210 includes a second member 234. The central shaft 232 of the first member 230 extends through the external electrical contacts 218a and 218b and insulators 220a-220c of the contact shaft 216 and into the second member 234. The central shaft 232 is a tensile load bearing member. The central shaft 232 engages the second member 234, such that the first member 230 and the second member 234 are secured together to maintain mechanical integrity of the spearpoint 200. In embodiments, the central shaft 232 and the second member 234 include threads, such that the central shaft 232 and the second member 234 are threaded together. In embodiments, the first member 230 is made from metal, such as steel. In embodiments, the second member 234 is made from metal, such as steel. In embodiments, the electrical contacts 218a and 218b are made from metal.

The contact shaft 216 is situated between the end shaft 206 and the latch rod 210 and includes the two external electrical contacts 218a and 218b and the three insulators 220a-220c. The contacts 218a and 218b are insulated from each other and from other parts of the spearpoint 200 by the insulators 220a-220c. The contacts 218a and 218b are insulated from each other by insulator 220a that is situated between the contacts 218a and 218b. Also, contact 218a is insulated from the end shaft 206 by insulator 220b, and contact 218b is insulated from the latch rod 210 and the second member 234 by insulator 220c. In embodiments, one or more of the insulators 220a, 220b, and 220c is made from one or more of ceramic, rubber, and plastic.

The contact shaft 216 also includes six o-ring seals 236a-236f that are situated between the contacts 218a and 218b and the insulators 220a-220c, and between insulator 220b and the first member 230, and insulator 220c and the second member 234. The o-rings 236a-236f are configured to resist or prevent fluid from invading through the contact shaft 216 and to the central shaft 232. The contacts 218a and 218b, insulators 220a, 220b, and 220c, and o-rings 236a-236f provide a pressure seal for the spearpoint contact module 12, such that the spearpoint 12 is pressure sealed to prevent drilling fluid and other fluids from invading the contact module. This prevents the drilling fluid and other fluids from interfering with communications between the spearpoint 12 and the downhole device 14, such as by preventing short circuits. In embodiments, one or more of the o-rings 236a-236f is made from one or more of ceramic, rubber, and plastic.

Each of the contacts 218a and 218b is an annular ring electrical contact that is slid over or onto the central shaft 232, and each of the three insulators 220a-220c is an annular ring insulator that is slid over or onto the central shaft 232. Also, each of the o-rings 236a-236f is slid over or onto the central shaft 232.

Electrical contact 218a is further insulated from the central shaft 232 by semicircular insulators 238a and 238b inserted between the electrical contact 218a and the central shaft 232, and electrical contact 218b is further insulated from the central shaft 232 by semicircular insulators 240a and 240b inserted between the electrical contact 218b and the central shaft 232. In embodiments, the semicircular insulators 238a and 238b are made from one or more of ceramic, rubber, and plastic. In embodiments, the semicircular insulators 240a and 240b are made from one or more of ceramic, rubber, and plastic.

The external electrical contacts 218a and 218b are electrically coupled to communications path 242 by electrical connectors 244 and 246, respectively. Electrical contact 218a is electrically coupled to connector 244, which is attached to the electrical contact 218a by screw 248. Electrical contact 218b is electrically coupled to connector 246, which is attached to the electrical contact 218b by screw 250. Each of the electrical connectors 244 and 246 is further electrically coupled to the communications path 242. In embodiments, each of the electrical connectors 244 and 246 is electrically coupled to an individual wire that is further electrically coupled to the device 202. In embodiments, the communications path 242 is connected to the first member 230, such as by a strain relief 252.

The central shaft 232 includes a first slot 254 that provides an opening or path for the connections of the connectors 244 and 246 to the communications path 242. The central shaft 232 includes a second slot 256 that is configured to receive a keying element or key 258. Where, in embodiments, the electrical contacts 218a and 218b are keyed such that the key 258 prevents the electrical contacts 218a and 218b and the central shaft 232 from spinning in relation to one another, which prevents twisting off the connections between the connectors 244 and 246 and the communications path 242. Thus, the first member 230 and the electrical contacts 218a and 218b are keyed to prevent rotation of the first member 230 in relation to the electrical contacts 218a and 218b. In embodiments, the key 258 includes one or more of nylon, ceramic, rubber, and plastic.

Figure 7:
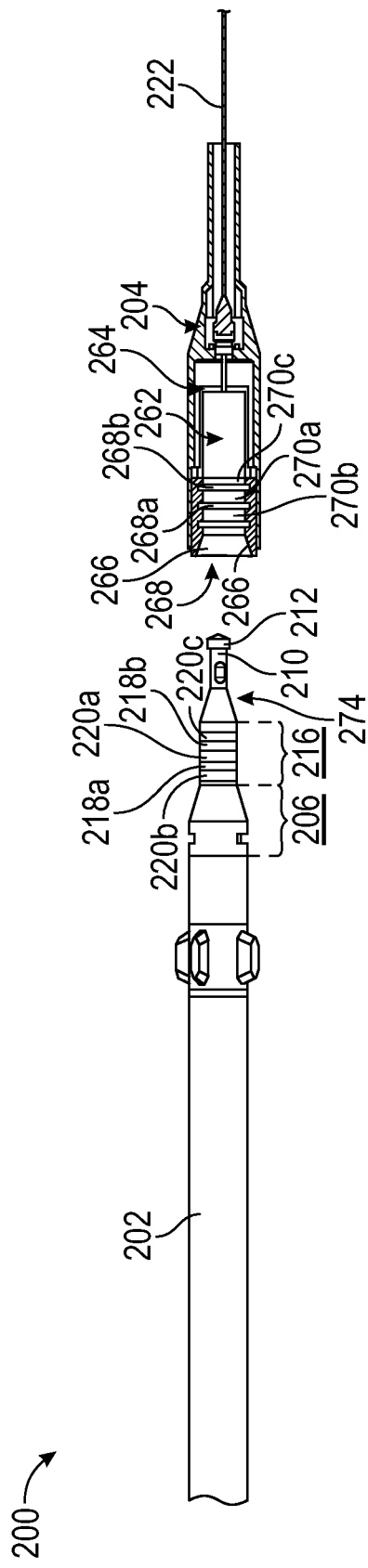
FIG. 7 is a diagram illustrating the spearpoint and the device and a cross-sectional view of the surface connector, according to embodiments of the disclosure.
Figure 8:
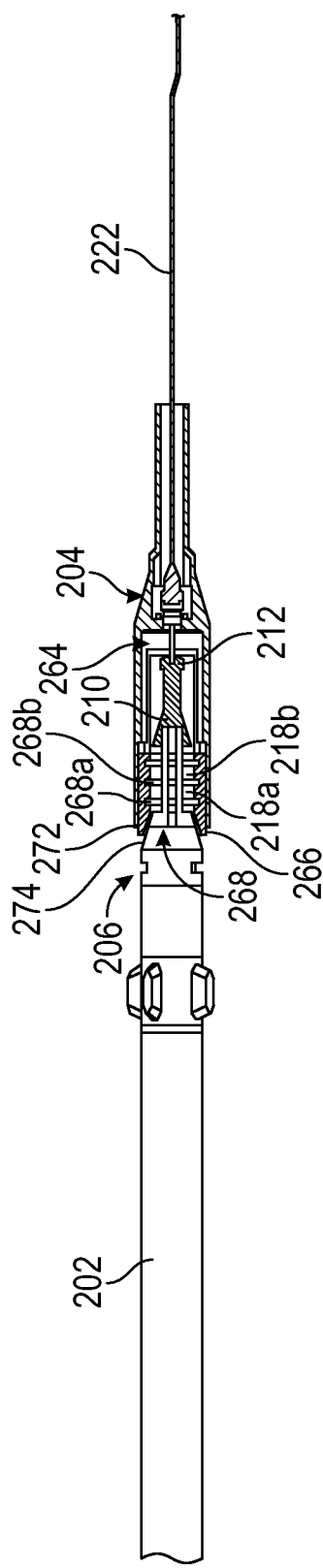
FIG. 8 is a diagram illustrating the spearpoint inserted into the surface connector and/or coupled to the surface connector, according to embodiments of the disclosure.

FIG. 7 is a diagram illustrating the spearpoint 200 and the device 202 and a cross-sectional view of the surface connector 204, according to embodiments of the disclosure. The spearpoint 200 is securely connected to the device 202, such as by threads, and not inserted into or coupled to the surface connector 204 in FIG. 7. FIG. 8 is a diagram illustrating the spearpoint 200 inserted into the surface connector 204 and/or coupled to the surface connector 204, according to embodiments of the disclosure.

Referencing FIGS. 7 and 8, the spearpoint 200 includes the end shaft 206, the contact shaft 216, and the latch rod 210 and nose 212. The end shaft 206 is physically connected to the device 202, and the contact shaft 216 includes the two external electrical contacts 218a and 218b that are each configured to be electrically coupled to the device 202 for communicating with the device 202 through the contacts 218a and 218b. In embodiments, the end shaft 206 is threaded onto or into the device 202. In embodiments, the device 202 includes the MWD tool 120 and the end shaft 206 is threaded onto or into the MWD tool 120. In other embodiments, the spearpoint 200 can include one external electrical contact or more than two external electrical contacts.

The contacts 218a and 218b are insulated from each other by insulator 220a that is situated between the contacts 218a and 218b. Also, contact 218a is insulated from the end shaft 206 at the distal end 208 by insulator 220b, and contact 218b is insulated from the latch rod 210 and the proximal end 214 by insulator 220c.

The surface connector 204 includes a tubular passage 262 configured to receive the latch rod 210, the nose 212, and the contact shaft 216 of the spearpoint 200. The passage 262 receives the nose 212 of the spearpoint 200 at a proximal end 264 of the passage 262, followed by the latch rod 210 and then the contact shaft 216. The surface connector 204 has angled recess portions 266 at a distal end 268 of the passage 262. These angled recess portions 266 rest on angled portions 274 of the end shaft 206 of the spearpoint 200 after or when the spearpoint 200 is inserted into the surface connector 204. In other embodiments, the surface connector 204 can be configured to engage a different contact module, such as contact module 12'.

In the present example, the surface connector 204 includes two surface electrical contacts 268a and 268b that are each electrically coupled to the surface processor, such as surface processor 100, by communications path 222. The surface electrical contacts 268a and 268b are configured to make electrical contact with the spearpoint contacts 218a and 218b when the spearpoint 200 is inserted into the surface connector 204. In embodiments, each of the surface electrical contacts 268a and 268b is an annular ring electrical contact. In embodiments, each of the surface electrical contacts 268a and 268b is sized to make electrical contact with the spearpoint contacts 218a and 218b.

The surface connector 204 further includes three spacers 270a-270c that are beside the surface electrical contacts 268a and 268b. Spacer 270a is situated between the surface electrical contacts 268a and 268b, spacer 270b is situated distal the surface electrical contact 268a, and spacer 270c is situated proximal the surface electrical contact 268b. In some embodiments, one or more of the spacers 270a-270c is an insulator, such as a ceramic, rubber, or plastic insulator. In some embodiments one or more of the spacers 270a-270c is a wiper seal configured to wipe the electrical contacts 218a and 218b clean.

In embodiments, the surface connector 204 includes one or more wiper seals 272 that clean the spearpoint contacts 218*a* and 218*b* as the surface connector 204 is coupled onto the spearpoint 200. This wipes the spearpoint contacts 218*a* and 218*b* clean prior to making electrical contact with the surface electrical contacts 268*a* and 268*b* of the surface connector 204.

In operation, the spearpoint 200 is inserted into the surface connector 204, such that the spearpoint contacts 218*a* and 218*b* make electrical contact with the surface electrical contacts 268*a* and 268*b* of the surface connector 204. Spearpoint contact 218*a* makes electrical contact with surface electrical contact 268*a*, and spearpoint contact 218*b* makes electrical contact with surface electrical contact 268*b*. This electrically and communicatively couples the surface processor, such as surface processor 100, to the device 202 through the surface electrical contacts 268*a* and 268*b* and the spearpoint contacts 218*a* and 218*b*. The surface processor communicates with the device 202, such as by programming the device 202 or downloading data from the device 202. In embodiments, the surface processor and the device 202 communicate using one or more of single line communications, CAN communications, RS232 communications, and RS485 communications.

Figure 9:
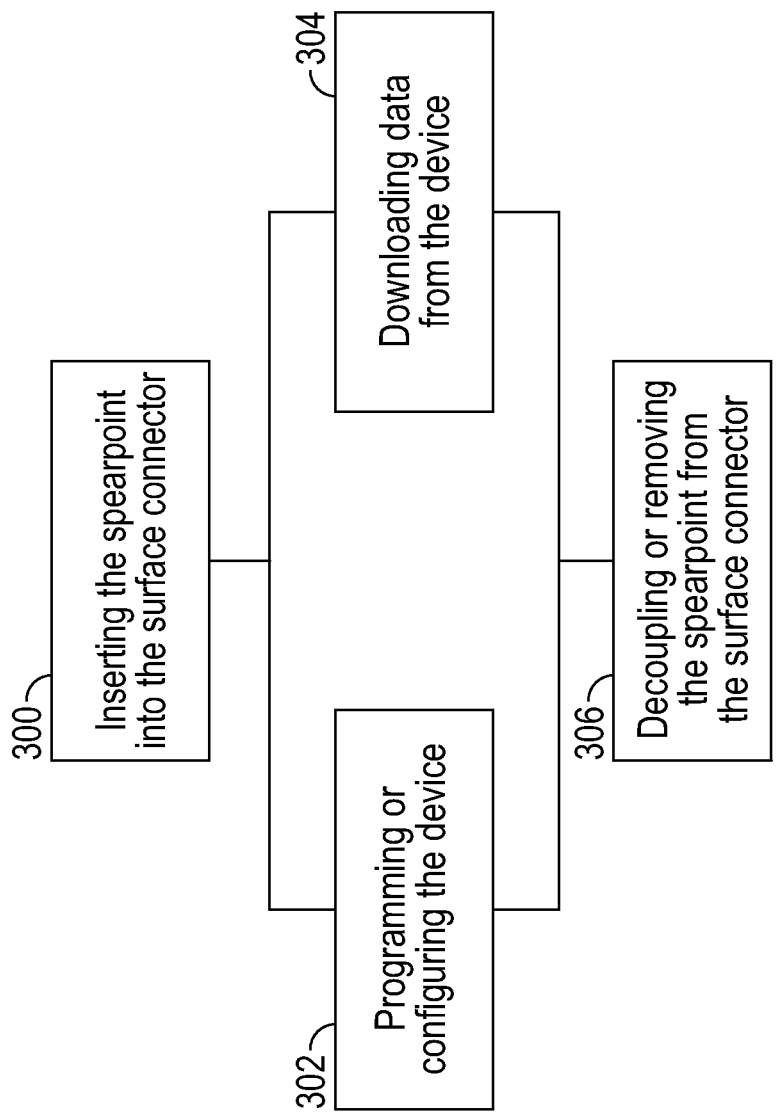
FIG. 9 is a flow chart diagram illustrating a method of communicating with a device, such as a drill string tool, through a contact module, such as a spearpoint contact module, according to embodiments of the disclosure.

FIG. 9 is a flow chart diagram illustrating a method of communicating with a device 202, such as a drill string tool, through a contact module, such as spearpoint contact module 200, according to embodiments of the disclosure. In other example embodiments, the mechanical and electrical aspects of the spearpoint 200, including the electrical contact configurations of the spearpoint 200 described herein can be used in other contact modules, such as contact module 12'. In other example embodiments, the mechanical and electrical aspects of the spearpoint 200, including the electrical contact configurations of the spearpoint 200 described herein can be used in other applications and on other items, such as EM head and rotator connector (wet connect) applications.

To begin, at 300, the method includes inserting the spearpoint 200 into the surface connector 204 at the surface without disconnecting the spearpoint 200 from the device 202.

With insertion, the spearpoint contacts 218*a* and 218*b* make electrical contact with the surface electrical contacts 268*a* and 268*b*, such that spearpoint contact 218*a* makes electrical contact with surface electrical contact 268*a*, and spearpoint contact 218*b* makes electrical contact with surface electrical contact 268*b*. The surface connector 204 can be connected to the surface processor either before or after the spearpoint 200 is inserted into the surface connector 204.

This results in the surface processor being electrically and communicatively coupled to the device 202 through the surface electrical contacts 268*a* and 268*b* and the spearpoint contacts 218*a* and 218*b*. In some embodiments, inserting the spearpoint 200 into the surface connector 204 wipes the spearpoint contacts 218*a* and 218*b* clean prior to making electrical contact with the surface electrical contacts 268*a* and 268*b* of the surface connector 204.

The surface processor then communicates with the device 202 by performing at least one of programming or configuring the device 202, at 302, and downloading data from the device 202, at 304. In embodiments, the surface processor and the device 202 communicate using one or more of single line communications, CAN communications, RS232 communications, and RS485 communications.

At 306, the spearpoint 200 is decoupled or removed from the surface connector 304, and then returned to normal surface.

Figure 10:
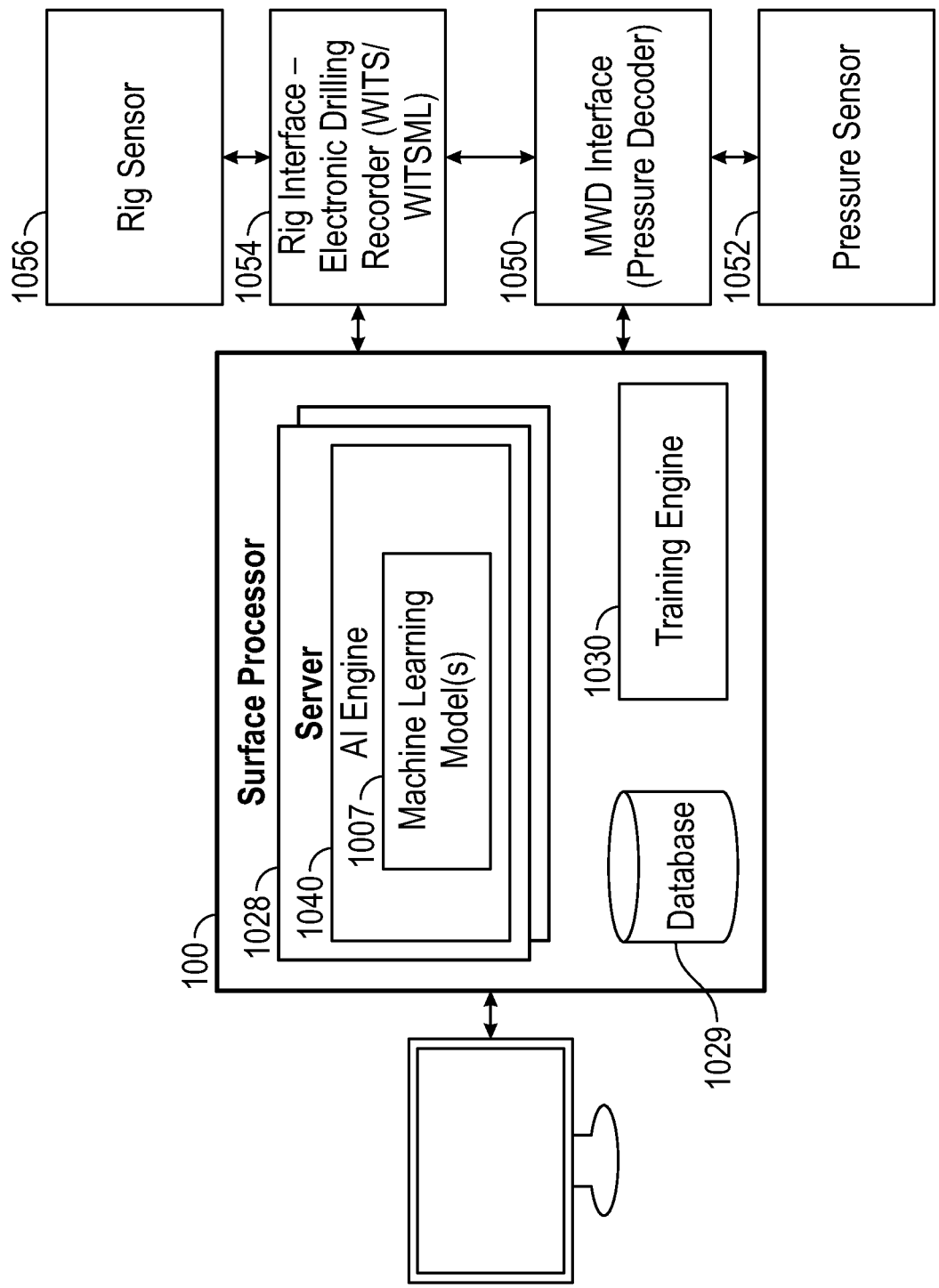
FIG. 10 is a block diagram of various electronic components included in an example system architecture, according to embodiments of the disclosure.

FIG. 10 is a block diagram of various electronic components included in an example system architecture, according to embodiments of the disclosure. As depicted, the surface processor 100 may be communicatively coupled to a rig interface—electronic drilling recorder (EDR) 1054 that transmits data to the surface processor 100 using one or more transmission protocols. A software application may perform any of the operations, functions, steps, or the like described herein. The software application may be implemented in computer instructions and executed by the surface processor 100. For example, the EDR 1054 may use a Wellsite Information Transfer Specification (WITS) protocol that is a specification for the transfer of drilling rig-related data. The standard may be recognized by numerous companies and supported by many hardware devices and software applications. The WITS protocol is a multi-layered specification: layer 0 describes an ASCII-based transfer specification; layer 1 describes a binary-based format based on 25 predefined fixed-size records and the Log Information Standard (LIS) data-transmission specification; layer 2 describes bidirectional communication using LIS Comment records; layer 2b describes buffering of data; layer 4 extends the previous layers to use a different data exchange format.

Additionally, the EDR 1054 may use an Extensible Markup Language (XML) based Wellsite Information Transfer Standard Markup Language (WITSML) to communicate data received from one or more rig sensors 1056 and the surface processor 100. WITSML is a standard for transmitting well-site data from the rig to different stakeholders in the oil and gas industry. WITS and/or WITSML may be used to collect data from the rig sensor 1056 and/or the downhole device 14.

The EDR 1054 may include one or more processing devices, one or more memory devices, one or more network interface devices, and the like. Computer instructions that implemented any operation of any method disclosed herein may be stored on the one or more memory devices of the EDR 1054. The one or more processing devices may be communicatively coupled to the memory devices and may access the computer instructions and execute the computer instructions. The EDR 1054 may be configured for data acquisition applications on the rig, such as mudlogging, lithology, pit volume totalizer (PVT), depth logging, and the like. The EDR 1054 may enable providing real-time or near real-time data and/or parameters to the surface processor 100, and other communicatively coupled systems and/or processors.

For example, the rig sensor 1056 may be any sensor capable of detecting and measuring data pertaining to the following; hook load measurement, rotation speed measurement, flow rate measurement, pump pressure measurement, pump stroke rate measurement, mud weight measurement, mud temperature measurement, block height measurement, etc. The EDR 1054 may be configured to transmit various drilling parameters to the surface processor 100. For example, the EDR 1054 may transmit revolutions per minute of a motor used in the tool drill string, a flow rate (e.g., fluid flow rate), a weight on bit (e.g., drill bit 42), a depth at which the tool drill string is disposed in a borehole or a formation, a circulating hours of a downhole drill motor 58, and the like.

The rig sensor 1056 may perform depth-tracking sensing by digitally counting an amount of rotational movement as the tool drill string turns as it moves up and down in a borehole. Each count may represent a fixed amount of distance traveled, which can be related directly to depth movement (increasing or decreasing depth). The amount of movement may be associated with a time-based counter. The rig sensor 1056 may be used to perform flow-tracking sensing to monitor fluid flow rate being applied downhole as well as the pump strokes required to achieve this flow rate. Data acquired from the rig sensor 1056 may be used as inputs to calculating drilling-fluid hydraulics, well control, and cuttings lag. In some embodiments, monitoring changes in trends may indicate potential downhole issues, such as kicks or loss of circulation. The rig sensor 1056 may be a proximity switch and/or a whisker switch. The proximity switch may be activated either by an electromagnetic (coil) or a permanent magnet, and may act as a digital relay switch when it incorporates electrical continuity. A whisker switch may be a microswitch that is activated when an external rod (called a whisker) forces a piston to raise a ball bearing to initiate contact against it.

The rig sensor 1056 may include one or more pressure-tracking sensors used to monitor surface pressure being applied downhole, for example. In some embodiments, the pressure-tracking sensors may monitor pressure from a high-pressure diaphragm unit (knock-on head) located on a standpipe or a pump manifold of the rig. The pressure-tracking sensors may include a transducer.

The rig sensor 1056 may include a strain-gauge analog transducer capable of measuring a flow rate measuring a flow rate coming out of an annulus. The flow rate sensor may be used to determine various increases and/or decreases in flow rate, which may be indicative of an undesirable event occurring (e.g., kick condition and/or loss of circulation).

The rig sensor 1056 may include a drill-monitor sensor capable of measuring surface revolutions-per-minute values, rotary torque, and hook load. The torque sensor may be a clamp that is deposited around a main power cable to a top-drive system (TDS). The torque sensor may operate based on Hall-effect chips by a magnetic field produced around the cable based on current being drawn through it. For example, the greater the torque being produced as the pipe rotates, the greater the current drawn by the TDS, and thus, the greater the Hall effect. The torque changes may be associated with either formation lithology or downhole drilling issues, such as pipe stick slip and/or motor stall. In some embodiments, the rig sensor 1056 may be a digital rotary sensor or a proximity sensor.

In some embodiments, RPM changes may be controlled to drill the well efficiently and reduce donwhole vibration effects. A combined weight of the bit, bottomhole assembly (BHA), drillpipe, etc., is called the string weight (SW). The block weight (BW) is the weight of the lines and blocks (e.g., including top drive). When the bit is on bottom (i.e., drilling), the hook load is reduced. The amount of weight suspended by the bottom of the hole may be the amount of weight on bit (WOB). A hook load sensor may include a transducer.

In some embodiments, the rig sensor 1056 may include a pit monitor sensor capable of using ultrasonic transit time to measure mud level. A wave may be transmitted and reflected back to a receiver. The transmit-time measurement may be used to determine a volume measurement. The volume measurement may be used to determine an increase and/or decrease in pit volume, which may be indicative of an undesirable event (e.g., kick, loss of circulation, etc.).

In some embodiments, the rig sensor 1056 may be a gas detection sensor that include a gas trap, a pneumatic line linking the gas trap to a gas detection equipment, and a gas detecting instrument. In one example, the gas detector may be a flame ionization detector (FID) gas chromatograph and total-gas detector.

The surface processor 100 may be communicatively coupled to an MWD interface 1050. In some embodiments, the MWD interface 1050 may include a pressure decoder that is capable of receiving a pressure signal from a pressure sensor 1052, and decoding the pressure signal. The pressure sensor 1052 may be included in the downhole device 14. The MWD interface 1050 may transmit one or more measurements included in the decoded pressure signal to the surface processor 100.

The surface processor 100 may receive the data from the EDR 1054 and/or the MWD interface 1050 and analyze the data in real-time or near real-time while the tool drill string is operating (e.g., drilling). The surface processor may determine, based on the data, there is a risk probability of an undesirable event occurring and may perform preventative actions in real-time or near real-time to attempt to prevent the undesirable event from occurring. The preventative action may include executing a control instruction and/or transmitting a control instruction (e.g., via electromagnetic and/or mud pulse telemetry) to cause an operating parameter of a device to change.

In some embodiments, the surface processor 100 may execute an artificial intelligence engine 1040. In some embodiments, as depicted, the surface processor 100 may include one or more servers 1028 that execute the artificial intelligence engine 1040. In some embodiments, the surface processor 100 may not include a server, and may be a standalone computing device. In some embodiments, the artificial intelligence engine 1040 may be executing on the servers 1028 that are physically separate from the surface processor 100. In such an embodiment, the artificial intelligence engine 1040 may be executing on a cloud-based computing system that uses a network of the servers 1028. The artificial intelligence engine 1028 may include one or more machine learning models 1007 trained to perform any of the operations of the methods disclosed herein. For example, the machine learning models 1007 may be trained to receive MWD drilling data from the MWD interface 1050 (which receives the drilling data from the pressure sensor 1052) and/or drilling parameters from the EDR 1054, analyze the measurements to determine a risk probability, determine whether the risk probability satisfies a threshold level, and/or perform a preventative action (e.g., transmitting an alert notification to one or more computing devices, changing an operating parameter of the drilling assembly 40 (RPM of the downhole drill motor 58, raise the tool drill string off bottom, etc.), among other things.

The surface processor 100 may use a training engine 1030 capable of generating the one or more machine learning models 1007. The one or more machine learning models 1007 may be generated by the training engine 1030 and may be implemented in computer instructions executable by the training engine 1030 and/or the artificial intelligence engine 1040. The computer instructions may be stored in a memory device communicatively coupled to the surface processor 100. To generate the one or more machine learning models 1007, the training engine 1030 may train the one or more machine learning models 1007. The one or more machine learning models 1007 may be used by the artificial intelligence engine 1040.

The training engine may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 1030 may be cloud-based or a real-time software platform, and it may include privacy software or protocols, and/or security software or protocols.

To train the one or more machine learning models 1007, the training engine 1030 may use a training data set of a corpus of MWD drilling data (e.g., vibration level measurements, shock level measurements, RPM level measurements, stick slip severity level measurements, gamma level measurements), drilling parameters (e.g., RPM, flow rate, weight on bit, depth, circulating hours), and/or threshold measurements, and the machine learning models 1007 may determine whether the threshold measurements have been exceeded (e.g., satisfied). Further, the machine learning models 1007 may be trained to execute a preventative action based on whether the threshold measurements have been exceeded. One example preventative action may include executing control instructions to cause a weight on bit to be increased/decreased by a certain amount (e.g., 5%, 10%) and/or a RPM of the downhole drill motor 58 to be increased/decreased by a certain amount (e.g., 5%, 10%). Another example preventative action may include executing control instructions that cause the tool drill string including the drilling assembly 40 to be picked up off the bottom of the borehole, allowed to unwind, and then resume drilling operations at a desired percentage (e.g., 50%) of RPMs. The preventative action may include slowing ramping of the RPM and weight on bit back to a nominal level. The machine learning models 1007 may be trained with training data that includes MWD survey information, tolerances associated with nominal levels, and preventative actions (e.g., transmitting alert notifications) to perform if the survey information indicates a value is outside a tolerance.

The one or more machine learning models 1007 may be trained to match patterns of the MWD drilling data and/or the drilling parameters and whether thresholds have been satisfied with performing a preventative action. The one or more machine learning models 1007 may be trained to match patterns of the MWD drilling data and/or the drilling parameters and whether tolerance levels have been violated with performing a preventative action. The one or more machine learning models 1007 may be trained to match patterns of the MWD drilling data and/or the drilling parameters and whether a risk probability exceeds a threshold level with performing a preventative action. The term "match" may refer to an exact match, a correlative match, a substantial match, etc. The one or more machine learning models 1007 may also be trained to control, based on a downlink message, the downhole device 14 via the downhole processor executing control instructions included in the downlink message.

Using training data that includes training inputs and corresponding target outputs, the one or more machine learning models 1007 may refer to model artifacts created by the training engine 1030. The training engine 1030 may find patterns in the training data wherein such patterns map the training input to the target output, and generate the machine learning models 1007 that capture these patterns. The one or more machine learning models 1007 may comprise, e.g., a single level of linear or non-linear operations (e.g., a support vector machine [SVM]) or the machine learning models may be a deep network, i.e., a machine learning model comprising multiple levels of non-linear operations. Examples of deep networks are neural networks including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model 1007 may include numerous layers and/or hidden layers that perform calculations (e.g., dot products) using various neurons.

Figure 11:
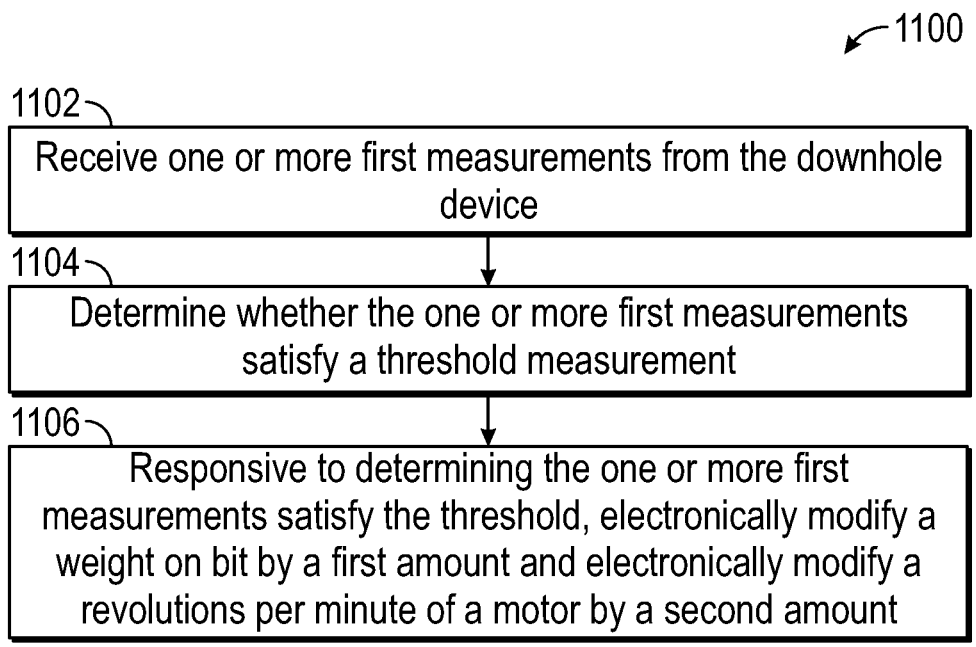
FIG. 11 is a flow chart diagram illustrating a method of performing a preventative action in response to a threshold measurement being satisfied, according to embodiments of the disclosure.

FIG. 11 is a flow chart diagram illustrating a method 1100 of performing a preventative action in response to a threshold measurement being satisfied, according to embodiments of the disclosure. The method 1100 is performed by processing logic that may include hardware (circuitry, dedicated logic, etc.), software (such as on a computer system or a dedicated machine), firmware, or some combination thereof. The method 1100 and/or each of their individual functions, routines, subroutines, or operations may be performed by one or more processors of a computing device (e.g., the surface processor 100 FIG. 10). In certain implementations, the method 1100 may be performed by a single processing thread. Alternatively, the method 1100 may be performed by two or more processing threads, each thread implementing one or more individual functions, routines, subroutines, or operations of the methods.

For simplicity of explanation, the method 1100 is depicted and described as a series of operations. However, operations in accordance with this disclosure can occur in various orders and/or concurrently, and with other operations not presented and described herein. For example, the operations depicted in the method 1100 may occur in combination with any other operation of any other method disclosed herein. Furthermore, not all illustrated operations may be required to implement the method 1100 in accordance with the disclosed subject matter. In addition, those skilled in the art will understand and appreciate that the method 1100 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. The surface processor 100 may include one or more processing devices. One or more machine learning models 1007 may be generated by the artificial intelligence engine 1040 and/or the training engine 1030 and may be trained to perform one or more operations of the method 1100. Any of the data received by the surface processor 100 may be included and/or presented in any applicable report disclosed herein.

At 1102, the surface processor 100 may receive one or more first measurements from the downhole device 14. In some embodiments, the one or more first measurements may include at least one of an axial vibration measurement, a lateral vibration measurement, a stick slip measurement, or some combination thereof.

At 1104, the surface processor 100 may determine whether the one or more first measurements satisfy a threshold measurement. In some embodiments, the threshold measurement may be associated with an allowable limit.

At 1106, responsive to determining the one or more first measurements satisfy the threshold measurement (e.g., exceed the threshold measurement), the surface processor 100 may electronically modify a weight on bit (e.g., drill bit 42) by a first amount (e.g., 5%, 10%, 15%, etc.) and electronically modify a revolutions per minute (RPM) of a motor (e.g., downhole drill motor 58) by a second amount (e.g., 5%, 10%, 15%, etc.). In some embodiments, the surface processor 100 is further configured to electronically increase the weight on bit by the first amount and electronically decrease the revolutions per minute by the second amount. In some embodiments, the surface processor 100 is further configured to electronically decrease the weight on bit by the first amount and electronically increase the revolutions per minute by the second amount. Thus, the modifications may either increase or decrease the weight on bit or the RPMs.

The surface processor 100 may transmit a message (e.g., via telemetry) to a downhole processor of the drilling assembly 40 that causes the RPM to change. The weight on bit may be modified by executing a control instruction that causes the rig to raise the tool drill string off bottom or lower the tool drill string to engage the bottom (e.g., for drilling operations). Modifying the RPMs and the weight on bit are example preventative actions that may be implemented to correct a drilling operation dysfunction and/or prevent an undesirable event from occurring. If the first measurements do not satisfy the threshold measurement (e.g., are below the threshold measurement), the surface processor 100 may return to 1102.

In some embodiments, the surface processor 100 may receive one or more second measurements from the downhole device 14. The second measurements may be received subsequently to the first measurements after the preventative action(s) are performed by the surface processor 100. The surface processor 100 may determine whether the one or more second measurements satisfy the threshold measurement. Responsive to determining that the one or more second measurements satisfy the threshold measurement, the surface processor 100 may electronically raise the tool drill string off a surface of a well borehole in which the downhole device is disposed and cause drilling to stop. The surface processor 100 may transmit a control instruction to a device that causes the device to raise the tool drill string off the surface (e.g., bottom) of the well borehole. Further, the surface processor 100 may also wait a period of time to enable the tool drill string to unwind, and resume drilling at a modified rate of the RPs by lowering the tool drill string.

In some embodiments, the surface processor 100 may generate, via the artificial intelligence engine 1040, a machine learning model 1007 trained to determine whether the one or more first measurements satisfy the threshold measurement, and electronically modify the weight on bit by the first amount and electronically modify the RPMs by the second amount.

Figure 12:
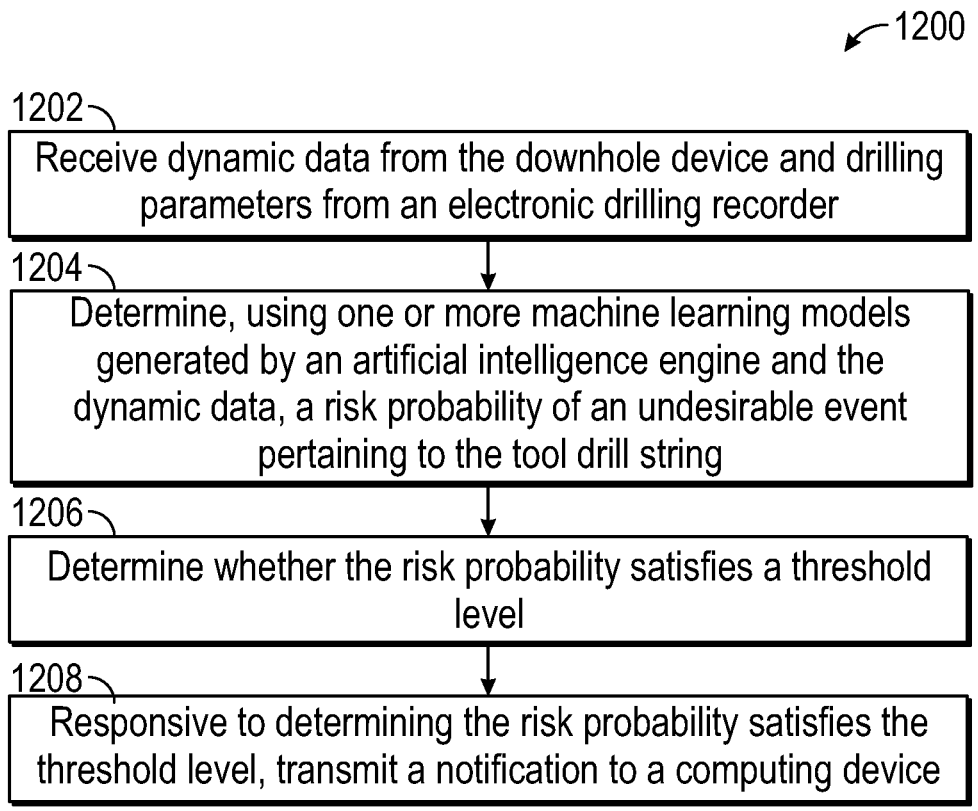
FIG. 12 is a flow chart diagram illustrating a method of determining a risk probability of an undesirable event and performing a preventative action, according to embodiments of the disclosure.

FIG. 12 is a flow chart diagram illustrating a method 1200 of determining a risk probability of an undesirable event and performing a preventative action, according to embodiments of the disclosure. The method 1200 is performed by processing logic that may include hardware (circuitry, dedicated logic, etc.), software (such as on a computer system or a dedicated machine), firmware, or some combination thereof. The method 1200 and/or each of their individual functions, routines, subroutines, or operations may be performed by one or more processors of a computing device (e.g., the surface processor 100 FIG. 10). In certain implementations, the method 1200 may be performed by a single processing thread. Alternatively, the method 1200 may be performed by two or more processing threads, each thread implementing one or more individual functions, routines, subroutines, or operations of the methods.

For simplicity of explanation, the method 1200 is depicted and described as a series of operations. However, operations in accordance with this disclosure can occur in various orders and/or concurrently, and with other operations not presented and described herein. For example, the operations depicted in the method 1200 may occur in combination with any other operation of any other method disclosed herein. Furthermore, not all illustrated operations may be required to implement the method 1200 in accordance with the disclosed subject matter. In addition, those skilled in the art will understand and appreciate that the method 1200 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. The surface processor 100 may include one or more processing devices. One or more machine learning models 1007 may be generated by the artificial intelligence engine 1040 and/or the training engine 1030 and may be trained to perform one or more operations of the method 1200. Any of the data received by the surface processor 100 may be included and/or presented in any applicable report disclosed herein.

At 1202, the surface processor 100 may receive dynamic data from the downhole device 14 and drilling parameters from the EDR 1054. The dynamic data may be include high-speed pressure data from a data acquisition system. The data acquisition system may include a decoder that is capable of decoding a received pressure signal at a pressure sensor. The dynamic data may include drilling data received from the downhole device 14. The drilling data may be received from the one or more pressure sensors 1052 and/or any sensor included in the downhole device. and/or one or more rig sensors 1056. The drilling data may include a vibration measurement value, a stick slip severity measurement value, a gamma measurement value, an azimuth measurement value, a formation measurement value, or some combination thereof. The drilling parameters may be received from the EDR 1054. The drilling parameters comprise a revolutions per minute measurement value, a flow rate measurement value, a weight on bit measurement value, a depth measurement value, a circulating hours measurement value, or some combination thereof.

At 1204, the surface processor 100 may determine, using one or more machine learning models 2007 generated by the artificial intelligence engine 1040 and the dynamic data, a risk probability (e.g., 25%, 50%, 75%) of an undesirable event (e.g., shut down, loss of circulation, motor stall, etc.) pertaining to the tool drill string. In some embodiments, the undesirable event may refer to a mud motor micro stalling event.

The artificial intelligence engine 1040 may generate the machine learning models 1007 by training the machine learning models 1007 with training data including one or more amounts of hours motors operate based on certain parameters before the motors experience an undesirable event (e.g., stalling, failure, breaking, etc.). The parameters may include temperatures, vibration measurement values, shock measurement values, revolutions per minute measurement values, stick slip severity measurement values, gamma measurement values, azimuth measurement values, formation measurement values, flow rate measurement values, weight on bit measurement values, depth measurement values, or some combination thereof.

At 1206, the surface processor 100 may determine whether the risk probability satisfies a threshold level. The threshold level may be any configurable amount (e.g., 25%, 50%, 75%). Satisfying the threshold level may refer to greater than the threshold level, greater than or equal to the threshold level, equal to the threshold level, less than the threshold level, less than or equal to the threshold level, or the like.

At 1208, responsive to determining the risk probability satisfies the threshold level, the surface processor 100 may transmit a notification to a computing device. In some embodiments, responsive to determining the risk probability satisfies the threshold level, the surface processor 100 is further configured to transmit a control instruction to the downhole device 14 to cause an operating parameter of the downhole device 14 to be modified. The operating parameter may pertain to an RPM of the downhole drill motor 58, a direction of drilling, a rate at which measurements are obtained by one or more sensors, or the like.

In some embodiments, responsive to determining the risk probability satisfies the threshold level, the surface processor 100 may receive second dynamic data from the downhole device 14 and second drilling parameters from an electronic drilling recorder (EDR) 1054. The surface processor 100 may determine, using the one or more machine learning models 1007 generated by the artificial intelligence engine 1040 and the second dynamic data, the risk probability of the undesirable event pertaining to the tool drill string. In some embodiments, responsive to determining the risk probability satisfies the threshold level, the surface processor 100 may transmit a notification to a computing device and/or perform a preventative action, such as causing an operating parameter (e.g., RPM, weight on bit, etc.) to be modified.

Figure 13:
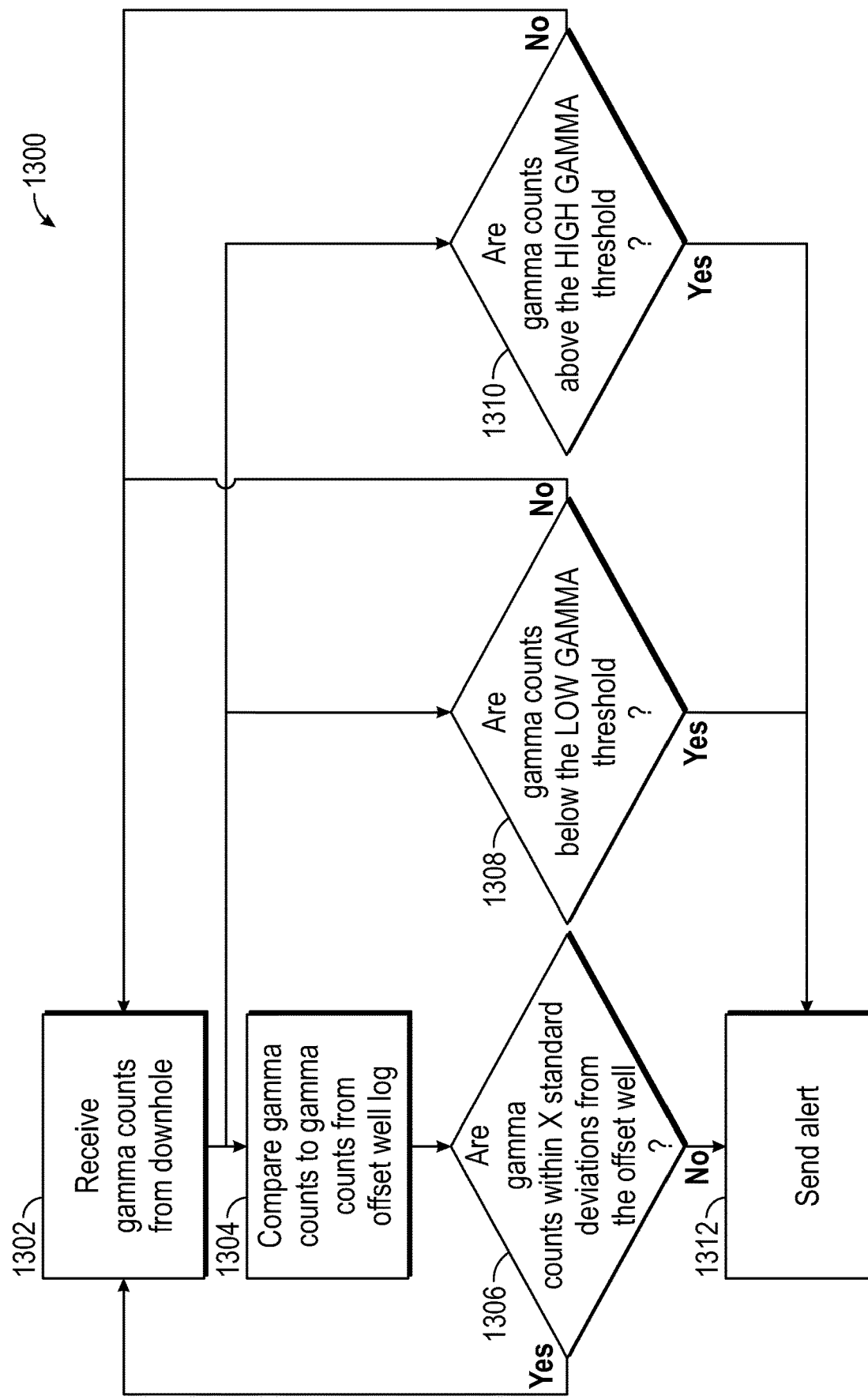
FIG. 13 is a flow chart diagram illustrating a method of determining whether gamma counts satisfy a threshold gamma count measurement, according to embodiments of the disclosure.

FIG. 13 is a flow chart diagram illustrating a method 1300 of determining whether gamma counts satisfy a threshold gamma count measurement, according to embodiments of the disclosure. The method 1300 is performed by processing logic that may include hardware (circuitry, dedicated logic, etc.), software (such as on a computer system or a dedicated machine), firmware, or some combination thereof. The method 1300 and/or each of their individual functions, routines, subroutines, or operations may be performed by one or more processors of a computing device (e.g., the surface processor 100 FIG. 10). In certain implementations, the method 1300 may be performed by a single processing thread. Alternatively, the method 1300 may be performed by two or more processing threads, each thread implementing one or more individual functions, routines, subroutines, or operations of the methods.

For simplicity of explanation, the method 1300 is depicted and described as a series of operations. However, operations in accordance with this disclosure can occur in various orders and/or concurrently, and with other operations not presented and described herein. For example, the operations depicted in the method 1300 may occur in combination with any other operation of any other method disclosed herein. Furthermore, not all illustrated operations may be required to implement the method 1300 in accordance with the disclosed subject matter. In addition, those skilled in the art will understand and appreciate that the method 1300 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1300. Any of the data received by the surface processor 100 may be included and/or presented in any applicable report disclosed herein.

At 1302, the surface processor 100 receives gamma counts from the downhole device 14. The gamma counts may be associated with a gamma radiation signature. Gamma particles may hit a gamma sensor over a period of time or frequency (e.g., each second) and measuring the gamma counts may be used as a guide to instruct where the downhole device 14 is located in a formation. That is, the gamma count may be used for geological navigation. If drilling assembly 40 and/or downhole device 14 aren't located in a desire geological location, the surface processor 100 may transmit control instructions to a downhole processor associated with the downhole device 14 and/or drilling assembly 40 to change a drilling course.

At 1304, the surface processor 100 may compare gamma counts to gamma counts from an offset well log. The offset well log may include information about an existing wellbore that is close to the wellbore being drilled. The offset well log may be used as training data by one or more machine learning models 1007 that compare the received gamma counts with the gamma counts in the offset well log.

At 1306, the machine learning models 1007 may be trained to determine whether the received gamma counts are within X standard deviations from the offset well. If they are, then the surface processor 100 may return to 1302 to receive subsequent gamma counts from downhole. If the gamma counts are not within X standard deviations from the offset well, the surface processor 100 may perform a preventative action, such as transmitting an alert notification to a computing device, transmitting control instructions to change a drilling course by changing an operating parameter of the drilling assembly 40, etc. The machine learning model 1007 may be trained to perform the preventative action.

At 1308, the machine learning models 1007 may be trained to determine whether the received gamma counts are below a low gamma count threshold. If they are, the surface processor 100 may perform a preventative action, such as transmitting an alert notification to a computing device, transmitting control instructions to change a drilling course by changing an operating parameter of the drilling assembly 40, etc. If they are not, then the surface processor 100 may return to 1302 to receive subsequent gamma counts from downhole. The machine learning model 1007 may be trained to perform the preventative action.

At 1310, the machine learning models 1007 may be trained to determine whether the received gamma counts are above a high gamma count threshold. If they are, the surface processor 100 may perform a preventative action, such as transmitting an alert notification to a computing device, transmitting control instructions to change a drilling course by changing an operating parameter of the drilling assembly 40, etc. If they are not, then the surface processor 100 may return to 1302 to receive subsequent gamma counts from downhole. The machine learning model 1007 may be trained to perform the preventative action.

Figure 14:
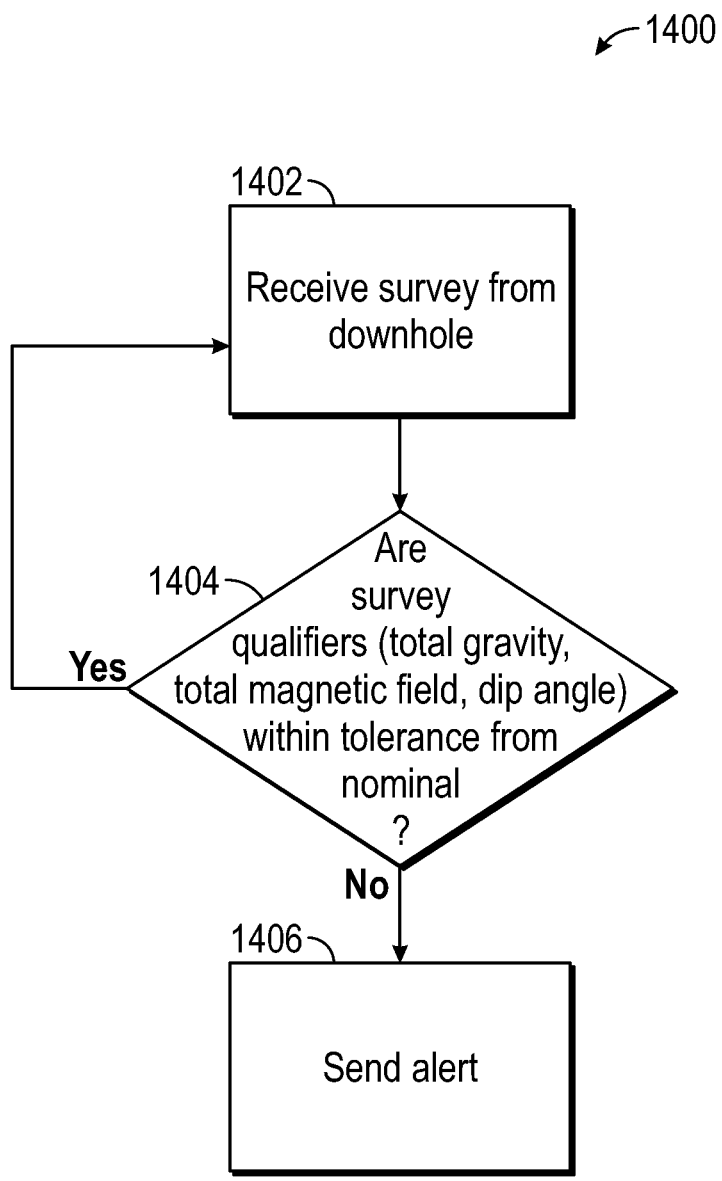
FIG. 14 is a flow chart diagram illustrating a method performing a preventative action in response to survey qualifiers being outside a tolerance from nominal.

FIG. 14 is a flow chart diagram illustrating a method 1400 performing a preventative action in response to survey qualifiers being outside a tolerance from nominal. The method 1400 is performed by processing logic that may include hardware (circuitry, dedicated logic, etc.), software (such as on a computer system or a dedicated machine), firmware, or some combination thereof. The method 1400 and/or each of their individual functions, routines, subroutines, or operations may be performed by one or more processors of a computing device (e.g., the surface processor 100 FIG. 10). In certain implementations, the method 1400 may be performed by a single processing thread. Alternatively, the method 1400 may be performed by two or more processing threads, each thread implementing one or more individual functions, routines, subroutines, or operations of the methods.

For simplicity of explanation, the method 1400 is depicted and described as a series of operations. However, operations in accordance with this disclosure can occur in various orders and/or concurrently, and with other operations not presented and described herein. For example, the operations depicted in the method 1400 may occur in combination with any other operation of any other method disclosed herein. Furthermore, not all illustrated operations may be required to implement the method 1400 in accordance with the disclosed subject matter. In addition, those skilled in the art will understand and appreciate that the method 1400 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1400. Any of the data received by the surface processor 100 may be included and/or presented in any applicable report disclosed herein.

At 1402, the surface processor 100 may receive a survey from the downhole device 14. The survey may include measurements pertaining to inclination and/or direction of the tool drill string. The MWD data included in the survey may include gamma counts, pressure, temperature, flow rate, and any other suitable data obtainable by the downhole device 14.

At 1404, the surface processor 100 may determine whether survey qualifiers (e.g., total gravity, total magnetic field, dip angle, etc.) are within a tolerance from nominal values. If the survey qualifiers are within the tolerance from the nominal values, the surface processor 100 may return to 1402 to receive another survey. If the survey qualifiers are outside the tolerance from the nominal values, at 1406, the surface processor 100 may perform a preventative action, such as transmitting an alert notification to a computing device, transmitting control instructions to change a drilling course by changing an operating parameter of the drilling assembly 40, etc. The machine learning model 1007 may be trained to perform the preventative action.

Figure 15:
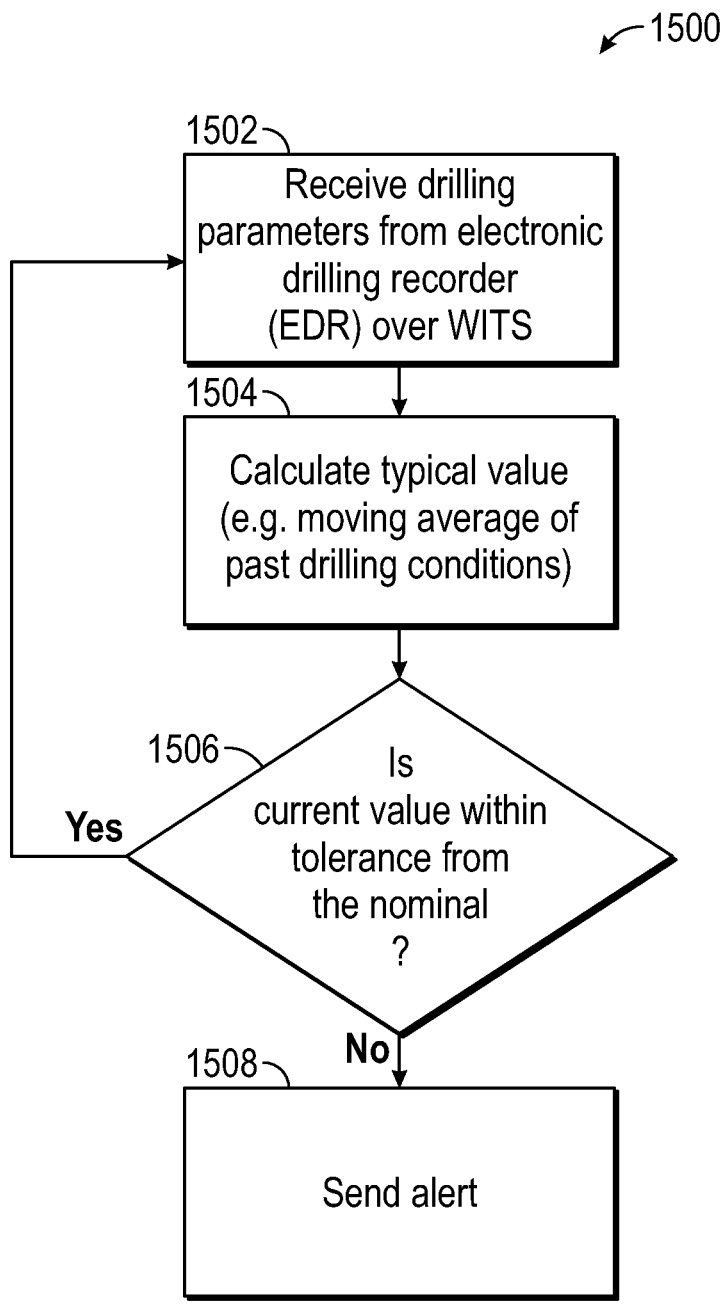
FIG. 15 is a flow chart diagram illustrating a method determining whether drilling parameters and determining whether the drilling parameters are within an tolerance from nominal, according to embodiments of the disclosure.

FIG. 15 is a flow chart diagram illustrating a method 1500 determining whether drilling parameters and determining whether the drilling parameters are within an tolerance from nominal, according to embodiments of the disclosure. The method 1500 is performed by processing logic that may include hardware (circuitry, dedicated logic, etc.), software (such as on a computer system or a dedicated machine), firmware, or some combination thereof. The method 1500 and/or each of their individual functions, routines, subroutines, or operations may be performed by one or more processors of a computing device (e.g., the surface processor 100 FIG. 10). In certain implementations, the method 1500 may be performed by a single processing thread. Alternatively, the method 1500 may be performed by two or more processing threads, each thread implementing one or more individual functions, routines, subroutines, or operations of the methods.

For simplicity of explanation, the method 1500 is depicted and described as a series of operations. However, operations in accordance with this disclosure can occur in various orders and/or concurrently, and with other operations not presented and described herein. For example, the operations depicted in the method 1500 may occur in combination with any other operation of any other method disclosed herein. Furthermore, not all illustrated operations may be required to implement the method 1500 in accordance with the disclosed subject matter. In addition, those skilled in the art will understand and appreciate that the method 1500 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1500. Any of the data received by the surface processor 100 may be included and/or presented in any applicable report disclosed herein.

At 1502, the surface processor 100 may receive drilling parameters from the EDR 1054 over a transmission protocol (e.g., WITS). The drilling parameters may include RPM, fluid flow rate, weight on bit, depth of tool drill string, circulating hours of tool drill string, etc.

At 1504, the surface processor 100 may determine or calculate a nominal value relating to a moving average of past drilling conditions for each of the parameters. At 1506, the surface processor 100 may determine whether the values of each of the received drilling parameters are within a tolerance from the nominal value. If so, the surface processor 100 may return to 1502 to receive subsequent drilling parameters. If not, the surface processor 100 may perform a preventative action, the surface processor 100 may perform a preventative action, such as transmitting an alert notification to a computing device, transmitting control instructions to change a drilling course by changing an operating parameter of the drilling assembly 40, etc. The machine learning model 1007 may be trained to perform the preventative action.

Figure 16:
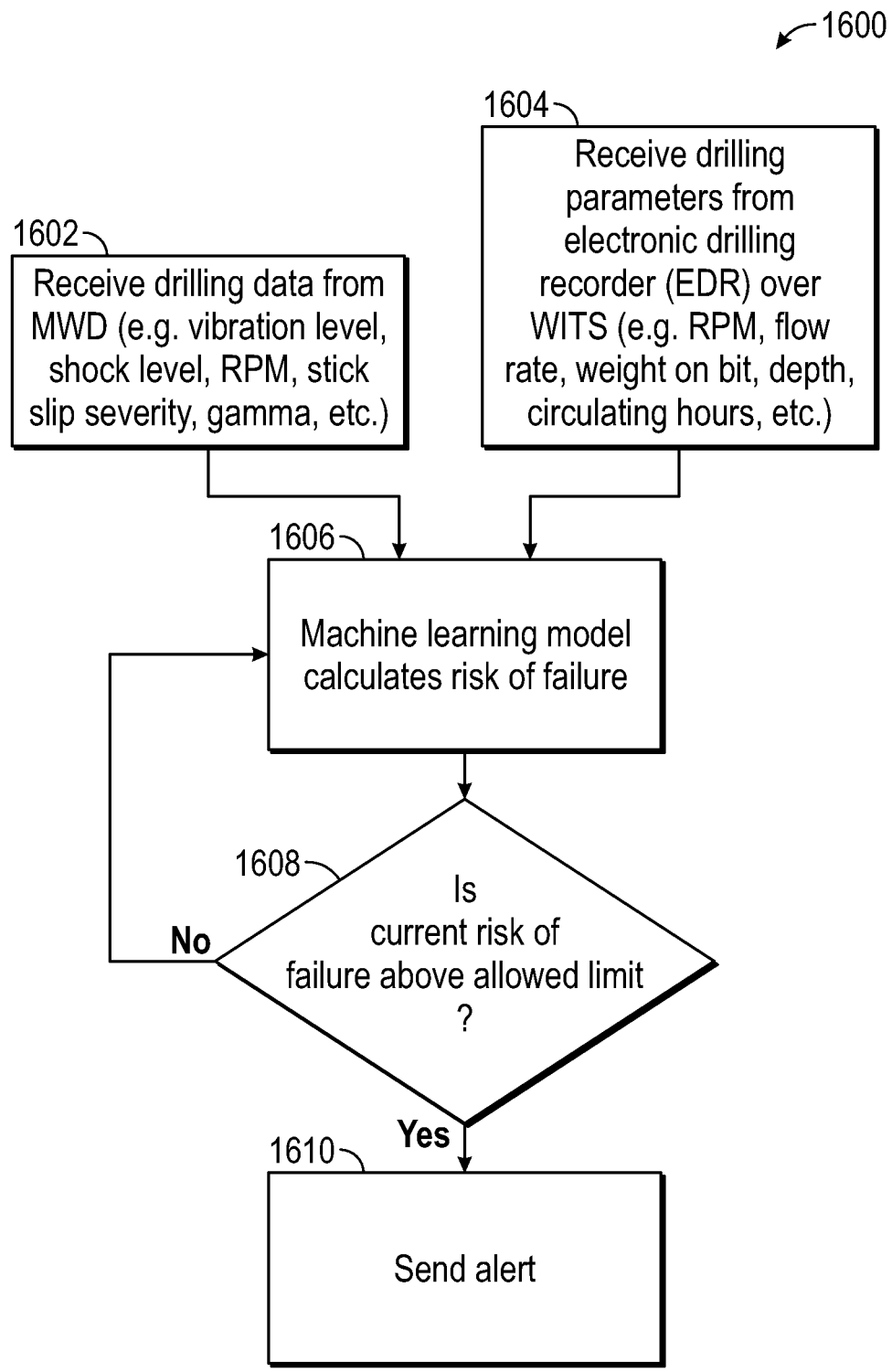
FIG. 16 is a flow chart diagram illustrating receiving MWD data and drilling parameters, determining whether a risk probability satisfies a threshold measurement, and performing a preventative action, according to embodiments of the disclosure.

FIG. 16 is a flow chart diagram of a method 1600 illustrating receiving MWD data and drilling parameters, determining whether a risk probability satisfies a threshold measurement, and performing a preventative action, according to embodiments of the disclosure. The method 1600 is performed by processing logic that may include hardware (circuitry, dedicated logic, etc.), software (such as on a computer system or a dedicated machine), firmware, or some combination thereof. The method 1600 and/or each of their individual functions, routines, subroutines, or operations may be performed by one or more processors of a computing device (e.g., the surface processor 100 FIG. 10). In certain implementations, the method 1600 may be performed by a single processing thread. Alternatively, the method 1600 may be performed by two or more processing threads, each thread implementing one or more individual functions, routines, subroutines, or operations of the methods.

For simplicity of explanation, the method 1600 is depicted and described as a series of operations. However, operations in accordance with this disclosure can occur in various orders and/or concurrently, and with other operations not presented and described herein. For example, the operations depicted in the method 1600 may occur in combination with any other operation of any other method disclosed herein. Furthermore, not all illustrated operations may be required to implement the method 1600 in accordance with the disclosed subject matter. In addition, those skilled in the art will understand and appreciate that the method 1600 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1600. Any of the data received by the surface processor 100 may be included and/or presented in any applicable report disclosed herein.

At 1602, the surface processor 100 may receive drilling data from the downhole device 14. The drilling data may pertain to vibration level measurements, shock level measurements, RPM measurements, stick slip severity measurements, gamma level measurements, and the like. At 1604, the surface processor 100 may receive drilling parameters from the EDR 1054. The drilling parameters may include RPM measurements, flow rate measurements, weight on bit measurements, depth measurements, circulating hours measurements, etc.

At 1606, the surface processor 100 may execute the trained machine learning model 1007 to determine a risk probability (e.g., 25%, 50%, 75%, etc.). The machine learning model 1007 may be trained using a corpus of training data including previous drilling data and drilling parameters that are associated with undesirable events occurring. The previous drilling data and drilling parameters may specify values and the combination of the values of the drilling data and parameters may be mapped to the undesirable events occurring such that the machine learning model 1007 is configured to output a risk probability when similar drilling data and drilling parameters are received.

At 1608, the surface processor 100 may determine whether the determined risk probability satisfies a threshold level. If not, the surface processor 100 may continue to receive data and determine the risk probability based on the data. If so, the surface processor 100 may perform a preventative action, the surface processor 100 may perform a preventative action, such as transmitting an alert notification to a computing device, transmitting control instructions to change a drilling course by changing an operating parameter of the drilling assembly 40, etc. The machine learning model 1007 may be trained to perform the preventative action.

Figure 17:
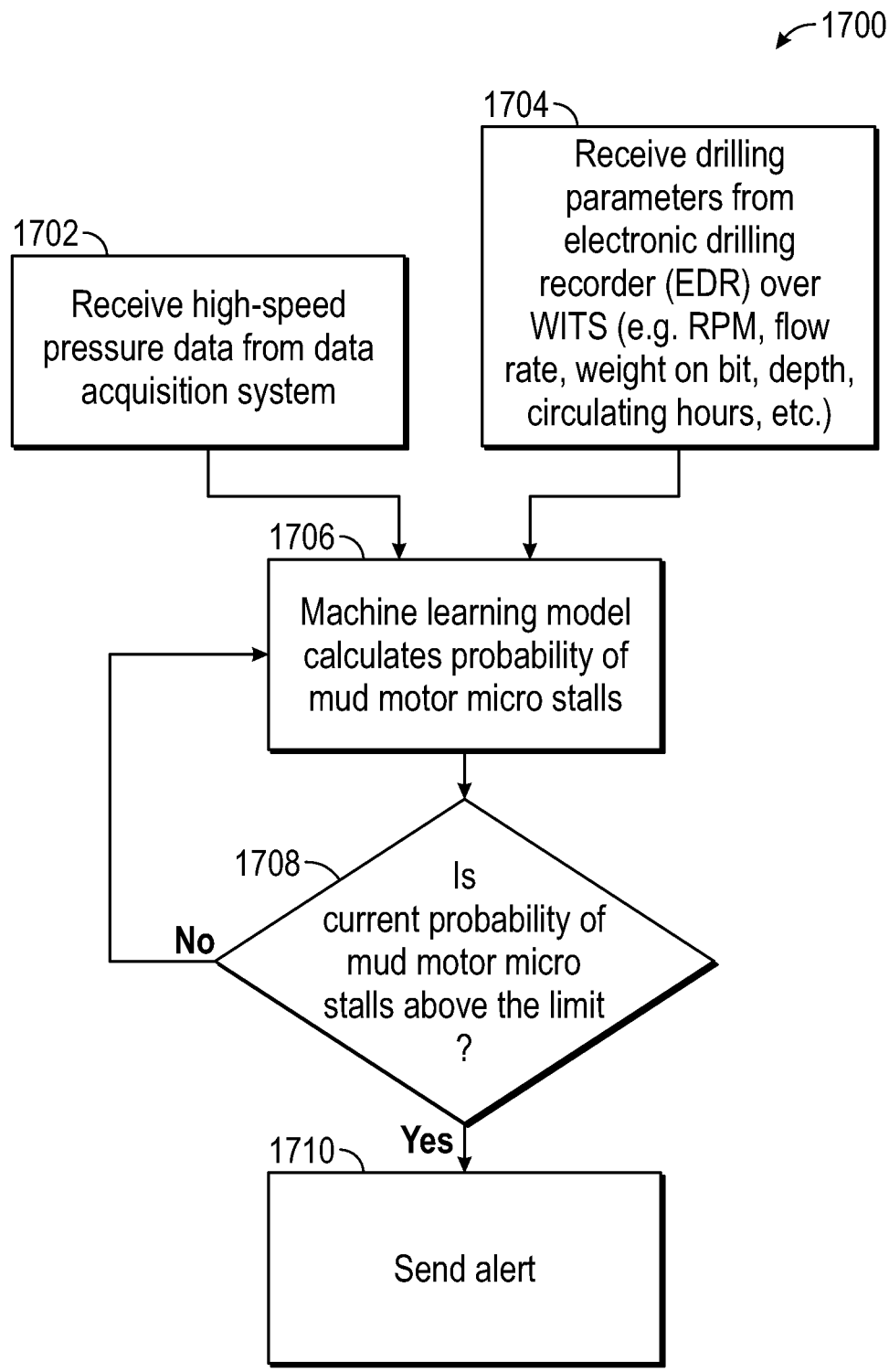
FIG. 17 is a flow chart diagram illustrating receiving MWD data and drilling parameters, determining whether a risk probability of a mud motor micro stall satisfies a threshold measurement, and performing a preventative action, according to embodiments of the disclosure.

FIG. 17 is a flow chart diagram of a method 1700 illustrating receiving MWD data and drilling parameters, determining whether a risk probability of a mud motor micro stall satisfies a threshold measurement, and performing a preventative action, according to embodiments of the disclosure. The method 1700 is performed by processing logic that may include hardware (circuitry, dedicated logic, etc.), software (such as on a computer system or a dedicated machine), firmware, or some combination thereof. The method 1700 and/or each of their individual functions, routines, subroutines, or operations may be performed by one or more processors of a computing device (e.g., the surface processor 100 FIG. 10). In certain implementations, the method 1700 may be performed by a single processing thread. Alternatively, the method 1700 may be performed by two or more processing threads, each thread implementing one or more individual functions, routines, subroutines, or operations of the methods.

For simplicity of explanation, the method 1700 is depicted and described as a series of operations. However, operations in accordance with this disclosure can occur in various orders and/or concurrently, and with other operations not presented and described herein. For example, the operations depicted in the method 1700 may occur in combination with any other operation of any other method disclosed herein. Furthermore, not all illustrated operations may be required to implement the method 1700 in accordance with the disclosed subject matter. In addition, those skilled in the art will understand and appreciate that the method 1700 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1700. Any of the data received by the surface processor 100 may be included and/or presented in any applicable report disclosed herein.

At 1702, the surface processor 100 may receive high-speed pressure data from a data acquisition system. The pressure data may be decoded by a decoder. At 1704, the surface processor 100 may receive drilling parameters from the EDR 1054. The drilling parameters may include RPM measurements, flow rate measurements, weight on bit measurements, depth measurements, circulating hours measurements, etc.

At 1706, the surface processor 100 may execute the trained machine learning model 1007 to determine a risk probability of an undesirable event occurring, such as a mud motor micro stall. The machine learning model 1007 may be trained using a corpus of training data including previous pressure data and drilling parameters that are associated with mud motors stalling occurring. The previous pressure data and drilling parameters may specify values and the combination of the values of the pressure data and parameters may be mapped to the mud motors stalling such that the machine learning model 1007 is configured to output a risk probability when similar pressure data and drilling parameters are received.

At 1708, the surface processor 100 may determine whether the determined risk probability satisfies a threshold level. If not, the surface processor 100 may continue to receive data and determine the risk probability based on the data. If so, the surface processor 100 may perform a preventative action, the surface processor 100 may perform a preventative action, such as transmitting an alert notification to a computing device, transmitting control instructions to change a drilling course by changing an operating parameter of the drilling assembly 40, etc. The machine learning model 1007 may be trained to perform the preventative action.

Figure 18:
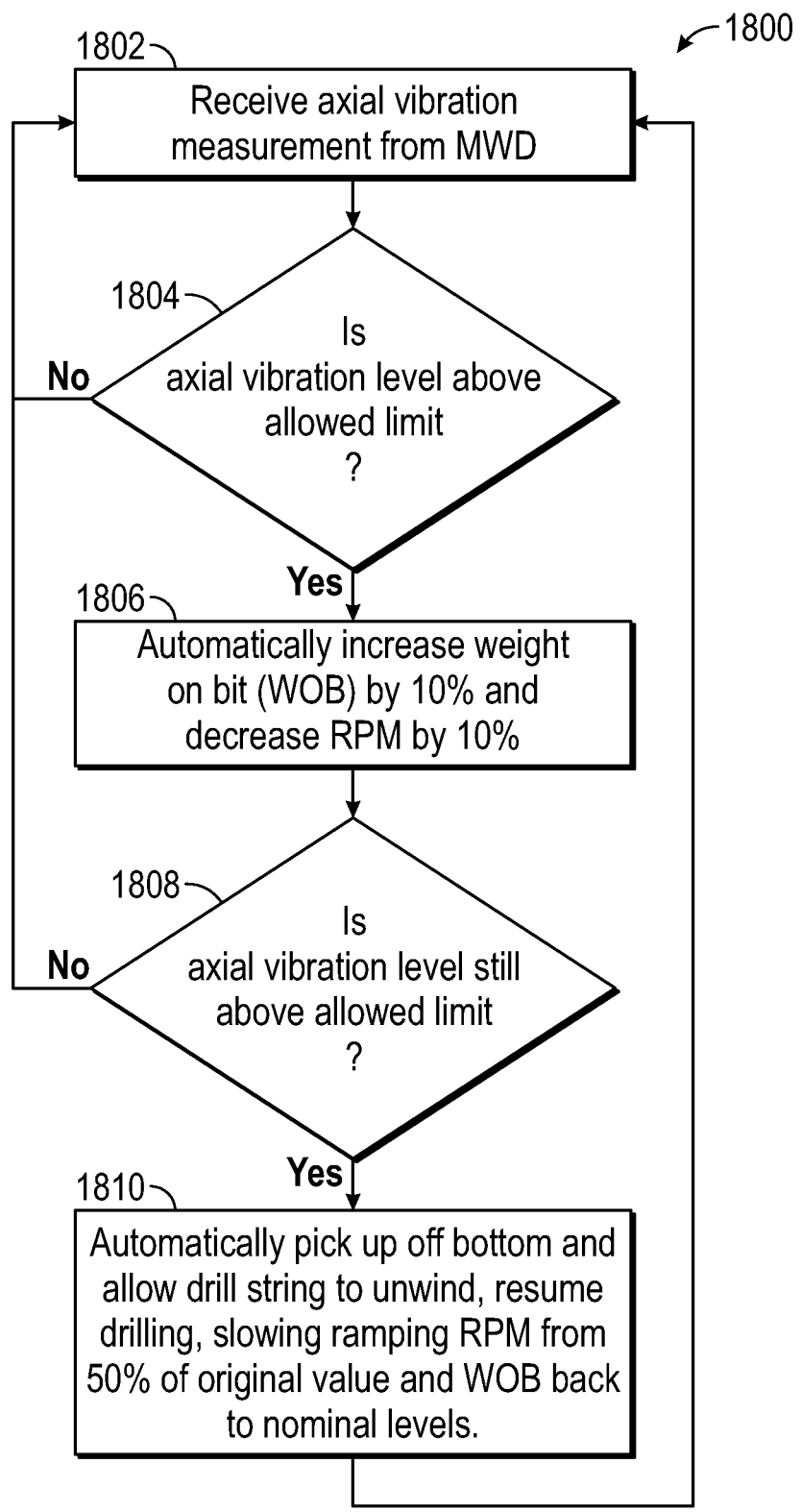
FIG. 18 is a flow chart diagram illustrating performing a performing a preventative action in response to an axial vibration measurement satisfying a threshold measurement, according to embodiments of the disclosure.

FIG. 18 is a flow chart diagram of a method 1800 illustrating performing a performing a preventative action in response to an axial vibration measurement satisfying a threshold measurement, according to embodiments of the disclosure. The method 1800 is performed by processing logic that may include hardware (circuitry, dedicated logic, etc.), software (such as on a computer system or a dedicated machine), firmware, or some combination thereof. The method 1800 and/or each of their individual functions, routines, subroutines, or operations may be performed by one or more processors of a computing device (e.g., the surface processor 100 FIG. 10). In certain implementations, the method 1800 may be performed by a single processing thread. Alternatively, the method 1800 may be performed by two or more processing threads, each thread implementing one or more individual functions, routines, subroutines, or operations of the methods.

For simplicity of explanation, the method 1800 is depicted and described as a series of operations. However, operations in accordance with this disclosure can occur in various orders and/or concurrently, and with other operations not presented and described herein. For example, the operations depicted in the method 1800 may occur in combination with any other operation of any other method disclosed herein. Furthermore, not all illustrated operations may be required to implement the method 1800 in accordance with the disclosed subject matter. In addition, those skilled in the art will understand and appreciate that the method 1800 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1800. Any of the data received by the surface processor 100 may be included and/or presented in any applicable report disclosed herein.

At 1802, the surface processor 100 may receive axial vibration measurement from the downhole device 14. At 1804, the surface processor 100 may determine whether the axial vibration level is above an allowed threshold measurement. If not, the surface processor 100 may continue to 1802 to receive additional axial vibration measurements. If so, at 1806, the surface processor 100 may perform a preventative action, such as automatically increase (e.g., perform a control instruction) a weight on bit by a certain amount (e.g., 10%) and decrease RPMs by a certain amount (e.g., 10%).

At 1808, the surface processor 100 may receive additional axial vibration measurements after the preventative action is performed, and the surface processor 100 may determine whether the axial vibration level is still above the allowed threshold measurement. If not, the surface processor 100 may continue to 1802 to receive additional axial vibration measurements. If so, at 1810, the surface processor 100 may perform a more drastic or urgent preventative action, such as automatically picking the tool drill string off bottom and allowing the tool drill string to unwind. The surface processor 100 may cause drilling to resume by slowing ramping of RPMs from a reduced amount (e.g., 50%) of an original value and the weight on bit back to nominal levels.

Figure 19:
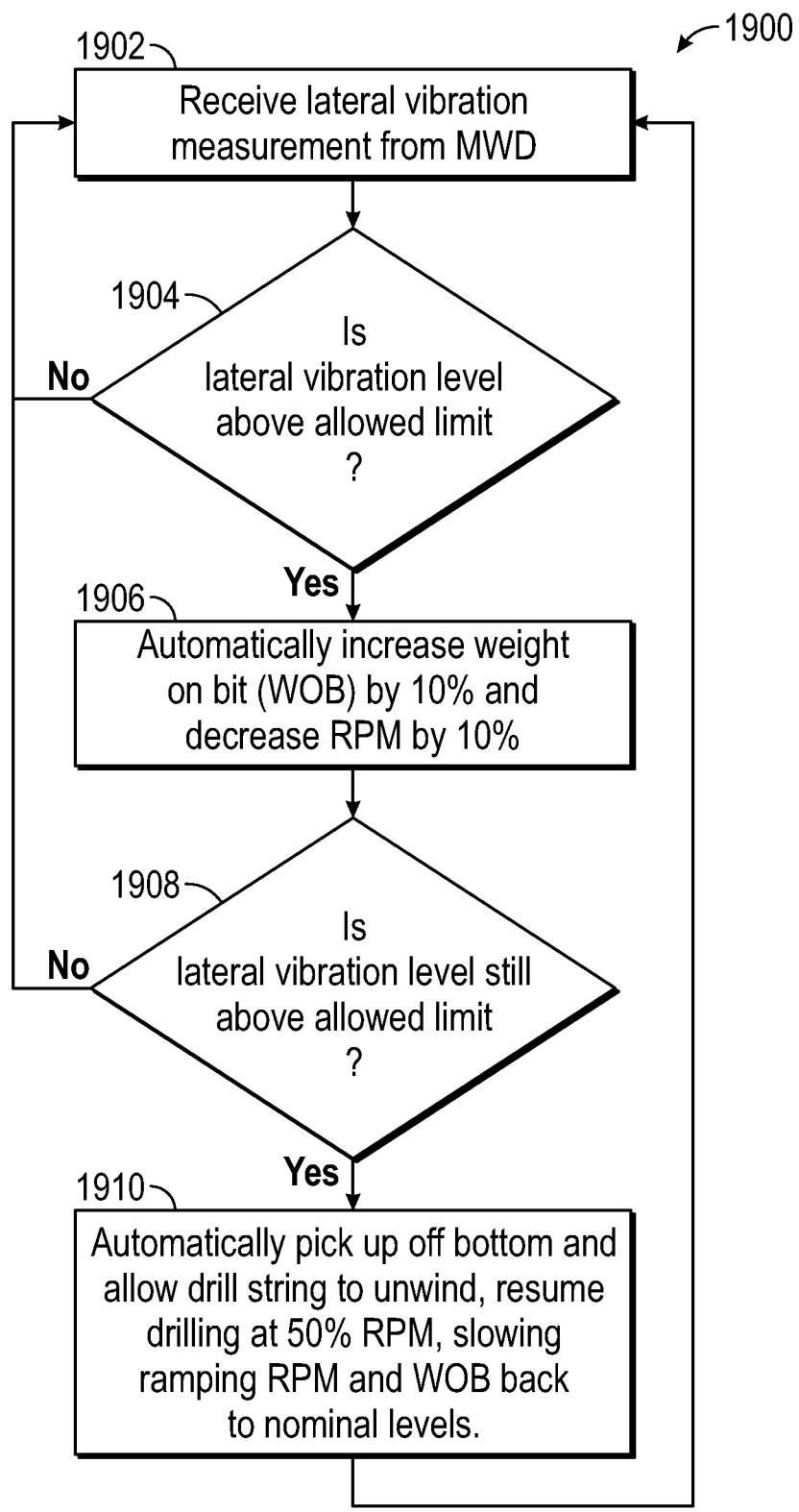
FIG. 19 is a flow chart diagram illustrating performing a performing a preventative action in response to a lateral vibration measurement satisfying a threshold measurement, according to embodiments of the disclosure.

FIG. 19 is a flow chart diagram of a method 1900 illustrating performing a performing a preventative action in response to a lateral vibration measurement satisfying a threshold measurement, according to embodiments of the disclosure. The method 1900 is performed by processing logic that may include hardware (circuitry, dedicated logic, etc.), software (such as on a computer system or a dedicated machine), firmware, or some combination thereof. The method 1900 and/or each of their individual functions, routines, subroutines, or operations may be performed by one or more processors of a computing device (e.g., the surface processor 100 FIG. 10). In certain implementations, the method 1900 may be performed by a single processing thread. Alternatively, the method 1900 may be performed by two or more processing threads, each thread implementing one or more individual functions, routines, subroutines, or operations of the methods.

For simplicity of explanation, the method 1900 is depicted and described as a series of operations. However, operations in accordance with this disclosure can occur in various orders and/or concurrently, and with other operations not presented and described herein. For example, the operations depicted in the method 1900 may occur in combination with any other operation of any other method disclosed herein. Furthermore, not all illustrated operations may be required to implement the method 1900 in accordance with the disclosed subject matter. In addition, those skilled in the art will understand and appreciate that the method 1900 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 1900. Any of the data received by the surface processor 100 may be included and/or presented in any applicable report disclosed herein.

At 1902, the surface processor 100 may receive lateral vibration measurement from the downhole device 14. At 1904, the surface processor 100 may determine whether the lateral vibration level is above an allowed threshold measurement. If not, the surface processor 100 may continue to 1902 to receive additional lateral vibration measurements. If so, at 1906, the surface processor 100 may perform a preventative action, such as automatically increase (e.g., perform a control instruction) a weight on bit by a certain amount (e.g., 10%) and decrease RPMs by a certain amount (e.g., 10%).

At 1908, the surface processor 100 may receive additional lateral vibration measurements after the preventative action is performed, and the surface processor 100 may determine whether the axial vibration level is still above the allowed threshold measurement. If not, the surface processor 100 may continue to 1902 to receive additional lateral vibration measurements. If so, at 1910, the surface processor 100 may perform a more drastic or urgent preventative action, such as automatically picking the tool drill string off bottom and allowing the tool drill string to unwind. The surface processor 100 may cause drilling to resume by slowing ramping of RPMs from a reduced amount (e.g., 50%) of an original value and the weight on bit back to nominal levels.

Figure 20:
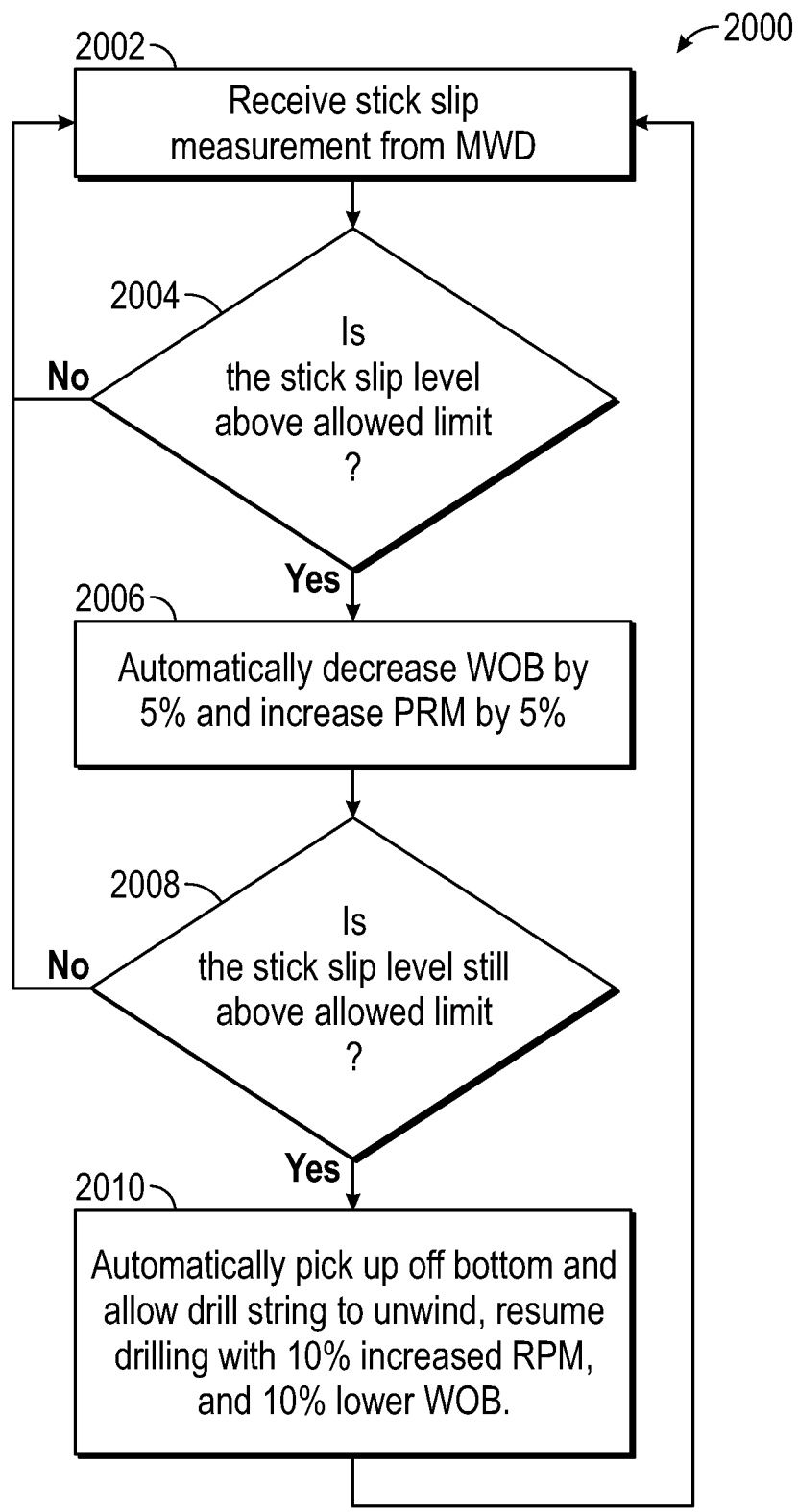
FIG. 20 is a flow chart diagram illustrating performing a performing a preventative action in response to a stick slip measurement satisfying a threshold measurement, according to embodiments of the disclosure.

FIG. 20 is a flow chart diagram of a method 2000 illustrating performing a performing a preventative action in response to a stick slip measurement satisfying a threshold measurement, according to embodiments of the disclosure. The method 2000 is performed by processing logic that may include hardware (circuitry, dedicated logic, etc.), software (such as on a computer system or a dedicated machine), firmware, or some combination thereof. The method 2000 and/or each of their individual functions, routines, subroutines, or operations may be performed by one or more processors of a computing device (e.g., the surface processor 100 FIG. 10). In certain implementations, the method 2000 may be performed by a single processing thread. Alternatively, the method 2000 may be performed by two or more processing threads, each thread implementing one or more individual functions, routines, subroutines, or operations of the methods.

For simplicity of explanation, the method 2000 is depicted and described as a series of operations. However, operations in accordance with this disclosure can occur in various orders and/or concurrently, and with other operations not presented and described herein. For example, the operations depicted in the method 2000 may occur in combination with any other operation of any other method disclosed herein. Furthermore, not all illustrated operations may be required to implement the method 2000 in accordance with the disclosed subject matter. In addition, those skilled in the art will understand and appreciate that the method 2000 could alternatively be represented as a series of interrelated states via a state diagram or events.

The surface processor 100 may be included a in system having a tool drill string and a downhole device 14 including a downhole processor. The system may include a memory storing instructions and the surface processor 100 is communicatively coupled to the memory, and the surface processor 100 is configured to execute the instructions. The surface processor 100 may include one or more processing devices. One or more machine learning models 1007 may be generated by the artificial intelligence engine 1040 and/or the training engine 1030 and may be trained to perform one or more operations of the method 2000. Any of the data received by the surface processor 100 may be included and/or presented in any applicable report disclosed herein.

At 2002, the surface processor 100 may receive lateral vibration measurement from the downhole device 14. At 2004, the surface processor 100 may determine whether the lateral vibration level is above an allowed threshold measurement. If not, the surface processor 100 may continue to 2002 to receive additional lateral vibration measurements. If so, at 2006, the surface processor 100 may perform a preventative action, such as automatically increase (e.g., perform a control instruction) a weight on bit by a certain amount (e.g., 10%) and decrease RPMs by a certain amount (e.g., 10%).

At 2008, the surface processor 100 may receive additional lateral vibration measurements after the preventative action is performed, and the surface processor 100 may determine whether the axial vibration level is still above the allowed threshold measurement. If not, the surface processor 100 may continue to 1802 to receive additional lateral vibration measurements. If so, at 2010, the surface processor 100 may perform a more drastic or urgent preventative action, such as automatically picking the tool drill string off bottom and allowing the tool drill string to unwind. The surface processor 100 may cause drilling to resume by slowing ramping of RPMs from a reduced amount (e.g., 50%) of an original value and the weight on bit back to nominal levels.

In accordance with the present disclosure, data is electronically collected from a then MWD interface 1050 and the EDR system 1054 (i.e. Pason) in order to create reports and monitor measurements. Further, the application of the present disclosure processes such data in order to identify (and, in some cases, predict) potential trouble areas or conditions that are outside of predetermined range(s).

Reports and incident notifications along with pertinent logs are automatically emailed or otherwise electronically transmitted to a predetermined distribution list; such transmission can be triggered by occurrence of a preselected event or in accordance with a predetermined schedule. Additionally, off-cycle reports can also be created and transmitted to desired recipient(s) at any time. The application of the present disclosure can distribute incident notifications based on different preselected data parameters while providing suggested solutions to certain identified problem scenarios.

FIGS. 21 and 22 depict a sample of data 2100 and 2200 typically measured and available from a MWD operation that can be utilized in accordance with the software application executed by the surface processor 100 of the present disclosure. In some embodiments, the software application of the present disclosure receives data input and generates reports, incident notifications and logs that can be emailed or otherwise electronically transmitted to predetermined recipients; said reports, incident notifications and logs reports, incident notifications and logs can include the following:

| REPORTS | INCIDENT NOTIFICATION | LOGS (LAS & PDF) |
|---|---|---|
| Conformance | Flatline High Shock | ROP |
| Survey | Differential Spike WITS fallout | SPP |
| Daily | WITS reconnect | Standpipe pressure |
| End of Run | MTF to GTF or vice versa | Rotary |
| Corrected | MWD Pressure & Standpipe | WOB GPM |
| Survey | pressure | Bit Depth |
| INC/clNC | Miss Sync or Decode Prediction End | Flow % |
|  | of Run Health Prediction Gamma | INC vs CINC |
|  | Change |  |
|  | Lost Returns Indicator |  |
|  | Survey Miss Decode |  |
|  | Short Cyle |  |

Conformance Reports

Figure 23:
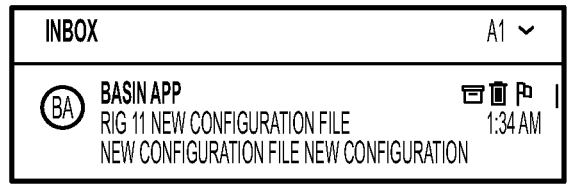
FIG. 23 depicts an illustrative example of a conformance report, which can be stored for later use or included with an end of well report, according to embodiments of the disclosure.

The setup and performance of the MWD system should be verified that the downhole device 14 and the surface processor 100 are correctly configured and compatible. This conformance of the downhole device 14 and the surface processor 100 is documented (and, when required, forwarded to a remote location) for approval. The software application of the present disclosure may automatically collect the data regarding the downhole device 14 and the surface processor 100, prepares a conformance report and electronically sends the report to a predetermined distribution list. FIG. 23 depicts an illustrative example 2300 of a conformance report, which can be stored for later use or included with an end of well report.

The MWD downhole device 14 measures and provides the direction of the bend in the mud motor or high side of the motor, also referred to sometimes as the toolface.

Figure 24:
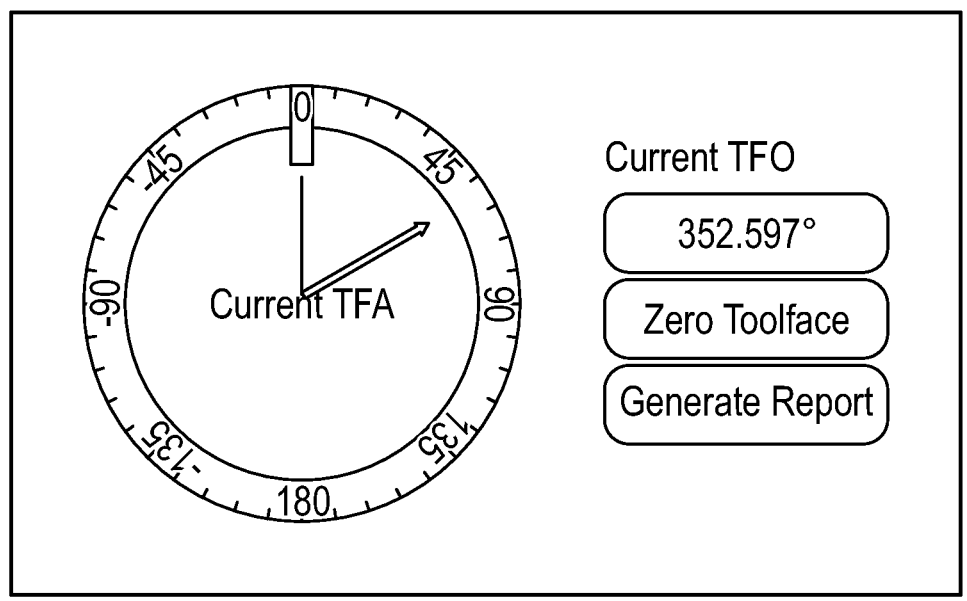
FIG. 24 depicts an illustrative example of a TFO report, which can be stored for later use or included with an end of well report, according to embodiments of the disclosure.
Figure 26:
FIG. 26 depicts an illustrative example of a daily report, which can be stored for later use, utilized by on-site operator, or sent to a remote operations control center or predetermined distribution list, according to embodiments of the disclosure.
Figure 29:
FIG. 29 depicts an illustrative example of a daily report, which can be stored for later use, utilized by on-site operator, or sent to a remote operations control center or predetermined distribution list, according to embodiments of the disclosure.
Figure 31:
FIG. 31 depicts an illustrative example of a flatline report, which can be stored for later use, utilized by on-site operator, or sent to a remote operations control center or predetermined distribution list, according to embodiments of the disclosure.
Figure 34:
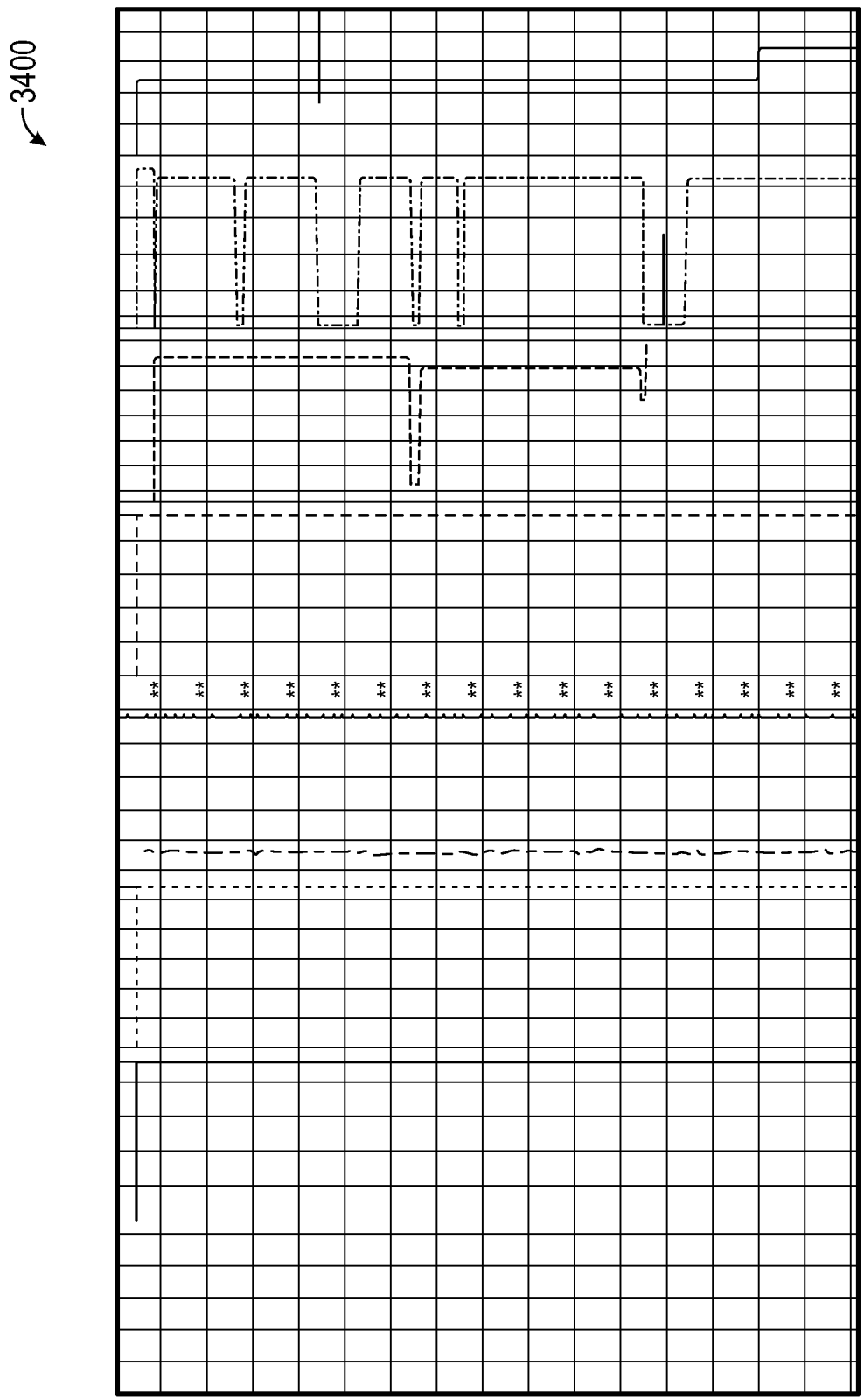
FIG. 34 depicts an illustrative example of a flatline report, which can be stored for later use, utilized by on-site operator, or sent to a remote operations control center or predetermined distribution list, according to embodiments of the disclosure.

Defining the high-side of the downhole device 14 can be critical when directionally steering a well path. Confirming that the downhole device 14 has been properly high-sided and the surface processor 100 has the offset is important for calculating the correct toolface. An incorrect toolface can cause drilling in an undesired direction. The software application of the present disclosure may create a report by collecting the data from the Toolface Offset utility (TFO) along with on-site pictures to verify that the downhole device 14 has been properly high-sided. FIG. 24 depicts an illustrative example 2400 of a TFO report, which can be stored for later use or included with an end of well report.

The MWD Configuration file and a passing or failing comparison report may be sent to the distribution list when the MWD Configuration file is committed to the downhole device 14 and surface processor 100. The software application of the present disclosure may utilize the following input, output and control for this function:

Inputs
  MWD Config comparison file TFO utility file
Outputs Notification
  MWD Config comparison file sent to email distribution and notes whether the compare passed or failed.
  TFO Report (file and pictures) sent to email distribution
Control
  When the MWD Config is Committed the system generates the comparison file of the downhole device 14s to the surface system. This comparison file is sent to a folder. A new file in the folder generates the email to the distribution.
  Completion of the high side of the tool. Execution of the TFO Utility generates a TFO Report which is sent to a folder. A new file in the folder generates the email to the distribution.
Outputs
  Survey Report A survey report is typically required for each well drilled. Such survey reports are submitted to the governmental or regulatory agency that governs the drilling of oil and gas wells. The survey report generally contains the well definition and the survey table which defines the location of the well path. A survey table is also used to steer the well by personnel on-site or at a remote operations center; a survey table can include a tie-in survey, INC, AZM and survey depth. All subsequent surveys are typically calculated relative to the tie-in survey. A survey is taken periodically (typically during pipe threaded connection make-up) by measuring the downhole device 14 INC and AZM and calculating the survey depth. The MWD survey measurement, INC and AZM and the current survey depth is used to calculate the required parameters and then populate the survey table. FIG. 25 depicts an illustrative example 2500 of a survey report, which can be submitted to a governing regulatory agency, stored for later use or included with an end of well report. The software application of the present disclosure utilizes the following input, output and control for this function:

INPUTS
  Header Info Rig/Well Info, Tie In survey (INC, AZM & Survey Depth)
  MWD   Survey data (INC AZM DipA MagF Grav)
  EDR   Survey depth Outputs
  Calculated Survey Table with all pertinent job information that can be used for submission to the TRRC
Notification
  Survey table sent via email based on a predefined frequency.

Control
  Output of each survey is based on Valid qualifiers (DipA, MagF, Gray) and the end of the survey sequence which is either seeing a Tool Logging Sequence ID (Sliding Sequence) or Dynamic Sequence ID (Rotating Sequence) if present or seeing 2 toolface or gamma counts, not typical in survey sequence.
Daily Report A daily report may be automatically generated and sent to a predetermined distribution list on a predetermined schedule. The software application of the present disclosure may collect data from a predetermined period (typically the last 24 hours) and generate a report. In some embodiments, the report has a header that defines the job information, the MWD tools downhole, the bit to sensor offsets for the gamma and orientation sensors, the mud motor downhole and any other job information or parameter desired. As an illustrative example, a daily report can include, without limitation, the following information:

| Total feet drilled | Highest temperature | Latest survey |
| Total circulating hours | Current pump pressure | Footage made last 24 hours |
| Total surveys | Latest depth | Problems in last 24 hours |
| Highest shock | Latest temperature | Battery2 switch |

FIGS. 26-29 depict illustrative examples 2600, 2700, 2800, and 2900 of a daily report, which can be stored for later use, utilized by on-site operator, or sent to a remote operations control center or predetermined distribution list. The software application of the present disclosure may utilize the following input, output and control for this function:

| INPUTS | |
|---|---|
| MWD | Survey (Inc, Azm, DipA, MagF, Grav) Temperature Shock/Vib |
| | Battery2 switch (accumulate Bat2 time on) |
| | Current hole depth - Day start depth |
| | (ie mid night to mid |
| EDR night) | |
| | Pumps on time and Pump off time ROP (Rate of Penetration) SPP (Stand pipe pressure) Rotary |
| Application | Job date and time of start |

Outputs
  Daily Report
Notification
  Daily Report sent via email based on predefined frequency that includes but not limited to:
  Total feet drilled for the day
  Pumps on vs Pumps off total for the day (midnight to midnight) Table of ROP, SPP,
  Standpipe pressure and Rotary by hour for the day
    Quality and pulse height to be added to the table above
    The Incidents within the last 24 hour
Control
  Reports sent based on report time and frequency Generate button to manually create and send report

| LOGS (both LAS and .pdf) | | |
|---|---|---|
| ROP | WOB | INC vs CINC |
| SPP | GPM | |
| Standpipe pressure | | Bit Depth |
| Rotary | Flow % | |

Flatline Incident

A flatline is defined as a condition wherein mud pumps are operating at or above a predetermined threshold value without receiving a telemetered value for more than a predetermined flatline time period or interval. FIG. 30 depicts an illustrative example 3000 of a flatline notification alert generated by the software application of the present disclosure.

A flatline condition can occur for a number of different reasons. As soon as a flatline condition is detected a notification may be generated and sent to the pre-defined distribution list. In some embodiments, a notification contains header information that defines the well and the job along with the current conditions and EDR logs required to trouble shoot and determine root cause the incident. FIGS. 31-36 depict illustrative examples 3100, 3200, 3300, 3400, 3500, and 3600 of a flatline report, which can be stored for later use, utilized by on-site operator, or sent to a remote operations control center or predetermined distribution list.

When a MWD downhole device 14 stops sending data it can be indicative of a device failure. This function looks to ensure that pump pressure is above a predetermined threshold by checking the rig pressure transducer as well as the MWD system pressure transducer. If it is determined that the pump pressure is adequate on both transducers, the present disclosure may look for telemetered values. If more than a predetermined time threshold passes without receiving a telemetered value and the pumps on it may send a flatline warning along with the information needed to trouble shoot the issue. Further, in some embodiments, control instructions may be performed. The software application of the present disclosure may utilize the following input, output and control for this function:

| INPUTS |
| --- |
| MWD MWD Standpipe Pressure |
| Telemetered Values |
| EDR Rig Standpipe Pressure |

Outputs
  Event based reports
Control
  Pumps on Threshold (PSI)
  Flatline Interval (Seconds)
Logs
  Flatline Report
  PDF EDR Logs
  LAS EDR Data
Notification:
  If the RFD reads zero:
    Check for Lost Returns Notification condition and if present follow the recommendations.
    If there is NOT a Lost Returns condition
    Change out the transducer cable and Rig Floor Display (RFD), recycle pumps
    If time permits change out one at a time to understand the root cause
  If the RFD shows pressure but is off by greater than +−20%:
    Change Surface Gear (RFD, Transducer and transducer cables) an recycle pumps
    If time permits change out one at a time to understand the root cause
    If the issue persists then it's a downhole device issue
  If the difference in Electronic Drilling Recorder (EDR) pressure and the Measurement While Drilling (MWD) transducer pressure are greater than 20% then
  Do the Following:
    Change out RFD, transducer and transducer cable, cycle pumps to reestablish the handshake with Wellsite Information Transfer Specification (WITS).
    (These can be changed 1 at a time or all at once depending on the time allowed) If the issue persists then it's a downhole tool issue

High Shock Incident

Figure 37:
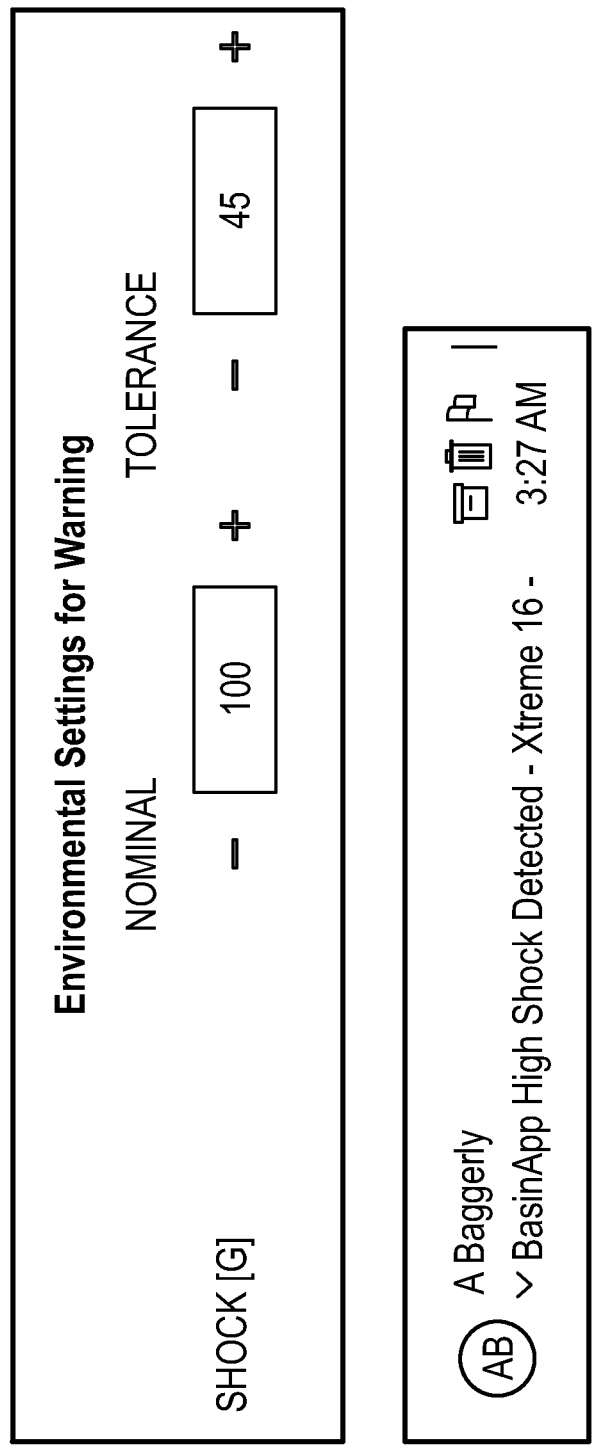
FIG. 37 depicts an illustrative example of a high shock report, which can be stored for later use, utilized by on-site operator, or sent to a remote operations control center or predetermined distribution list, according to embodiments of the disclosure.

High Shock and vibration can occur when a reading above a predetermined parameter (or measurement) is received. After this occurs, a notification may be promptly sent out to a predetermined distribution list. In some embodiments, a control instructions may be performed. FIG. 37 depicts an illustrative example 3700 of a high shock report, which can be stored for later use, utilized by on-site operator, or sent to a remote operations control center or predetermined distribution list.

Shock is detrimental to a MWD downhole device 14. Quickly knowing that a device is experiencing high shock allows a driller to make changes and reduce the high shock. The downhole device 14 measures the shock with accelerometers and telemeters the value to surface. The surface processor 100 has a predetermined high shock threshold programmed.

When the telemetered shock value is greater than or equal to the programmed high shock threshold then the value is flagged. When a high shock event occurs, the surface processor 100 may send out an electronic notification, or perform control instructions. The software application of the present disclosure may utilize the following input, output and control for this function:

Inputs
  MWD Shock Value, High Shock Threshold, Gamma EDR WOB, ROP, RPM, Differential Pressure
Outputs
  High Shock notification message
Control
  Event based—Shock value greater than or equal to the High Shock Threshold
Logs
  LAS with down hole parameters for trouble shooting purposes
  PDF logs with down hole parameters and shock and vibration data for correlation
Outputs
Notification:
  Assess the Gamma value change, Electronic Drilling Recorder (EDR) values by depth Weight on Bit (WOB), Rate of Penetration (ROP), Revolutions Per Minute (RPM), and Differential Pressure)
  A gamma count change (+−10%) along with a change in ROP and Differential is a typical indication of formation change.
  Gamma count change less than +−10%, with an increase in WOB, RPM, Differential is a typical indication of running hard and fast. Slower down.
  If the shock value is greater than the customer definable threshold, an alert is sent along with the Gamma value change and EDR logs (WOB, ROP, Depth, RPM and Differential). The high shock could be due to a change in formation or a change in drilling parameters. The goal is to determine which one it is and make the necessary change.

Differential Spike Incident

Figure 38:
FIG. 38 depicts an illustrative example of a differential pressure report, which can be stored for later use, utilized by on-site operator, or sent to a remote operations control center or predetermined distribution list, according to embodiments of the disclosure.

When a sudden increase in differential pressure greater than a predetermined value is recognized a notification may be sent and/or control instructions may be performed. FIGS. 38-40 depicts an illustrative examples 3800, 3900, and 4000 of a differential pressure report, which can be stored for later use, utilized by on-site operator, or sent to a remote operations control center or predetermined distribution list.

When a mud motor stalls it is will create a differential spike that can be identified using the rigs EDR data. These events can damage a mud motor and potentially jeopardize a drilling operation. The software application of the present disclosure may identify an event and send information needed to determine the cause of the problem, and automatically perform control instructions, such as changing operating parameters of the drilling assembly 40 and/or raising the tool drill string. The software application may utilize the following input, output and control for this function:

| INPUTS | |
|---|---|
| EDR | Rig Pump Pressure - WITS ID 0121 |
| | Differential Pressure - WITS ID 0171 |

Outputs
  Event based log
  LAS report with down hole parameters PDF logs with down hole parameters
Control
  Event based on 3 factors: Duration of time
  Amount of differential pressure spikes Sudden Increase of Differential Pressure
Logs LAS
  Depth, WOB, ROP, SPP, Rotary, GPM PDF Logs
  Depth, WOB, ROP, SPP, Rotary, GPM
Notification:
  Assess the Drilling parameters, WOB, RPM and ROP
  If the drilling parameters were increased and the Diff Spike occurred Change the WOB and/or RPM, back off
  If the drilling parameters stayed the same assess the gamma change. If the gamma change was greater than +−10%
  Change the WOB and/or RPM to better drill the change in formation If all parameters stay the same, WOB, RPM, Gamma, ROP and the SPP increases
  Potentially a clogged bit or motor is going out.
  A spike is defined as a sudden increase and decrease back to normal in Differential pressure.
  The purpose of monitoring the Differential spike is protect the motor and also determine the cause of missed or poor quality decodes.

WITS Fallout Incident

If a WITs communications cable becomes disconnected from a port the software application of the present disclosure may detect the condition and send an alert and/or perform control instructions. For example, a WITS fallout notification message may provide: "WITs dropout has been detected for source MWD WITs on port COME."

Figure 41:
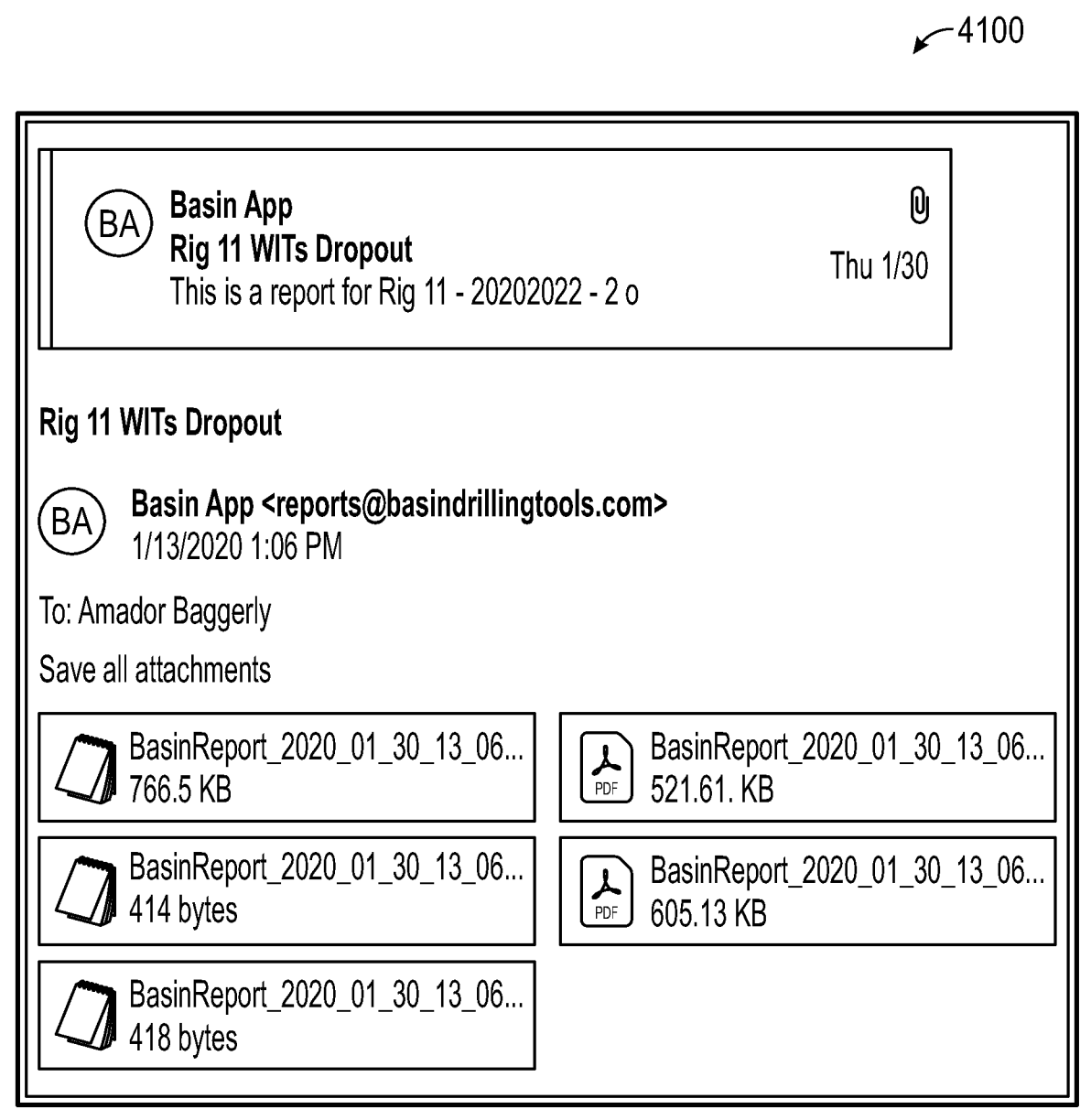

FIGS. 41, 42, and 43 depicts an illustrative example 4100, 4200, and 4300 of a WITs fallout report, which can be stored for later use, utilized by on-site operator, or sent to a remote operations control center or predetermined distribution list. Prompt notification beneficially permits quick remedial action. The software application of the present disclosure may utilize the following input, output and control for this function:

Inputs
Outputs
  WITS fallout notification message
Control
  Event based—COM port status change from active to inactive—Loss of connection to the WITs port.
Logs
  N/A
Notification:
  The WITs cable has been unplugged from COM port x. Plug in the WITS cable to COM port x.
  If Gamma is being logged
  Pick up off bottom, wait until WITs communication is reestablished, (WITs reconnect message is received). Continue drilling.
  If the COM port is not recognized and WITs traffic stops then this is an indication that the cable became unplugged. The software application of the present disclosure may notify the user telling them which cable to plug into which port. This could cause you to miss a gamma. Pick off bottom and continue drilling once WITs has been reestablished. This will make sure to log that gamma value at that depth.

WITS Reconnect

Once the WITS cable is reconnected an email or other electronic message is sent notifying a predetermined distribution list that WITs has been reestablished. FIG. 44 depicts an illustrative example 4400 of a WITs reconnect notification, which can be utilized by on-site operator, or sent to a remote operations control center or predetermined distribution list. The software application of the present disclosure may utilize the following input, output and control for this function:

Inputs
  COM port status
Outputs
  WITS Reconnect notification message
Control
  Event based—COM port status change from inactive to active—Re connection to the WITs port
Logs
  N/A
Notification:
  The WITs cable was plugged into COM port x.
  If logging Gamma, pick up off bottom and then continue drilling.
  Once the cable is plugged back in the COM port will be recognized and WITs traffic will be resumed.

MWD Pressure & Standpipe Pressure Notification

The software application of the present disclosure may compare a rig transducer reading to a MWD transducer reading. This may prevent downtime due to unnecessary trouble shooting by identifying a surface issue versus a downhole issue. If the 2 readings vary by more than a predetermined threshold, the software application of the present disclosure may detect the condition and send an alert and/or perform control instructions. The alert or notification can be utilized by on-site operator, or sent to a remote operations control center or predetermined distribution list. Prompt notification beneficially permits quick remedial action.

Figure 46:
FIG. 46 depicts an illustrative example of a MTF/GTF notification, which can be utilized by on-site operator, or sent to a remote operations control center or predetermined distribution list, according to embodiments of the disclosure.

When using a positive pressure MWD tool the transducers and transducer cables are vital to decoding measured data. When a transducer or cable stops working it can appear as if the MWD downhole device 14 stopped working and could potentially cause an operator to trouble shoot the wrong issue. The disclosed technique may identify a hardware failure to prevention unnecessary downtime. The software application of the present disclosure may utilize the following input, output and control for this function:

Inputs
  Rig Standpipe Pressure Transducer—0121 MWD Transducer Pressure—M0121
Outputs
  Event based report
Notification:
  A difference in EDR and MWD pressure has occurred.
  There is a surface issue that will require the transducer to be changed.
Control
  Rig Pressure Transducer ><+/−15% MWD Pressure Transducer LOGS
  PDF and LAS Incident report MTF to GTF (or Vice Versa) Switch Notification A function that the MWD system performs may include the switch from MTF to GTF or vice versa. When this event occurs, the software application of the present disclosure may automatically send an electronic notification to a predetermined distribution list of recipient(s). This notification alerts the MWD operator and/or a remote operator that the tool has changed from MTF to GTF or back. FIGS. 45, 46, and 47 depicts an illustrative example 4500, 4600, and 4700 of a MTF/GTF notification, which can be utilized by on-site operator, or sent to a remote operations control center or predetermined distribution list.

The switch over from Magnetic Toolface (MTF) to Gravity Toolface (GTF) is based on a programmed inclination threshold. The switchover is based on the event occurring. When the tool switches from MTF to GTF and the software application sends out an electronic notification. The software application of the present disclosure may utilize the following input, output and control for this function:

| INPUTS | |
|---|---|
| Telemetered data | aTFA (which is automatically calculated based on the threshold) |
| Programmed threshold | Toolface Switchover angle |

Outputs
  The current mTFA or gTFA
  The survey INC, AZM, DIPA, MAGF, GRAV
  The current measure depth
Notification:
  The Toolface has switched from mTFA to gTFA or gTFA to mTFA Current mTFA or gTFA
  Last gTFA or mTFA respective of the current value
  Current Survey INC, AZM, DIPA, MAGF, GRAV
  Current measure depth
Control
  Event based—The switchover from mTFA to gTFA or vice versa The Toolface Switchover angle
  Logs
  N/A Email Distribution Description The email distribution list is made up of individual email addresses or a defined group of individual email addresses. The Time and Frequency of thereports and incident notifications can be defined in advance and configured by a user.

Email Group
  A defined Group Name made up of any valid email addresses
Email Address
  Any valid email address Example Email Group
  GROUPNAME: Any alpha numeric name valid email 1
  valid email 2
  valid email 3

FIG. 49 depicts an illustrative example 4900 of a predetermined email distribution list.

Miss Sync or Miss Decode Prediction Description

Over time and depth and increased noise, the system can start to decode improperly. As you get deeper in the well the pulse signal attenuates and potential for noise increases. As the signal attenuates or noise increases the Signal to Noise Ratio (SNR) decreases making it more difficult to recognize sync or decode correctly. There are different parameters that can impact the quality of the decode. This could be the wrong size poppet orifice combination for the conditions, noisy pumps, attenuation due to depth or reduced pulse amplitude due to pulse width. Changing parameters can help to increase the decode quality and continue to drill.

Knowing ahead of time that the conditions are worsening and the potential for improper sync or decoding can help to identify and correct the potential issue. Monitoring data quality, depth and pulse amplitude can predict a potential for future miss sync, decode issue or pump issues. The surface processor 100 monitors the data quality and pulse amplitude from the Measurement While Drilling (MWD) interface and depth from the Electronic Drilling Recorder (EDR) system. Based on these parameters the system can predict the potential for diminishing decode quality and recommend parameters to change and fix the potential issue. Further, the surface processor 100 may perform control instructions to cause the parameters to change.

Inputs
  MWD Data Quality, Pulse Amplitude EDR Depth
Outputs
  Miss Sync/Decode notification on the Rig Floor Display (RFD) screen as well as a Miss Sync/Decode PDF report. Both notifications will make the operator aware.
Notification and Prediction:
  Current Depth=x ft Data Quality=y %
  Current Pulse Amplitude=z psi
  The Decode Quality is decreasing. Checking the pulse history log and look for the following.
  Lower pulse amplitude
  Poppet Orifice configuration might not be sized appropriately for the depth Pulse width might need to be increased.
  Multiple pulses with similar amplitude or increase noise
  Additional noise could be coming from pumps, Check the pumps. Pulse width might need to be increased.
Control
  Event based—decreasing Data Quality End of Run Health Prediction Description After a run it assessment of the tool may be performed and a determination may be made if this tool should run again or get laid down. Running a tool that could potentially fail downhole could lead to an unnecessary trip, None Productive Time (NPT). Not rerunning a good tool reduces the overall operational efficiency. Managing the data from the tool at the rig site can increase the overall reliability and efficiency of the operation.

There are many factors that go into determining the health of the tool. Based on the last run a prediction of the tool health can be made. The software application of the present disclosure may monitor several inputs, see below, that are provided by the Measurement While Drilling (MWD) interface or the Electronic Drilling Recorder (EDR) and compares them to nominal values. A grade is given for each input value. An overall grade is given and a recommendation to run or lay the tool down, GO or NO GO, is provided. Each of the input values is provided along with the grade and the nominal value to give a complete assessment of the downhole device 14.

Inputs
  MWD Data Quality, Battery Voltage, Temp, Shock, Vibration, Bat2 time on EDR Depth
  Application Time, Issues reported Outputs
  Health PDF report with a recommendation to rerun or lay down the tool along with the information below.

Notification and Prediction:
  The tool is a GO or NO GO to run again Tool serial numbers
  Depth In/Out Circulating hours
  Issues reported for the run Total hours on tool for the well
  LOGS with a Green, Yellow, Red indicators for the following parameters: Data Quality
  Battery Voltage
  Temp Shock Vibration
  Bat2 time on CONTROL
  At the end of the run when the tool is coming out of the hole the data is automatically collected, assessed and a report is created.

Logs
  Corrected Survey Report (Superior QC or Mag Var)

Description
  The downhole device 14 reads the accelerometers (x,y,z) and magnetometers (x,y,z) and then calculates the Inclination (INC), Azimuth (AZM), Dip Angle (DipA), Total Gravity (GRAV) and Total Magnetic Field (MAGF). Survey Correction Services such as Superior QC and Mag Var will take the axis (e.g., 6) values and calculate a corrected survey (INC, AZM, DipA, GRAV, MAGF) for the given area and conditions. Corrected surveys are needed for certain wells depending on the drilling requirements.

The accelerometers (x,y,z) and magnetometers (x,y,z) values are decoded from the tool and sent to the survey correction service provider. These values are sent via an Application Programming Interface (API) provided by the survey correction service provider. The survey correction service providers use algorithms that calculate the corrected survey. The corrected survey is then returned via an API. The corrected values are logged as the corrected survey value on the survey report.

Inputs
  MWD X, Y & Z Accelerometer values, X, Y & Z Magnetometer values

Outputs
  A Corrected Survey report with the 6 axis values and the corrected survey values, INC, AZM, DiPA, GRAV, MAGF Control
  At every survey the 6 axis values are sent to the desired service provider via an API.
  The values are returned from the desired service provider via an API Logs
  Corrected survey report INC/cINC Log Report Description
  The Inclination (INC) is a parameter when drilling a well. The INC is measured at every connection. This could be every 90 ft. During this 90 ft. there may be no way to tell if the tool drill string is changing in INC and getting off track without a time consuming recycle of the pumps. The Continuous Inclination (cINC) is measured while drilling down the stand. This cINC measurement is taken by the downhole device 14 and telemetered to the surface processor 100. The cINC measurement is impacted by the rotation and movement of the tool drill string. This measurement is filtered to remove the unwanted movement of the tool drill string. The log report will show how the cINC value correlates to the survey INC and provide confidence in the measurement. Knowing what is happening during this 90 feet of drilling can help the Directional Driller to make better steering decisions.

The software application of the present disclosure may collect and log the INC and the cINC measurements from the Measurement While Drilling (MWD) tool. Each time a survey INC and cINC is taken, with adequate Quality, it is logged along with depth and the data Quality value. These logs are sent with Survey Reports and Daily Reports.

Inputs
  MWD Survey Inclination, Cont. Inclination, Data Quality EDR Depth

Outputs
  INC vs cINC PDF report as well as a Log ASCII Standard (LAS) report with Survey Inclination, Continuous Inclination, Data Quality, and Depth.

Control
  The INC and cINC measurements with adequate Quality are logged along with depth and the data Quality value. The INC/cINC logs are sent with Survey Reports and Daily reports.

Logs
  LAS report: Depth, Survey Inclination, Cont. Inclination, Data quality PDF Log: Depth, Survey, Inclination, Cont. Inclination, Data quality Gamma Increase/Decrease Notification Description
  Identifies either a marker or drilling out of zone. When the bulk Gamma value changes by more than a set percentage then there is a change in formation. If just bulk gamma is used then this indicates a marker, a change in formation. Markers are used to correlate depth and formation. These markers can be used to define a kickoff point for the start of the curve or the landing depth of the curve. When Azimuthal Gamma is used then the it can be determined whether the downhole device 14 and/or drilling assembly 40 is going up or down within a formation. Knowing the direction of change in Gamma count tells you which direction you need to steer.

Steering in the right direction allows you to stay on track with your drilling program. The software application of the present disclosure may monitor the Telemetered Measurement While Drilling (MWD) Bulk Gamma Count, Gamma Up Count and the Gamma Down Count. When there is a change of x %, programmed by the user, in the Bulk Gamma then a change has occurred. The software application of the present disclosure then assesses the Gamma Up Count and the Gamma Down Count. If the Gamma up count is leading the Gamma down count, then the downhole device 14 and/or drilling assembly 40 heading up. If the Gamma down count is leading the Gamma up count, then the downhole device 14 and/or drilling assembly 40 heading down. A notification is provided with the current values and the direction of the source.

INPUTS
  MWD Gamma, UpGamma, DwnGamma,
  LftGamma-if available, RtGamma-if available
  EDR ROP Outputs
    Gamma Change notification on the RFD screen as well as a Gamma Change PDF report. Both notifications will make the operator aware.
Notification:
    Bulk Gamma: A change of greater than x % has occurred at a TVD of n ft. and a MD of m ft.
    Azi-Gamma: A change of greater than x % has occurred at a TVD of n ft. and a MD of m ft.
    The Up Gamma is larger than the DwnGamma indicating that the source is above. The DwnGamma is larger than the UpGamma indicating that the source is below.
Control
    When there is change in Gamma by a set percentage then a notification is sent.
    If just bulk Gamma is used then the percent change and the Gamma values are sent. If using Azimuthal Gamma then the UpGamma and DwnGamma values are assessed to determine the well is going up or down. A notification is sent along with the logs.
Logs
    Gamma with Bulk Gamma, UpGamma, DwnGamma, ROP and Left & Right Gamma if available
Lost Return Indicator Notification Description Lost circulation can disrupt the drilling process. A lost circulation condition requires the use of Lost Circulation material (LCM) to cure the problem. LCM comes in many different forms. Improperly mixing the LCM material can block or jam the pulser resulting in a flatline or miss sync/decode. Recognizing there is a Lost Circulation condition can help prevent a pulser issue or help identify the potential cause of an improperly working pulser. Recommendations on how to prevent or resolve the issue may be provided by the software application.

The software application of the present disclosure may monitor the Electronic Drilling Recorder (EDR) values, Flow, Pump Rate, Total Strokes and Depth. A decrease in Flow without a Pump Rate or Total strokes decrease is an indication of losing returns. The software application of the present disclosure may monitor these EDR values and assess the change. If the Flow decreases by 15%, and the Pump Rate or Total Strokes stays constant, then a notification may be sent and/or control instructions may be performed. The first thing to do is to make sure the LCM is properly mixed. If there is a flatline or miss sync/decode then circulating for a period of time or using a low viscosity sweep can clear a pulser blockage and resume normal operation.

INPUTS
    EDR Flow, Pump Rate, Total Strokes P1 + P2 + P3 + P4, Depth

Outputs
    Lost Returns notification on the Rig Floor Display (RFD) screen as well as a Lost Returns Portable Document Format (PDF) report. Both notifications will make the operator aware.
Notification:
    A potential lost circulation condition has been identified.
    Properly mix the LCM. Improperly mixed LCM can block or jam the pulser causing a flatline or miss sync/decode.
    Circulating for a period of time or using a low viscosity sweep may clear the blockage and flatline.
    Rotating the drill string may help as well as spudding.
Logs
    By depth, Flow, Pump Rate and Total Strokes
Survey Miss Decode Notification Description The system can come up in sync but miss decode the survey which means the survey is bad. The survey value is required in order to continue drilling. There are different reasons for a bad survey. This could be a miss decode or bad values in the Qualifiers, Dip Angle (DipA), Total Magnetic Field (MAGF) or Total Gravity (GRAV). If the Measurement While Drilling (MWD) sensor was moving when taking the measurement, then a bad value could have been measured. The MWD downhole device 14 must be still in order to accurately make measurements. If a bad value is decoded, then recognizing it as soon as possible is important in saving time. This requires the pumps to recycle in order to get a correct survey. Knowing this as soon as possible can reduce the amount of Non-Productive Time (NPT).

The software application of the present disclosure may monitor Data Quality, Sequence ID and Qualifiers to see if they are out of tolerance. A low Data Quality indicated a potential miss decode, A wrong decoded Sequence ID indicates a miss decode or a downlink has occurred in the downhole device 14. Out of tolerance Qualifiers indicates the survey is bad or there was a miss decode. If any of these conditions is observed, then it's a bad survey. The surface processor 100 may cause the pumps to be recycled and obtain a new survey. This reduces wasting rig time pumping up an entire bad survey.

Inputs
    MWD Data Quality, Sequence ID, Telemetered Data
Outputs
    Survey miss decode notification on the Rig Floor Display (RFD) screen as well as a Survey miss decode PDF report. Both notifications will make the operator aware.
Notification:
    It appears the survey is bad or miss decoded. Recycle pumps immediately as to not waste time.
Control
    Once a Survey Sequence ID is received with insufficient quality or mis decode the Survey Miss Decode is recognized
Short Cycle Notification Description The downhole device 14 has to synchronize with the surface processor 100. This is done by the tool sending up 4 precisely positioned pulses. The surface processor 100 is looking for these 4 pulses and once it finds them the downhole device 14 and surface processor 100 are synchronized, in sync. After the sync pulses the downhole device 14 usually sends up a survey sequence. There is another mode which is a short cycle where the tool comes up in sync and then sends the ToolFace/Logging sequence (TFSeq). This might not be the mode wanted. If this occurs and is not wanted, then the pumps need to be recycled to enter the survey sequence. If this is the desired mode, then no action is required.

Knowing the tool short cycled can be important in troubleshooting. The software application of the present disclosure may monitor the decoded Measurement While Drilling (MWD) decoded Sequence ID and Quality along with the Pumps off time as provided by the MWD interface and the Electronic Drilling Recorder (EDR) Depth. If the TFSeq ID comes up, then the tool has short cycled and a notification may be sent to alert the user and/or a control instruction may be performed by the surface processor 100. If the mode was unwanted then the surface processor 100 can recycle pumps to get into the correct mode, survey sequence. If the mode was intended, then the user can ignore the notification and continue drilling.

Inputs
  MWD Sequence ID, Pumps off Time, Data Quality EDRDepth

Outputs
  Short Cycle notification on the RFD screen as well as a Short cycle PDF report. Both notifications will make the operator aware that the tool short cycled, a message to recycle immediately to prevent wasted time, and what to do so that it doesn't short cycle again.

Notification:
  If the pumps were off over the recommended time for the tool to take a survey, then: Tool has short cycled.
  The TX delay time is n seconds, turn off pumps for n seconds plus 15 seconds with minimal movement. Resume drilling.
  The above scenario is more likely due to excess vibration and not allowing the tools vibration flow switch to cut off when pumps are off.
  If the pumps were NOT off over the recommended time for the tool to take a survey, then: Tool has short cycled.
  The TX delay time is n seconds, turn off pumps for n seconds minimal movement The above scenario is most likely due to not leaving the pumps off the recommended time for the tool to acquire a survey.

Control
  When the pumps are turned back on after being off, Voyager is looking for a Survey Sequence (SurSeq) ID. If a SurSeq ID isn't recognized and instead a Tool Face Sequence (TFSeq) that has adequate quality percentage then a short cycle notification is created and sent.

Figure 50:
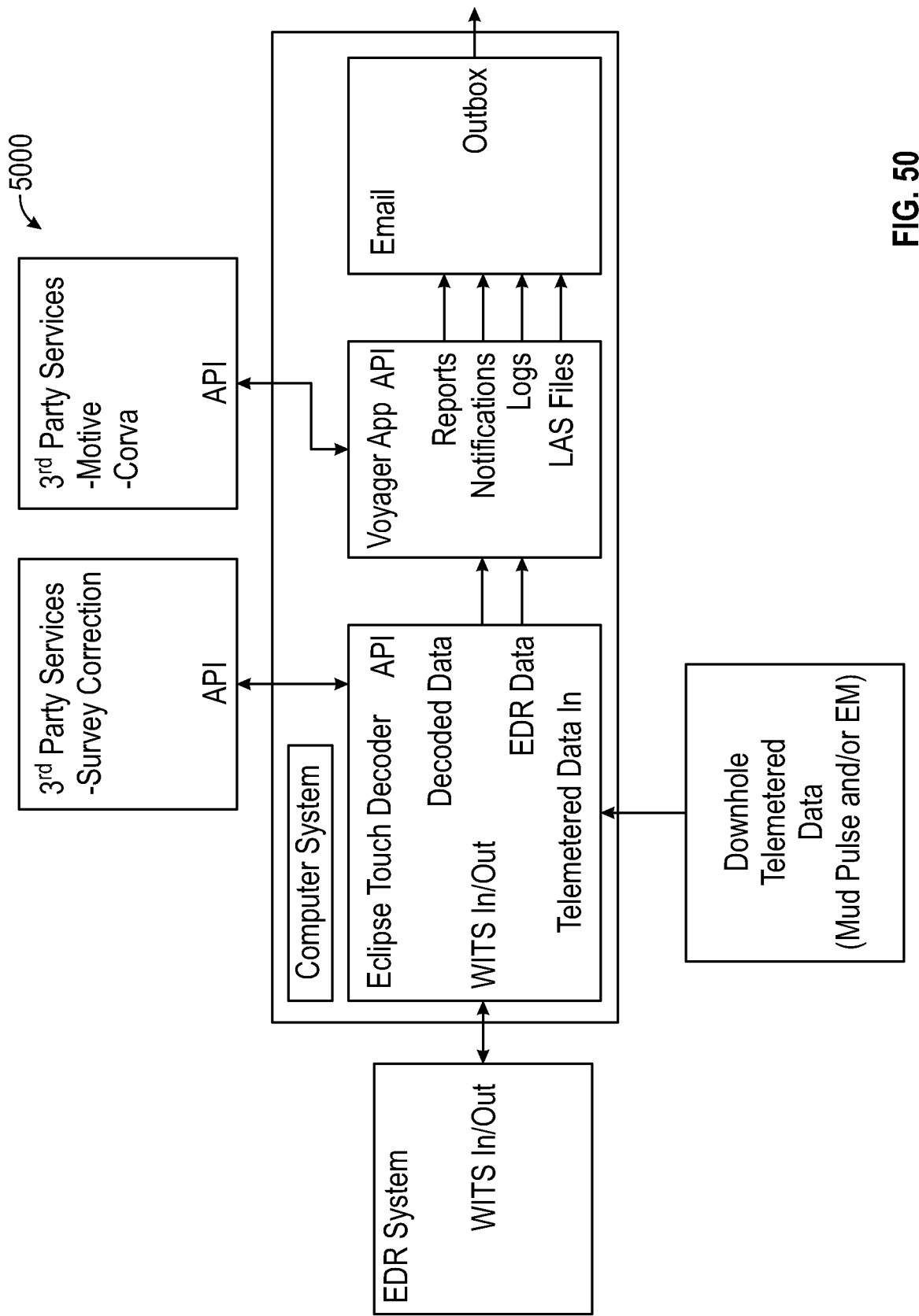
FIG. 50 depicts a component diagram of a software application executing a preventative action based on MWD data and drilling parameters, according to embodiments of the disclosure.

FIG. 50 depicts a component diagram 5000 of a software application executing a preventative action based on MWD data and drilling parameters, according to embodiments of the disclosure. As depicted, surface processor 100 (shown as "Computer System") includes a decoder that receives measurement data from an EDR system (via WITS) and an MWD downhole device 14 (these measurements are telemetered via mud pulse and/or electromagnetic). The decoder includes an API that enables calling a function from the third party services to correct survey data. The decoder transmits decoded data and EDR data to the software application disclosed herein. In some embodiments, the software application uses the data to perform any operation disclosed herein. In some embodiments, the software application uses the data to generate reports, send notifications, create logs, create LAS files, and email distribution lists. The software application may also use an API of a third party service for motive and/or corva.

Figure 51:
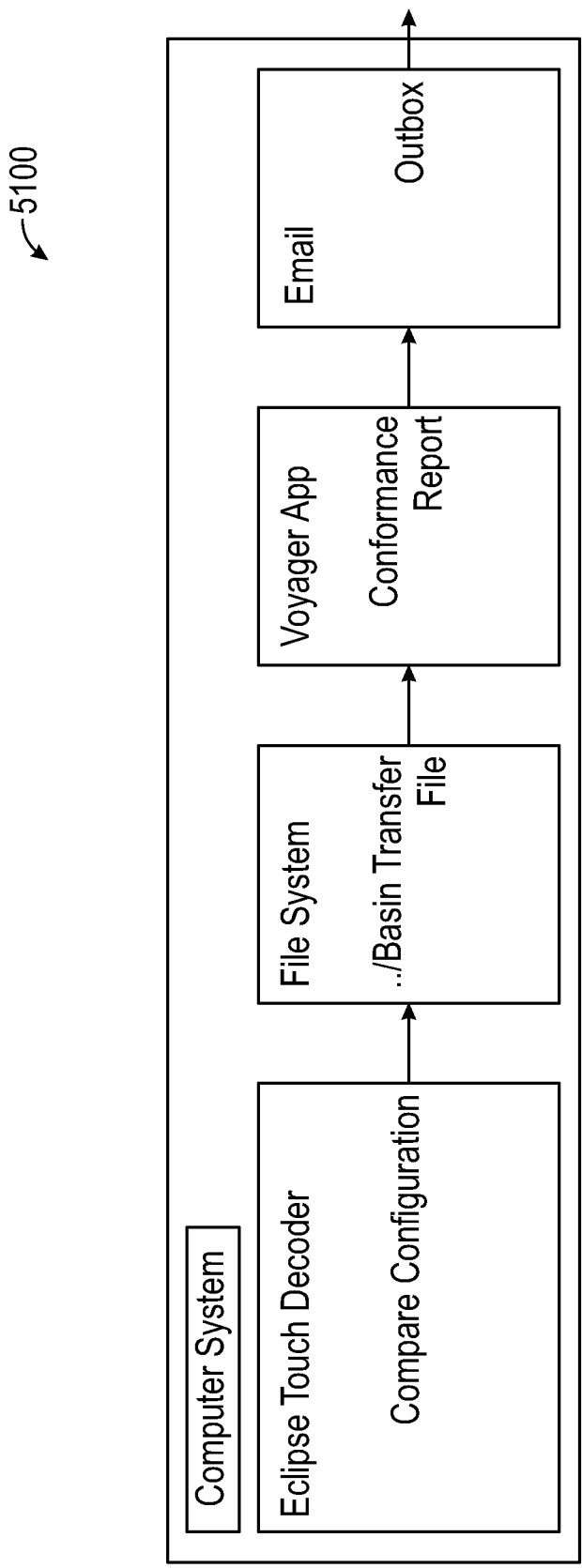
FIG. 51 depicts a component diagram of a software application generating a conformance report, according to embodiments of the disclosure.

FIG. 51 depicts a component diagram 5100 of a software application generating a conformance report, according to embodiments of the disclosure. As depicted, the surface processor 100 (shown as "Computer System") includes a decoder that compares configuration settings, a file system that stores the configuration files, the software application that generates a conformance report, and an email application that emails the conformance report.

Figure 52:
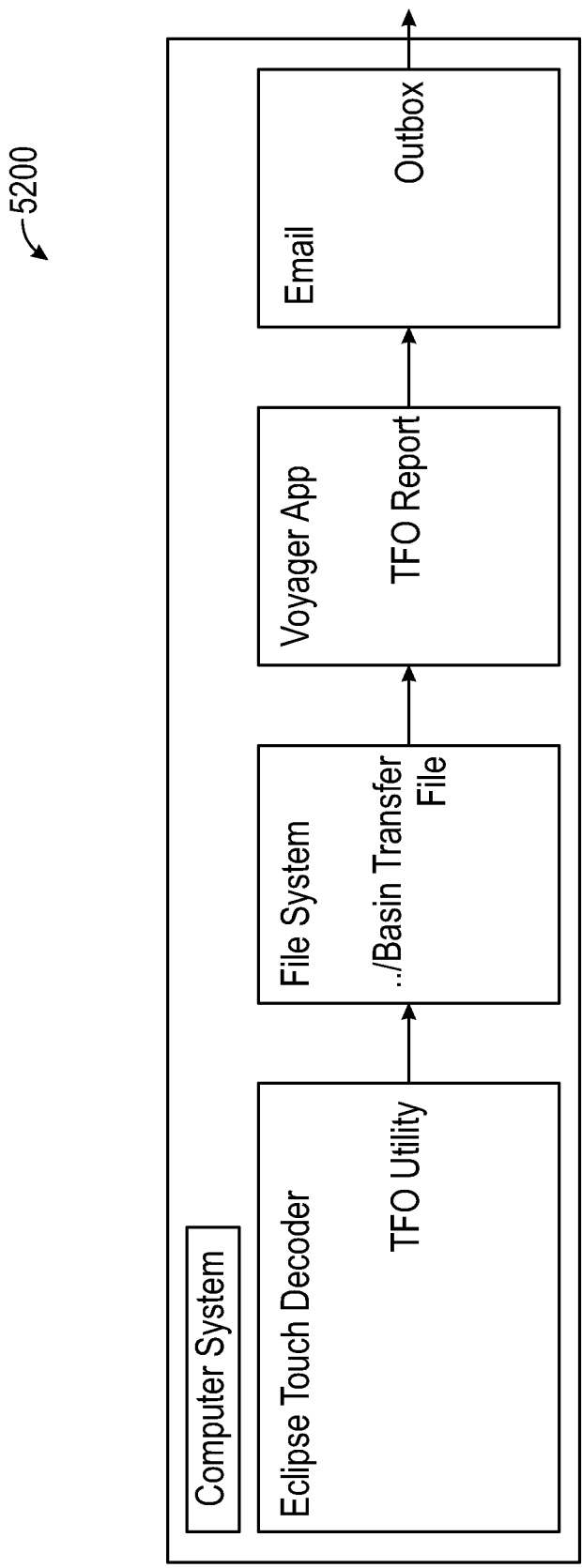
FIG. 52 depicts a component diagram of a software application generating a TFO report, according to embodiments of the disclosure.

FIG. 52 depicts a component diagram 5200 of a software application generating a TFO report, according to embodiments of the disclosure. As depicted, the surface processor 100 (shown as "Computer System") includes a decoder that TFO utility, a file system that stores the configuration files, the software application that generates a TFO report, and an email application that emails the TFO report.

Figure 53:
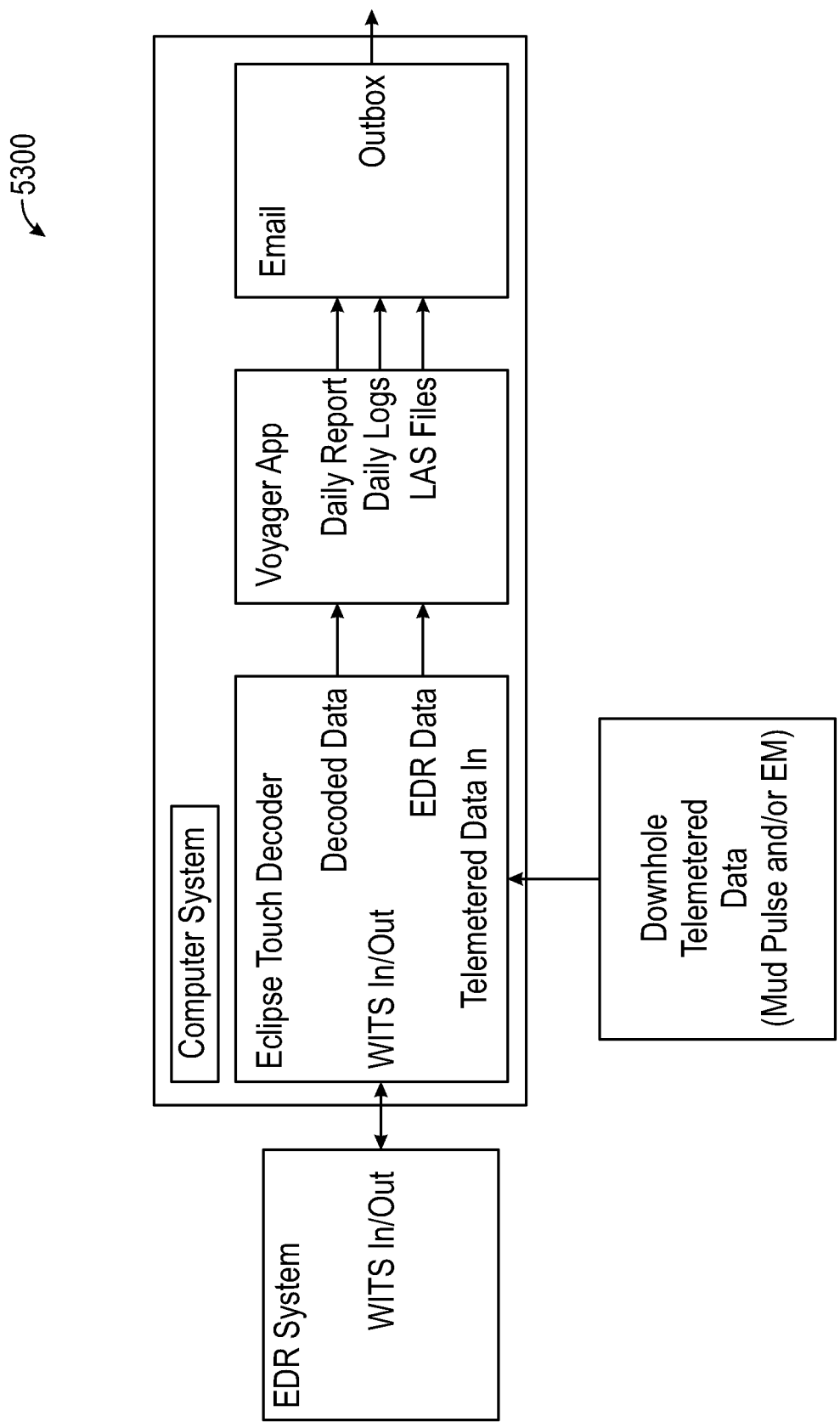
FIG. 53 depicts a component diagram of a software application generating daily reports based on MWD data and drilling parameters, according to embodiments of the disclosure.

FIG. 53 depicts a component diagram 5300 of a software application generating daily reports based on MWD data and drilling parameters, according to embodiments of the disclosure. As depicted, surface processor 100 (shown as "Computer System") includes a decoder that receives measurement data from an EDR system (via WITS) and an MWD downhole device 14 (these measurements are telemetered via mud pulse and/or electromagnetic). The decoder transmits decoded data and EDR data to the software application disclosed herein. In some embodiments, the software application uses the data to perform any operation disclosed herein. In some embodiments, the software application uses the data to generate daily reports, daily logs and LAS files. An email application may email the reports and/or files.

Figure 54:
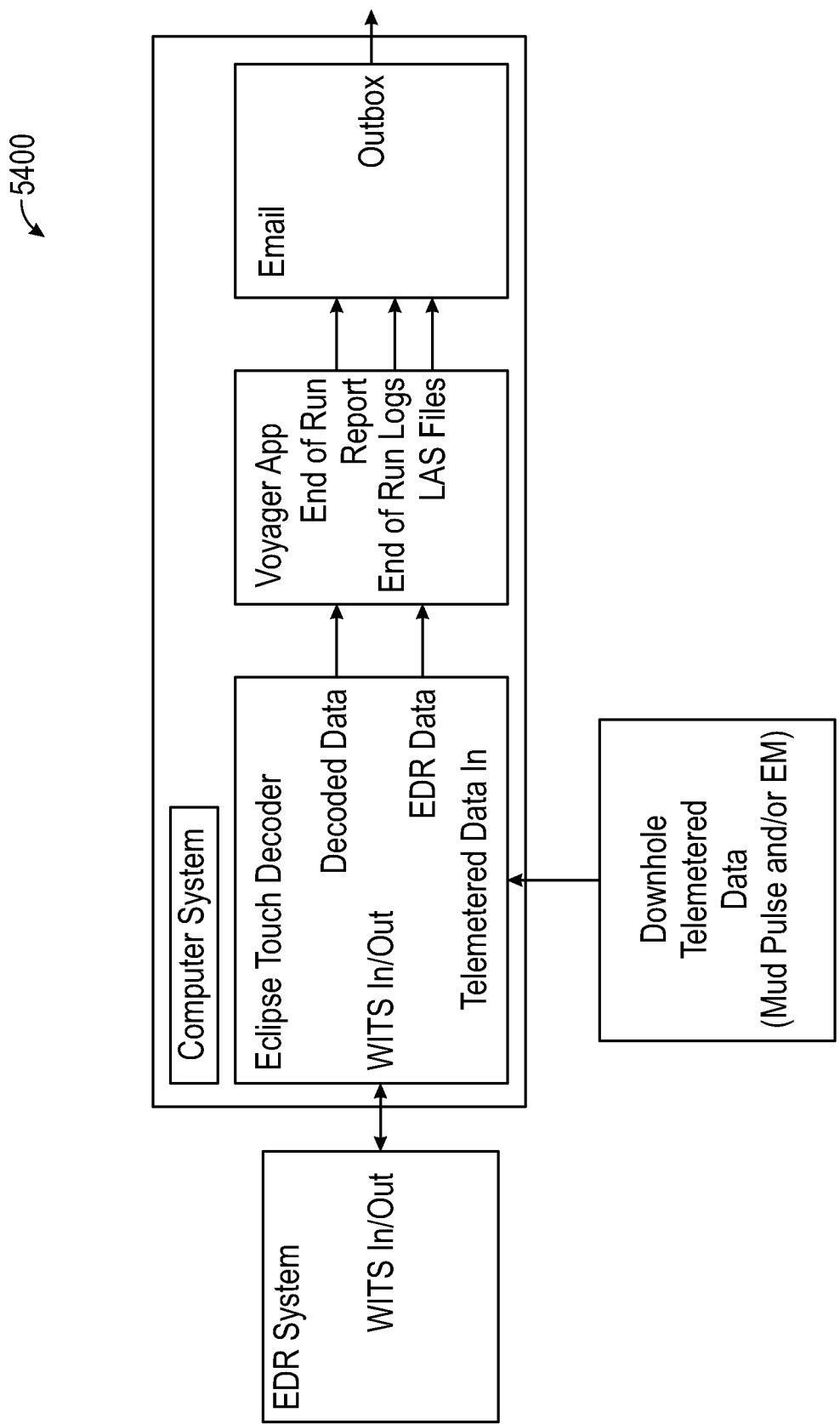
FIG. 54 depicts a component diagram of a software application generating end of run reports based on MWD data and drilling parameters, according to embodiments of the disclosure.

FIG. 54 component diagram 5400 of a software application end of run reports based on MWD data and drilling parameters, according to embodiments of the disclosure. As depicted, surface processor 100 (shown as "Computer System") includes a decoder that receives measurement data from an EDR system (via WITS) and an MWD downhole device 14 (these measurements are telemetered via mud pulse and/or electromagnetic). The decoder transmits decoded data and EDR data to the software application disclosed herein. In some embodiments, the software application uses the data to perform any operation disclosed herein. In some embodiments, the software application uses the data to generate end of run reports, end of run logs, and LAS files. An email application may email the reports and/or files.

Figure 55:
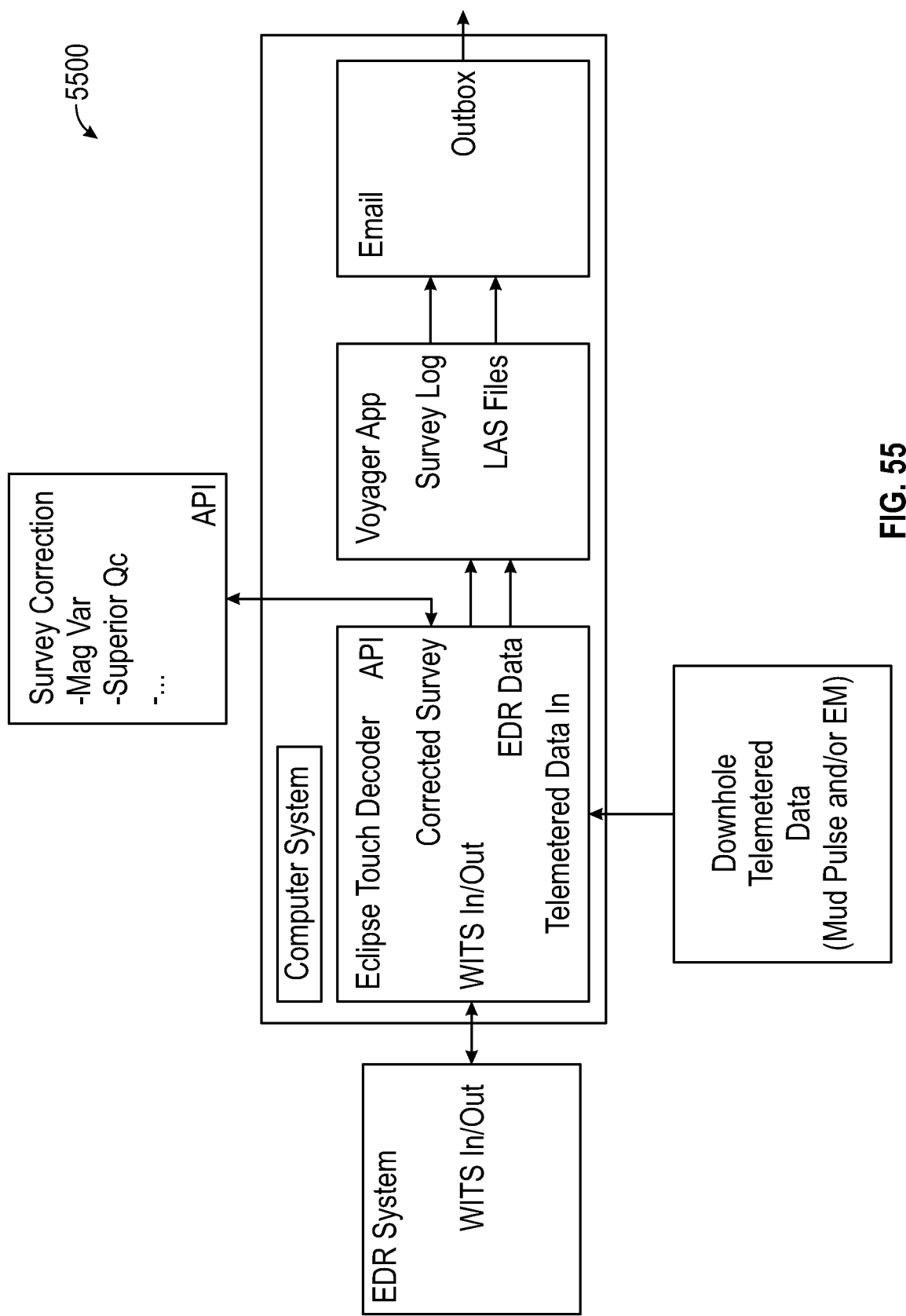
FIG. 55 depicts a component diagram of a software application generating survey reports based on MWD data and drilling parameters, according to embodiments of the disclosure.

FIG. 55 depicts a component diagram 5400 of a software application generating survey reports based on MWD data and drilling parameters, according to embodiments of the disclosure. As depicted, surface processor 100 (shown as "Computer System") includes a decoder that receives measurement data from an EDR system (via WITS) and an MWD downhole device 14 (these measurements are telemetered via mud pulse and/or electromagnetic). The decoder transmits decoded data and EDR data to the software application disclosed herein. In some embodiments, the software application uses the data to perform any operation disclosed herein. In some embodiments, the software application uses the data to generate survey log, and LAS files. An email application may email the reports and/or files.

Figure 56:
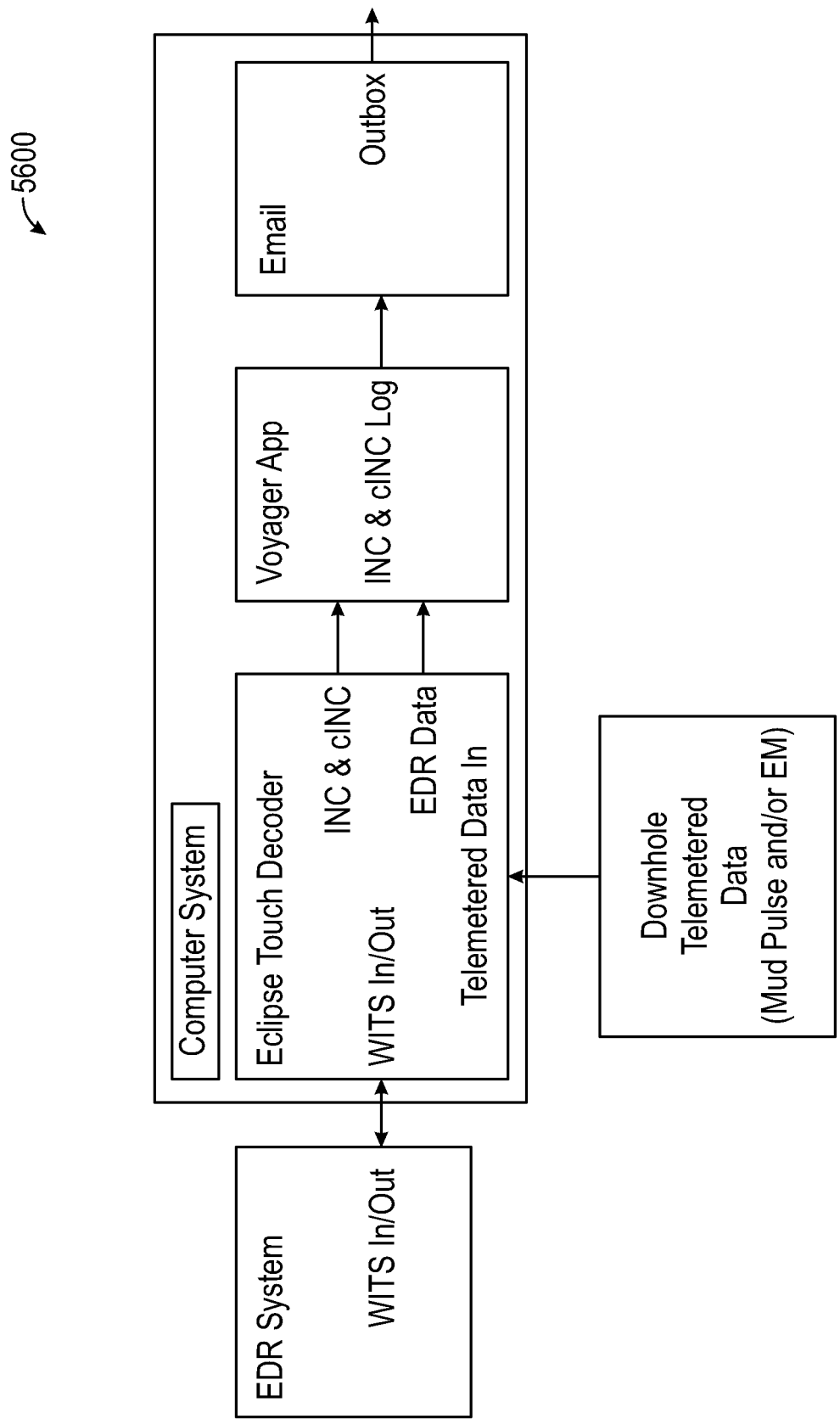
FIG. 56 depicts a component diagram of a software application generating INC and cINC reports based on MWD data and drilling parameters, according to embodiments of the disclosure.

FIG. 56 depicts a component diagram 5600 of a software application generating survey reports based on MWD data and drilling parameters, according to embodiments of the disclosure. As depicted, surface processor 100 (shown as "Computer System") includes a decoder that receives measurement data from an EDR system (via WITS) and an MWD downhole device 14 (these measurements are telemetered via mud pulse and/or electromagnetic). The decoder transmits decoded data and EDR data to the software application disclosed herein. In some embodiments, the software application uses the data to perform any operation disclosed herein. In some embodiments, the software application uses the data to INC and cINC logs. An email application may email the reports and/or files.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

Clauses:
Clause 1. A system including a surface processor and a tool drill string having a downhole device including a downhole processor, the surface processor comprising:

a memory storing instructions;
the surface processor communicatively coupled to the memory, and the surface processor configured to execute the instructions to:
receive one or more first measurements from the downhole device;
determine whether the one or more first measurements satisfy a threshold measurement; and
responsive to determining the one or more first measurements satisfy the threshold measurement, electronically modify a weight on bit by a first amount and electronically modify a revolutions per minute of a motor by a second amount.

Clause 2. The system of any clause herein, wherein the surface processor is further configured to:
receive one or more second measurements from the downhole device;
determine whether the one or more second measurements satisfy the threshold measurement; and
responsive to determining the one or more second measurements satisfy the threshold measurement, electronically raise the tool drill string off a surface of a well borehole in which the downhole device is disposed and causing drilling to stop.

Clause 3. The system of any clause herein, wherein the surface processor is further configured to:
responsive to determining the one or more second measurements satisfy the threshold measurement, waiting a period of time to enable the tool drill string to unwind, and resuming drilling at a modified rate of the revolutions per minute by lowering the tool drill string.

Clause 4. The system of any clause herein, wherein the surface processor is further configured to generate, via an artificial intelligence engine, a machine learning model trained to determine whether the one or more first measurements satisfy the threshold measurement, and electronically modify the weight on bit by the first amount and electronically modify the revolutions per minute by the second amount.

Clause 5. The system of any clause herein, wherein the one or more first measurements comprise at least one of an axial vibration measurement, a lateral vibration measurement, a stick slip measurement, or some combination thereof.

Clause 6. The system of any clause herein, wherein the surface processor is further configured to electronically increase the weight on bit by the first amount and electronically decrease the revolutions per minute by the second amount.

Clause 7. The system of any clause herein, wherein the surface processor is further configured to electronically decrease the weight on bit by the first amount and electronically increase the revolutions per minute by the second amount.

Clause 8. The system of any clause herein, wherein the measurement threshold is associated with an allowable limit.

Clause 9. A system including a surface processor and a tool drill string having a downhole device including a downhole processor, the surface processor comprising:
a memory storing instructions;
the surface processor communicatively coupled to the downhole processor, and the surface processor configured to execute the instructions to:
receive dynamic data from the downhole device and drilling parameters from an electronic drilling recorder (EDR);
determine, using one or more machine learning models generated by an artificial intelligence engine and the dynamic data, a risk probability of an undesirable event pertaining to the tool drill string;
determine whether the risk probability satisfies a threshold level; and
responsive to determining the risk probability satisfies the threshold level, transmit a notification to a computing device.

Clause 10. The system of any clause herein, wherein the dynamic data comprises drilling data received from the downhole device, wherein the drilling data comprises a vibration measurement value, a shock measurement value, a revolutions per minute measurement value, a stick slip severity measurement value, a gamma measurement value, an azimuth measurement value, a formation measurement value, or some combination thereof.

Clause 11. The system of any clause herein, wherein the artificial intelligence engine generates the one or more machine learning models by training the one or more machine learning models with training data comprising one or more amounts of hours motors operate based on certain parameters, wherein the parameters comprise:
temperatures, vibration measurement values, shock measurement values, revolutions per minute measurement values, stick slip severity measurement values, gamma measurement values, azimuth measurement values, formation measurement values, flow rate measurement values, weight on bit measurement values, depth measurement values, or some combination thereof.

Clause 12. The system of any clause herein, wherein the drilling parameters comprise a revolutions per minute measurement value, a flow rate measurement value, a weight on bit measurement value, a depth measurement value, a circulating hours measurement value, or some combination thereof.

Clause 13. The system of any clause herein, wherein, responsive to determining the risk probability satisfies the threshold level, the processing device is further configured to transmit a control instruction to the downhole device to cause an operating parameter of the downhole device to be modified.

Clause 14. The system of any clause herein, wherein, responsive to determining the risk probability satisfies the threshold level, the processing device is further configured to:
receive second dynamic data from the downhole device and second drilling parameters from the EDR;
determine, using the one or more machine learning models generated by the artificial intelligence engine and the second dynamic data, the risk probability of the undesirable event pertaining to the tool drill string.

Clause 15. The system of any clause herein, wherein the dynamic data comprises high-speed pressure data from a data acquisition system.

Clause 16. The system of any clause herein, wherein the undesirable event is associated with a mud motor micro stalling event.

Clause 17. A method for using a surface processor and a tool drill string having a downhole device including a downhole processor, the method comprising:
receiving, at the surface processor, dynamic data from the downhole device and drilling parameters from an electronic drilling recorder (EDR);
determining, using one or more machine learning models generated by an artificial intelligence engine and the dynamic data, a risk probability of an undesirable event pertaining to the tool drill string;

determining whether the risk probability satisfies a threshold level; and responsive to determining the risk probability satisfies the threshold level, transmitting a notification to a computing device.

Clause 18. The method of any clause herein, wherein the dynamic data comprises drilling data received from the downhole device, wherein the drilling data comprises a vibration measurement value, a shock measurement value, a revolutions per minute measurement value, a stick slip severity measurement value, a gamma measurement value, an azimuth measurement value, a formation measurement value, or some combination thereof.

Clause 19. The method of any clause herein, wherein the artificial intelligence engine generates the one or more machine learning models by training the one or more machine learning models with training data comprising one or more amounts of hours motors operate based on certain parameters, wherein the parameters comprise:

temperatures, vibration measurement values, shock measurement values, revolutions per minute measurement values, stick slip severity measurement values, gamma measurement values, azimuth measurement values, formation measurement values, flow rate measurement values, weight on bit measurement values, depth measurement values, or some combination thereof.

Clause 20. The method of any clause herein, wherein the drilling parameters comprise a revolutions per minute measurement value, a flow rate measurement value, a weight on bit measurement value, a depth measurement value, a circulating hours measurement value, or some combination thereof.

Clause 21. A computer software application that automates many of the functions that an on-site MWD engineer performs including, without limitation, reporting of MWD setup, creating and distributing daily MWD information reports and rig-site trouble shooting.

Clause 22. The computer software application of any clause herein, wherein data is electronically collected from an MWD decoder and an EDR system (i.e. Pason) to create reports and monitor measurements.

Clause 23. The computer software application of any clause herein, wherein data is processed in order to identify and/or predict potential trouble areas or conditions that are outside of predetermined or preselected range(s).

Clause 24. The computer software application of any clause herein, wherein reports are periodically generated and electronically distributed to a preselected distribution list of recipients.

Clause 25. The computer software application of any clause herein, wherein incident notifications are electronically distributed to a preselected distribution list of recipients.

Clause 26. The computer software application of any clause herein, wherein said incident notifications are based on different preselected measured parameters.

Clause 27. The computer software application of any clause herein, wherein suggested solutions are provided for certain identified problem scenarios.

The computer software application of items 4 and 5, wherein said notifications are sent via electronic mail or text message.

The computer software application of item 4, wherein said reports comprise conformance, daily, directional survey and end of run reports.

The computer software application of item 5, wherein said notifications reference at least one of the following conditions as defined herein: Flatline, High Shock, Differential Spike, WITS fallout, WITS reconnect, MTF to GTF or vice versa or MWD Pressure & Standpipe pressure.

The following is claimed:

1. A system including a surface processor and a tool drill string having a downhole device including a downhole processor, the surface processor comprising:

a memory storing instructions;

the surface processor communicatively coupled to the downhole processor, and the surface processor configured to execute the instructions to:

train, by an artificial intelligence engine, one or more machine learning models using a corpus of training data including a plurality of inputs mapped to at least one output comprising an undesirable event pertaining to the tool drill string occurring, the plurality of inputs comprising previous measurement data received by one or more downhole device and previous drilling parameters received by one or more electronic drilling recorders (EDRs);

receive, from a decoder coupled to a pressure sensor and the surface processor, one or more first measurements from the downhole device, wherein the pressure sensor receives the one or more first measurements and the decoder decodes the dynamic data;

determine, using the one or more machine learning models, whether the one or more first measurements satisfy a threshold measurement; and responsive to determining the one or more first measurements satisfy the threshold measurement, electronically modify a weight on bit by a first amount and electronically modify a revolutions per minute of a motor by a second amount.

2. The system of claim 1, wherein the surface processor is further configured to:

receive one or more second measurements from the downhole device;

determine whether the one or more second measurements satisfy the threshold measurement; and responsive to determining the one or more second measurements satisfy the threshold measurement, electronically raise the tool drill string off a surface of a well borehole in which the downhole device is disposed and causing drilling to stop.

3. The system of claim 2, wherein the surface processor is further configured to:

responsive to determining the one or more second measurements satisfy the threshold measurement, waiting a period of time to enable the tool drill string to unwind, and resuming drilling at a modified rate of the revolutions per minute by lowering the tool drill string.

4. The system of claim 1, wherein the surface processor is further configured to generate, via the artificial intelligence engine, a machine learning model trained to determine whether the one or more first measurements satisfy the threshold measurement, and electronically modify the weight on bit by the first amount and electronically modify the revolutions per minute by the second amount.

5. The system of claim 1, wherein the one or more first measurements comprise at least one of an axial vibration measurement, a lateral vibration measurement, a stick slip measurement, or some combination thereof.

6. The system of claim 1, wherein the surface processor is further configured to electronically increase the weight on bit by the first amount and electronically decrease the revolutions per minute by the second amount.

7. The system of claim 1, wherein the surface processor is further configured to electronically decrease the weight on bit by the first amount and electronically increase the revolutions per minute by the second amount.

8. The system of claim 1, wherein the measurement threshold is associated with an allowable limit.

9. A system including a surface processor and a tool drill string having a downhole device including a downhole processor, the surface processor comprising:
a memory storing instructions;
the surface processor communicatively coupled to the downhole processor, and the surface processor configured to execute the instructions to:
train, by an artificial intelligence engine, one or more machine learning models using a corpus of training data including a plurality of inputs mapped to at least one output comprising an undesirable event pertaining to the tool drill string occurring, the plurality of inputs comprising previous dynamic data received by one or more downhole device and previous drilling parameters received by one or more electronic drilling recorders (EDRs);
receive, from a decoder coupled to a pressure sensor, dynamic data from the downhole device, wherein the pressure sensor receives the dynamic data and the decoder decodes the dynamic data;
receive, from an EDR communicatively coupled to a rig sensor and to the surface processor, drilling parameters from the EDR,
wherein the rig sensor receives the drilling parameters and transmits them to the EDR;
determine, using the one or more machine learning models, the drilling parameters received from the EDR, and the dynamic data received from the downhole device, a risk probability of the undesirable event pertaining to the tool drill string occurring;
determine whether the risk probability satisfies a threshold level; and
responsive to determining the risk probability satisfies the threshold level, transmit a notification to a computing device.

10. The system of claim 9, wherein the dynamic data comprises drilling data received from the downhole device, wherein the drilling data comprises at least one of a vibration measurement value, a shock measurement value, a revolutions per minute measurement value, a stick slip severity measurement value, a gamma measurement value, an azimuth measurement value, a formation measurement value, or some combination thereof.

11. The system of claim 9, wherein the artificial intelligence engine generates the one or more machine learning models by training the one or more machine learning models with training data comprising one or more amounts of hours motors operate based on certain parameters, wherein the parameters comprise at least one of:
temperatures, vibration measurement values, shock measurement values, revolutions per minute measurement values, stick slip severity measurement values, gamma measurement values, azimuth measurement values, formation measurement values, flow rate measurement values, weight on bit measurement values, depth measurement values, or some combination thereof.

12. The system of claim 9, wherein the drilling parameters comprise at least one of a revolutions per minute measurement value, a flow rate measurement value, a weight on bit measurement value, a depth measurement value, a circulating hours measurement value, or some combination thereof.

13. The system of claim 9, wherein, responsive to determining the risk probability satisfies the threshold level, the processing device is further configured to transmit a control instruction to the downhole device to cause an operating parameter of the downhole device to be modified.

14. The system of claim 9, wherein, responsive to determining the risk probability satisfies the threshold level, the processing device is further configured to:
receive second dynamic data from the downhole device and second drilling parameters from the EDR;
determine, using the one or more machine learning models generated by the artificial intelligence engine and the second dynamic data, the risk probability of the undesirable event pertaining to the tool drill string.

15. The system of claim 9, wherein the dynamic data comprises high-speed pressure data from a data acquisition system.

16. The system of claim 9, wherein the undesirable event is associated with a mud motor micro stalling event.

17. A method for using a surface processor and a tool drill string having a downhole device including a downhole processor, the method comprising:
training, by an artificial intelligence engine, one or more machine learning models using a corpus of training data including a plurality of inputs mapped to at least one output comprising an undesirable event pertaining to the tool drill string occurring, the plurality of inputs comprising previous dynamic data received by one or more downhole devices and previous drilling parameters received by one or more electronic drilling recorders (EDRs);
receiving, from a decoder coupled to a pressure sensor and the surface processor, dynamic data from the downhole device and drilling parameters from an electronic drilling recorder (EDR), wherein the pressure sensor receives the dynamic data and the decoder decodes the dynamic data, and wherein a rig sensor receives the drilling parameters and transmits them to the EDR;
determining, using the one or more machine learning models, the drilling parameters received from the EDR, and the dynamic data, a risk probability of the undesirable event occurring;
determining whether the risk probability satisfies a threshold level; and
responsive to determining the risk probability satisfies the threshold level, performing a preventative action.

18. The method of claim 17, wherein the dynamic data comprises at least one of drilling data received from the downhole device, wherein the drilling data comprises a vibration measurement value, a shock measurement value, a revolutions per minute measurement value, a stick slip severity measurement value, a gamma measurement value, an azimuth measurement value, a formation measurement value, or some combination thereof.

19. The method of claim 17, wherein the artificial intelligence engine generates the one or more machine learning models by training the one or more machine learning models with training data comprising one or more amounts of hours motors operate based on certain parameters, wherein the parameters comprise at least one of:
temperatures, vibration measurement values, shock measurement values, revolutions per minute measurement values, stick slip severity measurement values, gamma measurement values, azimuth measurement values, formation measurement values, flow rate measurement values, weight on bit measurement values, depth measurement values, or some combination thereof.

20. The method of claim 17, wherein the drilling parameters comprise at least one of a revolutions per minute measurement value, a flow rate measurement value, a weight on bit measurement value, a depth measurement value, a circulating hours measurement value, or some combination thereof.

* * * * *

UNITED STATES PATENT AND TRADEMARK OFFICE
CERTIFICATE OF CORRECTION

PATENT NO. : 11,421,522 B2  
APPLICATION NO. : 17/332084  
DATED : August 23, 2022  
INVENTOR(S) : Kenneth Miller et al.

Page 1 of 1

It is certified that error appears in the above-identified patent and that said Letters Patent is hereby corrected as shown below:

On the Title Page

Item [54], and in the Specification, Column 1 Line 1 should read:
METHOD AND APPARATUS FOR USING A SURFACE PROCESSOR TO ELECTRONICALLY CONTROL COMPONENTS OF A TOOL DRILL STRING BASED AT LEAST ON MEASUREMENTS FROM A DOWNHOLD DEVICE Signed and Sealed this  
Fifteenth Day of November, 2022

*Katherine Kelly Vidal*

Katherine Kelly Vidal  
*Director of the United States Patent and Trademark Office*